United States Patent [19]

Sidray

[11] Patent Number: 5,370,538
[45] Date of Patent: Dec. 6, 1994

[54] DEVICES FOR TRANSFORMING PICTORIAL IMAGES IN ORTHOGONAL DIMENSIONS

[76] Inventor: Fahim R. Sidray, 104 Teal Ct., Myrtle Beach, S.C. 29577

[21] Appl. No.: 14,874

[22] Filed: Feb. 8, 1993

[51] Int. Cl.$^5$ .............................................. G09B 23/04
[52] U.S. Cl. ................................... 434/211; 434/188; 434/365
[58] Field of Search ............... 434/188, 197, 198, 199, 434/211, 212, 215, 365, 370, 405

[56] References Cited

U.S. PATENT DOCUMENTS

| | | |
|---|---|---|
| 2,068,226 | 1/1937 | Buck . |
| 2,239,187 | 4/1941 | Becker . |
| 2,319,519 | 5/1943 | Rosaire . |
| 2,779,107 | 1/1957 | Brace . |
| 2,821,792 | 2/1958 | Marzani ............................ 434/211 |
| 3,137,443 | 6/1964 | Samuelson ...................... 434/211 X |
| 3,702,505 | 11/1972 | Hadjigeorghiou . |
| 5,110,295 | 5/1992 | Concra ............................... 434/88 |

*Primary Examiner*—Gene Mancene
*Assistant Examiner*—Jeffrey A. Smith

[57] ABSTRACT

This present invention relates to displaying devices for instructive purposes. One object of this invention is to provide a composition of translations or a combination of rotation and translations in two orthogonal dimensions, to locate superimposed picture images to any selective location with respect to stationary pictures. The devices of this present invention are used to visually compare intelligence or information in the form of pictures, diagrams, or graphs for instructive reasons.

Another object is to provide animated motion of pictures, diagrams, or graphs for teaching aid in education and in mathematics in particular. This invention provides animated transformation of geometric diagrams or Algebraic graphs to visually demonstrate the proofs of geometric theorems or to find instantaneous solutions of geometric problems or algebraic problems graphically for curricula in geometry and algebra. Furthermore, my devices can be used to visually demonstrate mathematical concepts, or to display animated pictorial illustration in anatomy, physical science, or other pictorial displays for instructions, informational purposes, or the like. These devices can be produced in different forms or sizes and adapted with or without the overhead projector use. The applications of the devices of this present invention are very broad and versatile.

26 Claims, 50 Drawing Sheets

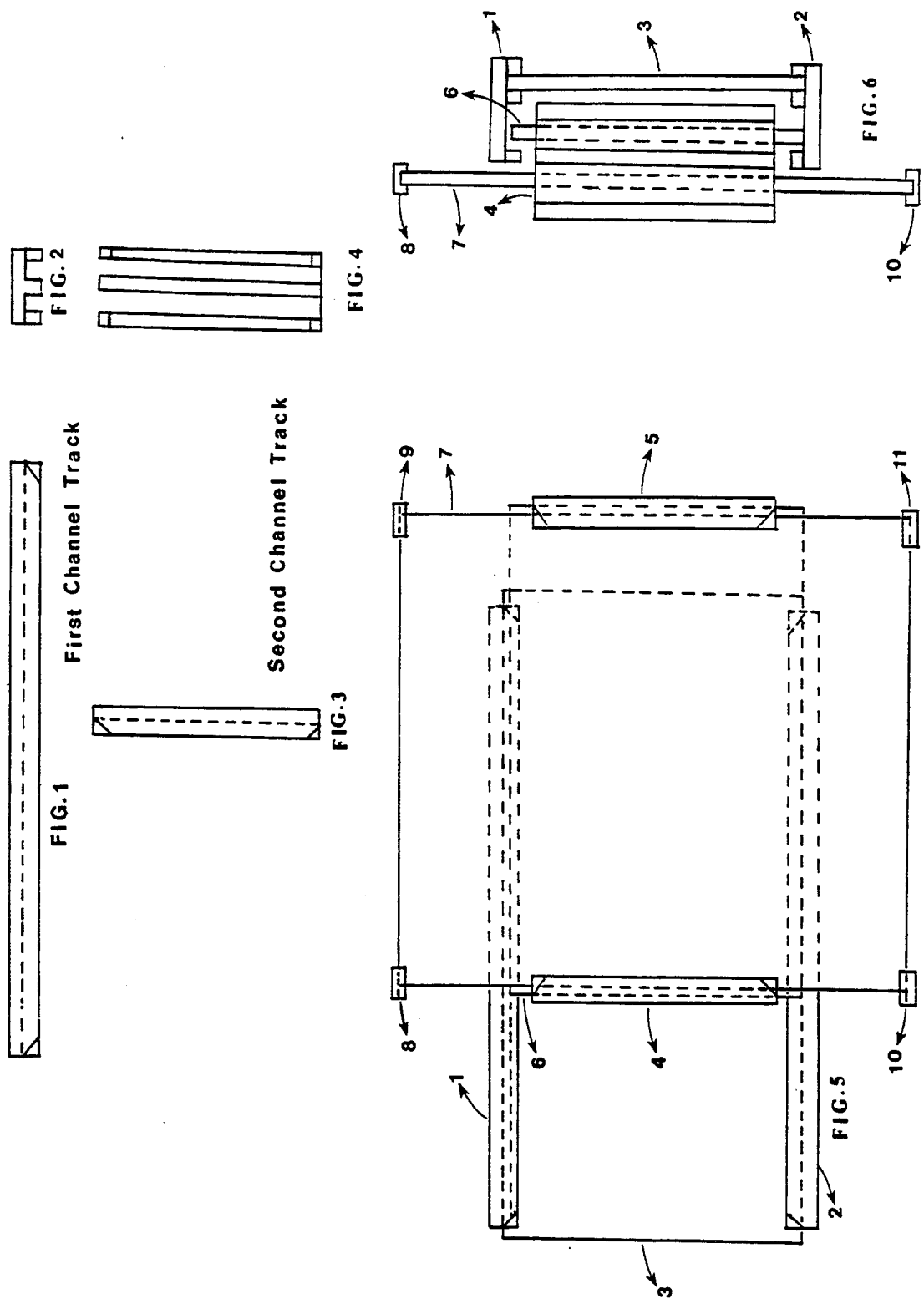

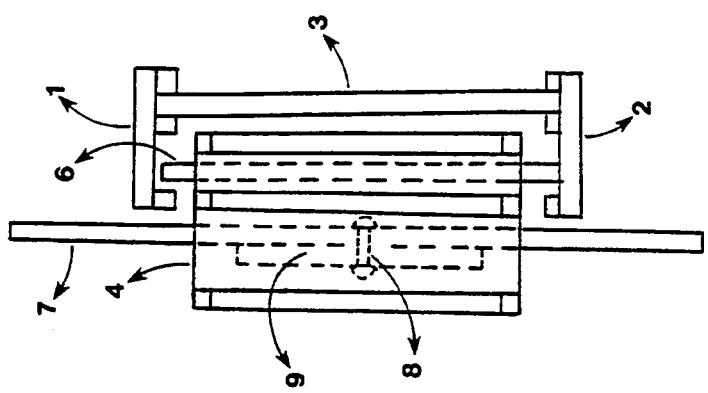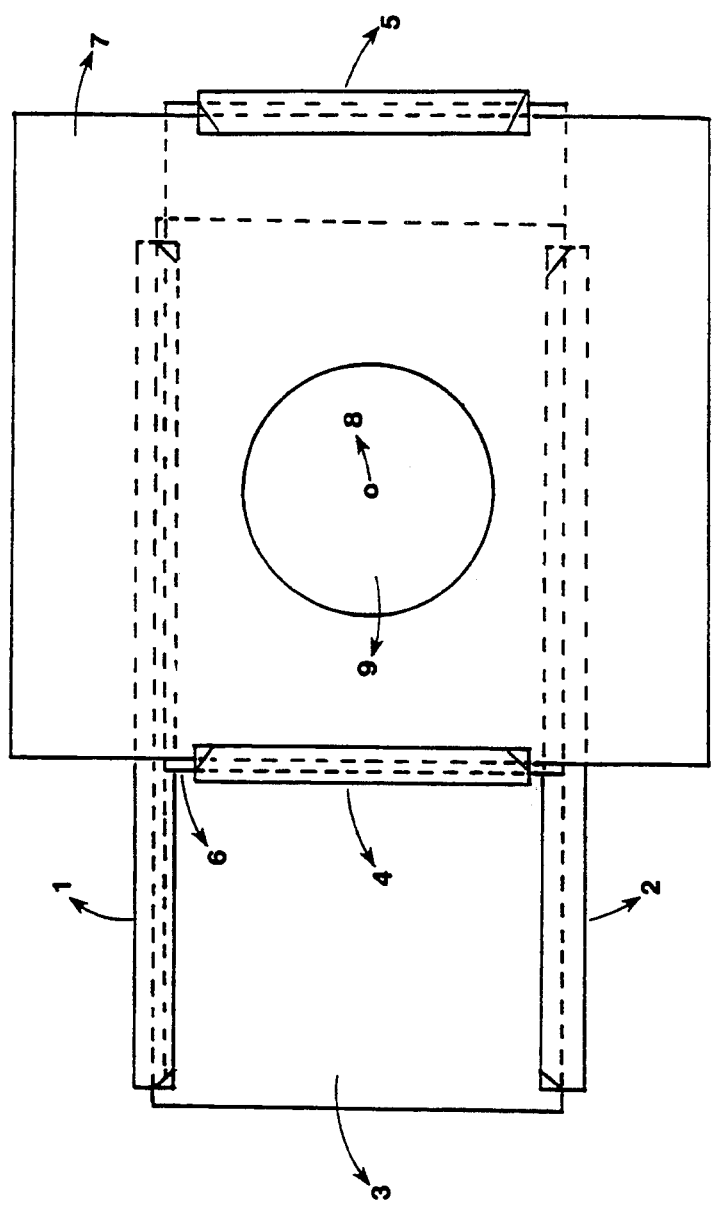

DEVICES FOR TRANSFORMING PICTORIAL IMAGES IN ORTHOGONAL DIMENSIONS

FIELD

The devices of this present invention are designed for transforming picture images with respect to underlay pictures to any desired location, to compare intelligence, data, or information for instructional purposes. This invention finds application to visually demonstrate the proofs of geometric theorems and to provide pictorial display for geometric, algebraic, or trigonometric problems along with their instantaneous solutions; or to exhibit a mathematical concept pictorially.

STATE OF THE ART

Devices for translating pictorial images; and incorporating rotational and translational pictorial images with respect to underlay pictures are introduced in my application Ser. Nos. 07/416,030 (U.S. Pat. No. 5,281,145) and 07/801,603 (pending). These devices provide transformation of pictorial images in a linear path with reference to underlay pictures to visually demonstrate the proofs of geometric theorems or to illustrate the visual motion of the behavior of algebraic graphs. While these devices are useful teaching aids, their applications are designed for translational movements of superimposed picture images in one dimension with respect to underlay pictures.

The instructional devices of this present invention apply composition of orthogonal translations, or composition of orthogonal translations and rotations to transform superimposed picture images to any desired location with respect to underlay pictures. This invention finds applications to visually demonstrate the proofs of geometric theorems or to display algebraic problems, geometric problems, or trigonometric problems with respect to underlay Cartesian coordinate system along with their solutions simultaneously.

SUMMARY OF THE INVENTION

The devices for transforming superimposed picture images to any desired location with respect to underlay pictures are instructional exhibit devices designed to provide animated visual demonstration of pictures, diagrams, data, information, graphs, or the like. The invention illustrated herein by way of example of its application, provides animated transformation of geometric diagrams, algebraic or trigonometric graphs for visually demonstrating the proofs of geometric theorems or to solve geometric, algebraic, or trigonometric problems along with their instantaneous solutions. These devices can be produced in different forms or sizes for use by classroom teachers and students. They can be produced also in small sizes for demonstration with or without the overhead projector use.

The claimed devices for transforming picture images in orthogonal dimensions include two types:
(1) A device for translating pictorial images in orthogonal dimensions.
(2) A device for translating and rotating pictorial images in orthogonal dimensions.

(1) A DEVICE FOR TRANSLATING PICTORIAL IMAGES IN ORTHOGONAL DIMENSIONS

The claimed device for translating superimposed picture images in orthogonal dimensions comprises as basic components the following:
(1) A first pair of channel tracks, each channel track embodying two or more channels, and a base member with opaque or transparent rectangular flat surface including a picture print, snugly mounted within two respective channel tracks by means of inserting the longer parallel edges of the base member within two respective channel tracks;
(2) A translating member with a transparent flat surface, and a second pair of channel tracks, each channel track embodying two or more channels, snugly mounted within two respective channel tracks and slideably mounted with its other parallel edges within the two channel tracks of the base member simultaneously for translational movements in a linear path to any desired location with respect to the base member; and
(3) An overlay member with a transparent flat surface, including a superimposed picture image print, slideably mounted within the channel tracks of said translating member for orthogonal translation to any desired location with respect to the picture of the base member. Thus, the superimposed picture image can be translated to any desired location with respect to the picture of the base member by means of applying composition of orthogonal translations. The picture of the base member may include at least one geometric diagram and indicia for naming the geometric diagrams. The picture of the base member may represent Cartesian coordinate system, wherein the coordinate axes are superimposed on a grid of intersecting parallel guide lines with one set of parallel lines normal the ordinate axes and a second set of parallel lines normal the abscissa axis so as to intersect the ordinate and abscissa axes, respectively, at linear intervals across unit lengths of both the positive and negative sides thereof measured from the origin of the axes.

An example of how the claimed invention can be manipulated to solve geometric problems or to prove geometric theorems is the best way to convey how the claimed invention operates. For instance, the claimed device can be used to visually demonstrate similar triangle theorems or to solve geometric problems as application on similar triangles. The base member can include a triangle and the overlay member includes a triangle similar to the triangle of the base member with the corresponding sides of the two triangles parallel and the sides of each triangle are calibrated to unit scale length. The overlay member can be translated to visually demonstrate AA similarity Postulate, SAS and SSS Similarity Theorems, and Segment Dividing Proportionally Theorem. The overlay member can be removed, and then remounted after being rotated 180 degrees to visually demonstrate a second version of translating the superimposed triangle with respect to the underlay triangle. This process provides miscellaneous problem solving of similar triangles. The overlay member can be removed again, and then remounted after being flipped over to visually demonstrate a third translating version of similar triangles for problem solving. Further, the overlay member can be rotated 180 degrees to visually demonstrate a fourth translating version of similar triangles for more problem solving. The process of remounting the overlay member proceeds in sequentional order as previously described. Another example for the application of the invention is to visually demonstrate the proof of the Pythagorean theorem in coordinate geometry. The Pythagorean theorem states, "In a right triangle, the square of the hypotenuse equals the sum of the squares of the two legs." In proving the Pythagorean theorem, the base member includes a Cartesian coordinate system and the overlay member includes a right triangle for superimposing the vertices of the right triangle on the Cartesian coordinate graph. Each vertex of the right triangle is paired with ordered pair of numbers in the Cartesian coordinate system. The proofs of the Pythagorean theorem can be visually demonstrated by applying the square of the distance formula for each side of the right triangle. The right triangle can be translated to any desired position to prove the Pythagorean theorem using coordinate geometry system.

In further application, the claimed invention visually demonstrates algebraic problems along with their instantaneous solutions. For example, the base member may include a Cartesian coordinate system and the overlay member having a line graph for superimposing the line graph on the Cartesian coordinate graph. The equation of the superimposed algebraic graph can be found by applying the linear equation $y = mx + b$; m and b are the slope and y-intercept respectively. The superimposed line graph can be positioned on many desired locations with respect to the underlay Cartesian coordinate graph to visually demonstrate algebraic linear graphs along with their instantaneous solutions.

The second device of this claimed invention is designed for translating and rotating superimposed pictorial images.

(2) A DEVICE FOR TRANSLATING AND ROTATING PICTORIAL IMAGES IN ORTHOGONAL DIMENSIONS

2. A device for translating and rotating pictorial images in orthogonal dimensions comprises the following.
(a) A base member and a translating member of said "device for translating pictorial images in orthogonal dimensions"; and
(b) A composite overlay member including a transparent circular flat surface with a superimposed picture image thereon, pivotally mounted with its center on a transparent flat surface of rectangular or square shape for rotating movements. The flat surface of the composite overlay member slideably mounted within two respective channel tracks of said translating member for translating and rotating the superimposed picture image of the circular flat surface to any desired location with respect to the underlay picture of the base member.

The device for translating and rotating pictorial images in orthogonal dimensions finds application to prove geometric theorems or to solve geometric problems along with their instantaneous solutions for geometric curriculum. One example of such application is to visually demonstrate a geometric theorem, "The measure of the inscribed angle is half the measure of its intercepted arc." In this device, the base member including a diagram of a circle with a central angle and a set of two or more inscribed angles which intercept the same arc of the central angle. The rotating circle of said composite overlay member including a central angle, bisected by an angle bisector, wherein the central angle is congruent to the central angle of the base member.

The vertex of the central angle of the rotating circle can be translated to coincide with the vertex of each inscribed angle of the base member, and then rotated to visually demonstrate the measure of each inscribed angle equals half the measure of its intercepted arc.

Further, this claimed invention finds application to visually demonstrate algebraic problems along with their instantaneous solutions. In another example, the base member can include a Cartesian coordinate system as previously described; the rotating circle of the composite member can include two perpendicular diameters and an algbraic graph represents an ellipse, with it's center on the center of the rotating circle, such that the major and minor axes of the ellipse lie on the diameters of the circle. The ellipse can be translated and/or rotated to any desired location with respect to the Cartesian coordinate graph of the base member. The equation, in standard form, of an ellipse centered at the origin with foci on an axis c units from the origin is $x^2/a^2 + y^2/b^2 = 1$, (major axis horizontal, where $c^2 = a^2 - b^2$). The elliptic graph can be translated to any selective location, so that its center positions on any desired ordered pair of points (h,k) of the Cartesian coordinate graph of the base member. The equation of the ellipse with it's center at (h,k) and it's foci c units from (h,k), major axis 2a horizontal is expressed as $(x-h)^2/a^2 + (y-k)^2/b^2 = 1$. Additionally, the center, vertices and foci of each transformed ellipse can be found and visually demonstrated.

The underlay pictures, and the superimposed picture images can be printed on self-adhesive removable sticker and then mounted on the base member, the overlay member or the circular flat surface at designated locations by means of aligning cross marks or other forms of printed marks on the sticker prints to match with the corresponding marks on the base member, the overlay member, or the circular flat surface of the composite member. These sticker picture prints include geometric diagram; or algebraic or trigonometric graphs; and indicia for naming the geometric diagrams; or algebraic or trigonometric graphs. These sticker prints can be kept organized in a binder with heading titles for use.

The composite member can include interchangeable or replaceable rotating circles with algebraic graphs or geometric diagrams and are adapted for mounting and removal on the flat surface of the composite member to visually demonstrate geometric theorems or geometric problems, or algebraic graphs, or algebraic problems along with their instantaneous solutions. This claimed invention finds application to visually demonstrate other educational areas such as anatomical science, physical science, biological science, or other areas, wherein facilitating instruction or comparison of information applied.

The device for translating pictorial images in orthogonal dimensions can be used to provide information represented by figures. For example, the base member may include data represented by figures in tabular form in two variables; the overlay member including two perpendicular highlight lines, wherein the highlight lines meet or cross each other to form one right angle, two right angles or four right angles. The two highlight lines superimpose one row and one column of the tabular figures. The intersection of the two perpendicular highlight lines locates and superimposes the designated figure in the tabular data.

Thus, the devices of this invention am adapted for use to display intelligence, graphs, diagrams, or data represented by figures in tabular form. The application of this invention are very broad and useful teaching aids because they produce mathematics and other information in visual animated demonstration.

Other features and advantages of this invention will become apparent during the course of the following description of the accompanying drawings.

BRIEF DESCRIPTION OF THE DRAWINGS

In the drawings, the mode for carrying out the invention:

FIG. 1, a front view, in elevation, of one of the two channel tracks of the base member;

FIG. 2, a side view, in elevation, of FIG. 1;

FIG. 3, a front view, in elevation, of one of the two channel tracks of the translating and overlay members;

FIG. 4, a side view, in elevation, of FIG. 3;

FIG. 5, a front view, in elevation, of a device for translating pictorial images in orthogonal dimensions of this invention, wherein each channel track of the base member comprising two channels;

FIG. 6, a side view, in elevation, of FIG. 5;

FIG. 9, a front view, in elevation, of a device for translating and rotating superimposed pictorial images in orthogonal dimensions with respect to underlay pictures;

FIG. 10, a side view, in elevation, of FIG. 9;

DETAILED DESCRIPTION OF THE INVENTION AND THE ILLUSTRATED EMBODIMENTS

Figure 8:
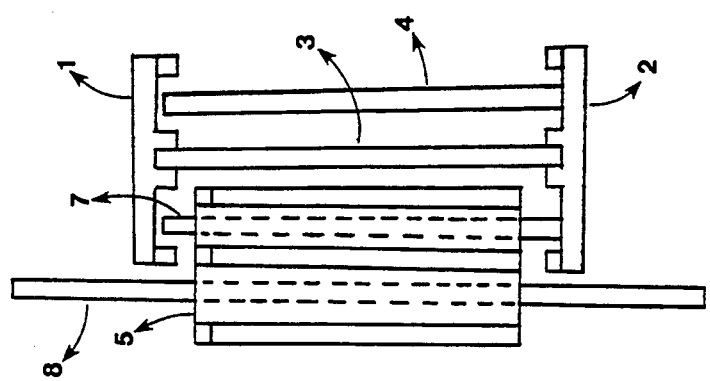
FIG. 8, a side view, in elevation, of FIG. 7.

The description of the devices of this present claimed invention herein, provides the functional features of these devices as they relate to proving geometric theorems, or illustrating the behavior of algebraic or trigonometric functions, or solving algebraic or trigonometric problems. The scope of this present invention is not confined to the applications of these devices as designated in the set of drawings herein, because the invention is basically designed to create curricula in geometry, algebra, or general mathematics.

The claimed device for translating pictorial images in orthogonal dimensions as illustrated in FIG. 5 comprises: two channel tracks 1 and 2, each embodying two channels, a base member 3, transparent or opaque, snugly mounted within two respective channel track members 1 and 2 to assemble the body device; a translating member 6, including a transparent flat surface snugly mounted within two channel tracks 4 and 5 and slideably mounted within two respective channel tracks 1 and 2 simultaneously, so that translating member 6 can be translated smoothly in a linear path over base member 3 to any desired location with respect to the base member; an overlay member 7 slideably mounted within channel tracks 4 and 5 and on top of translated member 6, so that overlay member 7 can be translated orthogonally with respect to base member 3. Overlay member 7 has suitable means, such as an abutments or stops 8, 9, 10, and 11 to maintain overlay member 7 inside channel tracks 4 and 5.

FIG. 6, a side view, in elevation of FIG. 5, wherein base member 3 and translating member 6 mounted within channel tracks 1 and 2, overlay member 7 mounted within channel tracks 4, abutments 8 and 10 which represent 8, 9, 10, and 11 in the front view are snugly mounted in overlay member 7.

In the illustrated FIG. 5, translating member 6 carries overlay member 7 to any desired location with reference to base member 3, while overlay member 7 can be translated orthogonally with respect to base member 3. Base member 3 may include a first picture print or a mathematical graph thereon; overlay member 7 includes a second picture print or a mathematical graph for superimposing the picture print or the mathematical graph of the overlay member to any desired location with respect to the picture or the mathematical graph of the base member. Thus, channel tracks 1 and 2 provide means to carry translated member 6 along with it's superimposed picture image in a linear path to any desired position relative to the picture of base member 3, while channel tracks 4 and 5 provide means for translating the superimposed picture image orthogonally to any desired position relative to the picture of base member 3. In other words, a superimposed picture image can be translated to any desired location with reference to a picture on the base member. In this respect a superimposed picture image can be transformed to any desired location with reference to a picture on the base member in animated demonstration to visually compare intelligence or information in the form of pictures, diagrams, of graphs for instructional reasons.

An important objective of the device for translating pictorial images in orthogonal dimensions is to find applications to visually demonstrate solutions of algebraic problems graphically, the behavior of algebraic functions, or interpretations of data represented by graphs which superimpose Cartesian coordinate sytem. In demonstrating algebraic graphs, the base member may include a Cartesian coordinate system, wherein the Cartesian coordinate graph includes abscissa axis and ordinate axis which intersect orthogonally at an origin, said Cartesian coordinate graph further including grid lines parallel to both the abscissa and the ordinate axes for subdividing the Cartesian coordinate graph into predetermined units. The transparent overlay member may include a graph of algebraic or trigonometric function which is adapted for use for composition of translations in orthogonal dimensions on the Cartesian coordinate graph to any desired location with respect to the origin of the coordinate axes. While the shape of an algebraic graph, a trigonometric graph, or a graph ruled by a mathematical system remains unchanged, its equation changes at every translated location.

Thus, tremendous numbers of algebraic problems or mathematical problems can be generated and readily demonstrated with their solutions graphically.

Figure 7:
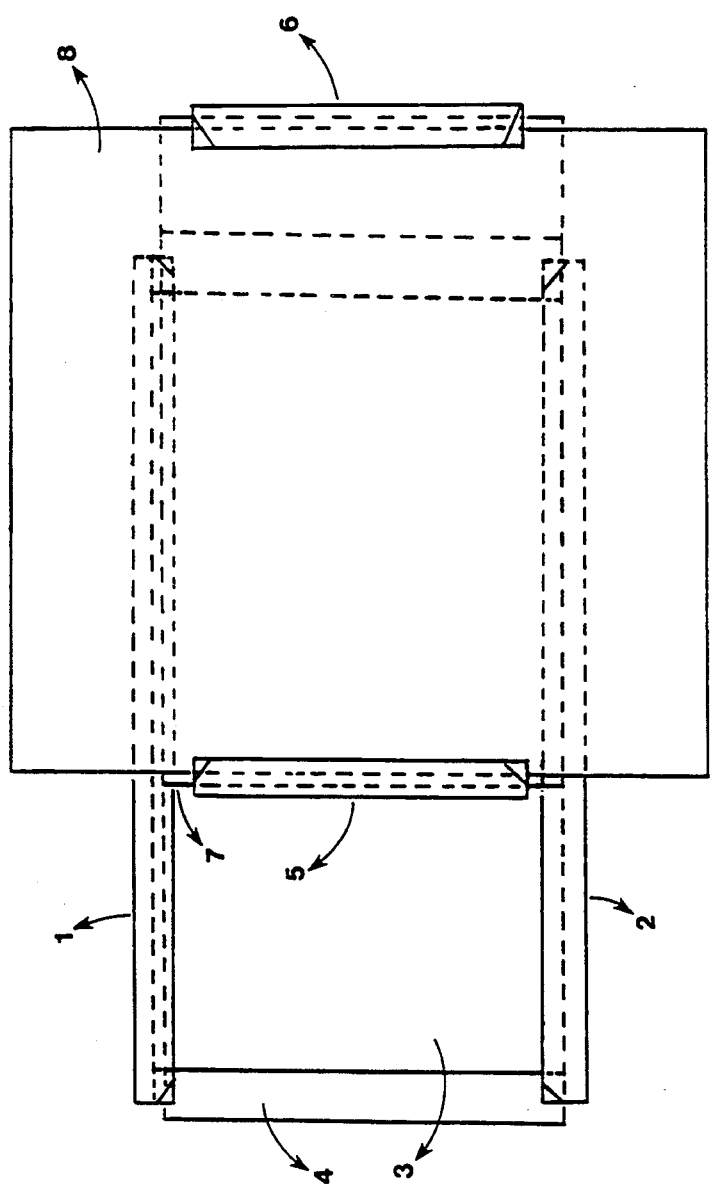
FIG. 7, a front view, in elevation, of a device for translating pictorial images in orthogonal dimensions, wherein each channel track of the base member comprising three channels.

FIG. 7, illustrates a device for translating pictorial images in orthogonal dimensions with multiple channel tracks. It comprises a pair of channel track members 1 and 2, each channel track embodying three channels; an overlay base member 3, with a transparent flat surface, snugly mounted within the middle channel tracks 1 and 2 to form the body device; a base member 4 may include a picture or a diagram slideably mounted within channel tracks 1 and 2 and underlies overlay base member 3; a translating member 7, snugly mounted within channel tracks 5 and 6 and also mounted within channel tracks 1 and 2 simultaneously for relative translational movement with respect to base member 4; an overlay member 8 may include a superimposed picture image, slideably mounted within channel track 5 and 6 and on top of translating member 7 for relative translational movements orthogonally with respect to base member 4.

For increased accuracy and for instructional display purposes, base member 4 and overlay member 8 can be made of transparent films for infrared copiers in color images or other convenient materials to produce a low manufacturing cost product.

FIG. 8, a side view, in elevation of FIG. 7, each of channel tracks 1 and 2 includes three channels, transparent flat surface member 3 snugly mounted within the middle channel tracks 1 and 2; translating member 7 snugly mounted within channel tracks 5 and slideably mounted within channel tracks 1 and 2 to provide translational movement; overlay member 8 mounted within the other channel tracks 5 and on top of translating member 7 for translational movement orthogonally with respect to base member 4.

FIG. 9, illustrates a device for translating and rotating pictorial images in orthogonal dimensions of this present invention. It comprises: base member 3, which may include a picture, snugly mounted within channel tracks 1 and 2; translating member 6 snugly mounted within channel tracks 4 and 5 and also mounted within channel tracks 1 and 2 for transitional movement; composite overlay member comprises transparent flat surface 7, slideably mounted within channel tracks 4 and 5 for relative transitional movements orthogonally with respect to base member 3 as described previously and circular flat surface 9 may include a superimposed picture image, pivotally mounted with its center 8 on flat surface 7. Thus, the superimposed picture image of circular flat surface 9 can be rotated and translated in two orthogonal dimensions simultaneously relative to base member 3.

FIG. 10, a side view, in elevation, of FIG. 9, which illustrates channel tracks 1 and 2, base member 3, translating member 6 snugly mounted within channel tracks 4 and also mounted within channel tracks 1 and 2 for translational movements; composite overlay member including fiat surface 7, slideably mounted within channel tracks 4 for transitional movement orthogonally with respect to base member 3; anti circular flat surface 9 pivotal mounted with its center 8 on flat surface 7.

In manufacturing the product of these manipulative devices, the pictures and the superimposed picture images of said base and overlay members can be printed on self-adhesive removable films which are similar in nature to colored or black images of clear infrared transparencies so that the printed picture films can be mounted on the base member, the overlay member, or the circular flat surface of composite overlay member because they lend themselves to low manufacturing cost.

Figure 11:
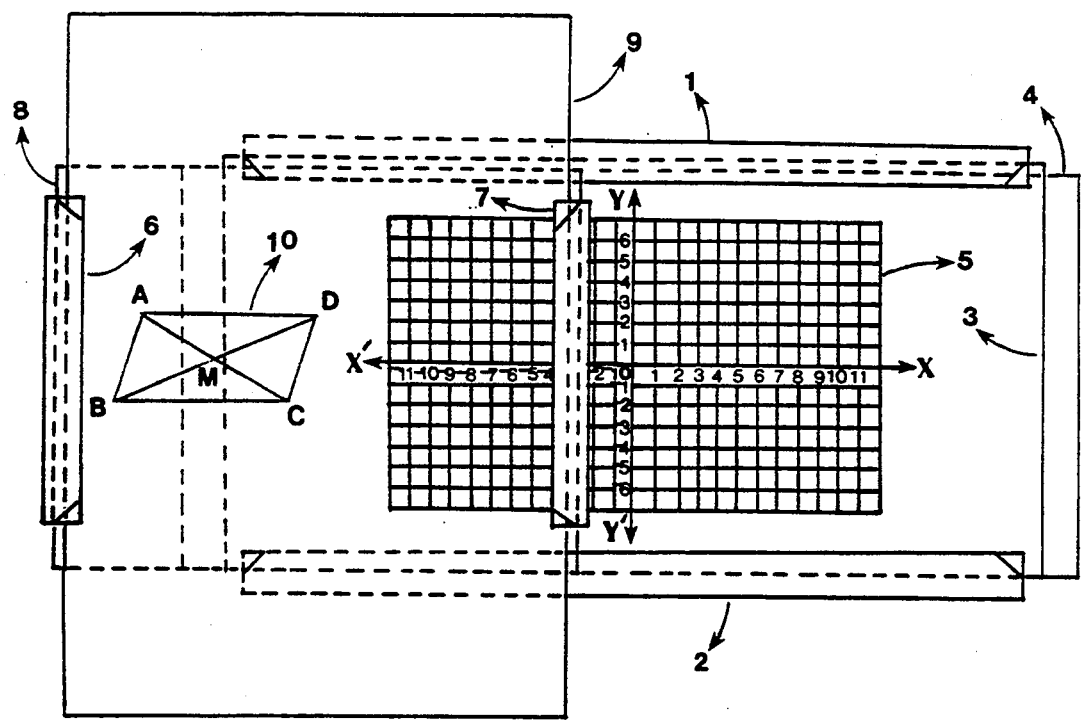
FIG. 11, a front view, in elevation, of a device for translating superimposed pictorial images in orthogonal dimensions, wherein the base member including Cartesian coordinate system and the overlay member including a geometric diagram thereon.

FIG. 11 illustrates a teaching aid device for translating a superimposed picture image in orthogonal dimensions. Overlay base member 3, snugly mounted within channel tracks 1 and 2; base member 4 including Cartesian coordinate graph 5 with coordinate axes, slideably mounted within channel tracks 1 and 2 and underlies overlay base member 3; translating member 8, snugly mounted within channel tracks 6 and 7 and slideably mounted within channel tracks 1 and 2 simultaneously; overlay member 9 slideably mounted within channel tracks 6 and 7 for orthogonal translations with respect to base member 4, and including a geometric diagram 10, which represents a parallelogram; overlay member 9 can be manually translated to any desired location in two orthogonal dimensions with respect to the coordinate axes of the Cartesian coordinate graph, to visually demonstrate properties of parallelograms, using coordinate geometry system.

Figure 12:
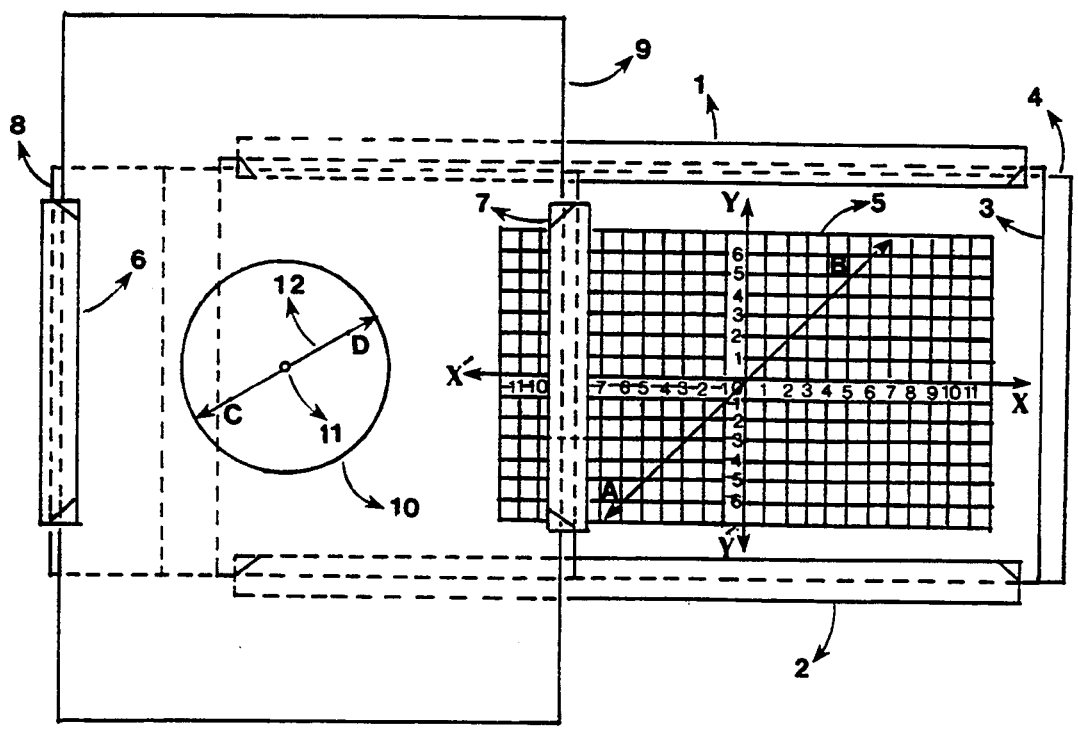
FIG. 12, a front view, in elevation, of a device for rotating and translating pictorial images in orthogonal dimensions, wherein the base member including Cartesian coordinate system and a first line graph, the rotating circular flat surface including a second line graph.

FIG. 12 illustrates a teaching aid device for rotating and translating a superimposed graphical representation with respect to an underlay graphical representation. Overlay base member 3, snugly mounted within channel tracks 1 and 2; base member 4, slideably mounted within channel tracks 1 and 2, and including Cartesian coordinate system 5, which includes coordinate axes and an algebraic graph representing the algebraic equation y=x; translating member 8, snugly mounted within channel tracks 6 and 7 and slideably mounted within channel tracks 1 and 2 as previously illustrated; composite overlay member comprises: circular flat surface 10 with a line graph 12, pivotally mounted with its center 11 on a flat surface 9; flat surface 9 slideably mounted within channel tracks 6 and 7; line graph CD can be rotated and translated in two orthogonal dimensions to superimpose underlay Cartesian coordinate graph 5 and line graph AB. Thus, a system of two algebraic linear equations of problem solving can be visually demonstrated along with their instantaneous solutions graphically.

Figure 13:
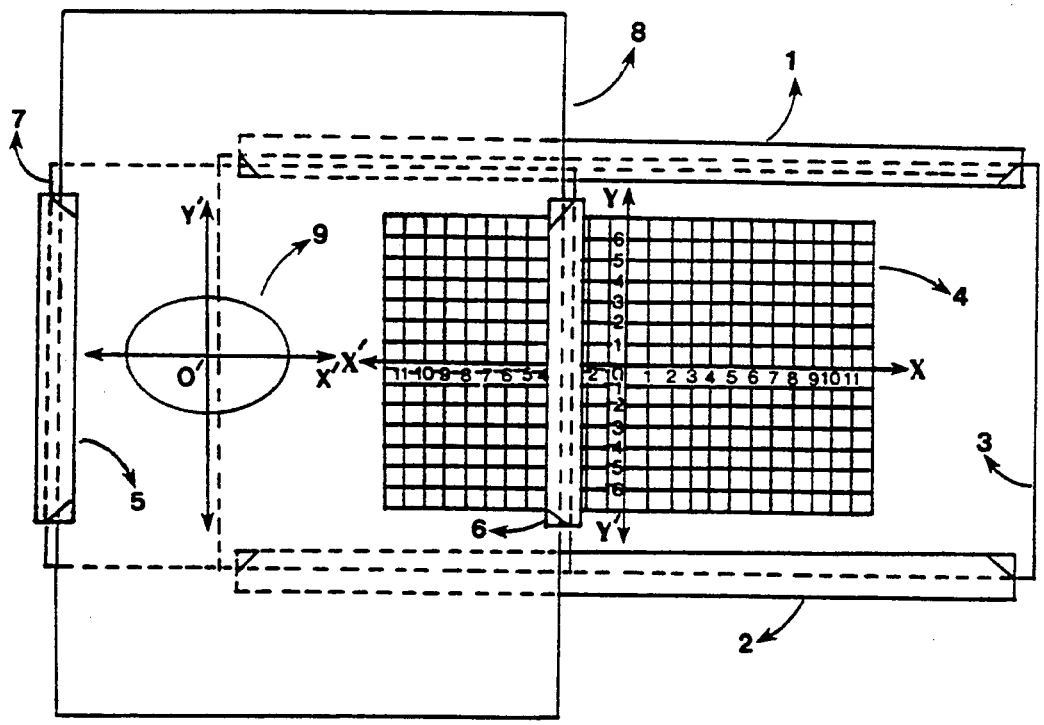
FIG. 13, a front view, in elevation, of a device for translating pictorial images in orthogonal dimensions, wherein the overlay member including a superimposed picture image of translated coordinate axes and an algebraic graph represents an ellipse, the base member including Cartesian coordinate system thereon.

FIG. 13 illustrates a teaching aid device for translating an algebraic graph in two orthogonal dimensions. Base member 3 including Cartesian coordinate system 4 with coordinate axes, snugly mounted within channel tracks 1 and 2; translating member 7, snugly mounted within channel tracks 5 and 6, and slideably mounted within channel tracks 1 and 2; overlay member 8 including an elliptical graph and translated coordinate axes 9, overlay member 8 can be manually translated in two orthogonal dimensions and superimposes Cartesian coordinate graph 4. Thus, the equations of a family of elliptical graphs can be visually demonstrated in any desired location with respect to the coordinate axes of the base member. Furthermore, the algebraic equations of the translated elliptical graphs can be found instantaneously in every translational location along with their graphical representations. Cartesian coordinate graph 4 of base member 3, and the elliptical graph with translated coordinate axes 9 of overlay member 8 can be printed on self-adhesive removable sticker and then mounted on base member 3 and overlay member 8 as previously described.

Figure 14:
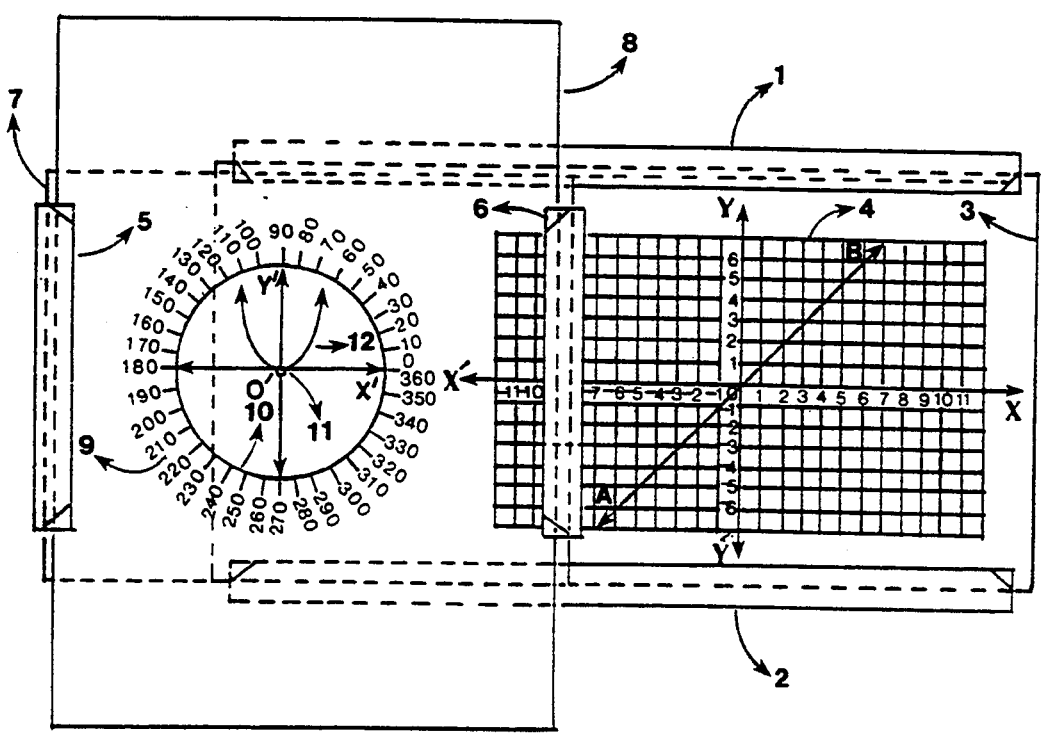
FIG. 14, a front view, in elevation, of a device for rotating and translating pictorial images in orthogonal dimensions, wherein the base member including Cartesian coordinate system and a line graph thereon; the composite overlay member including a rectangular flat surface with a circular degree scale measurement and a rotating circular flat surface including coordinate axes and an algebraic graph represents a parabola.

FIG. 14 illustrates a teaching aid device for rotating and translating an algebraic graph which represents a parabola, in two orthogonal dimensions with respect to an underlay algebraic linear graph AB. Base member 3 including Cartesian coordinate system 4 and line graph AB, snugly mounted within channel tracks 1 and 2: translating member 7, snugly mounted within channel tracks 5 and 6 and slideably mounted within channel tracks 1 and 2; composite overlay member comprises: a rectangular flat surface 8 with a graphical print, which represents a circular degree scale measurement 9, and a circular flat surface 10 pivotally mounted with its center 11 on flat surface 8 and including an algebraic graph representing a parabola 12 and translated coordinate axes. Thus, the parabolic graph can be rotated to any desired angular degree measurement and translated to any desired location with respect to the underlay algebraic linear graph AB. Furthermore, the solution set of a system of a family of parabolic graphs and the linear graph y=x on Cartesian coordinate 4 can be visually demonstrated.

Figure 15:
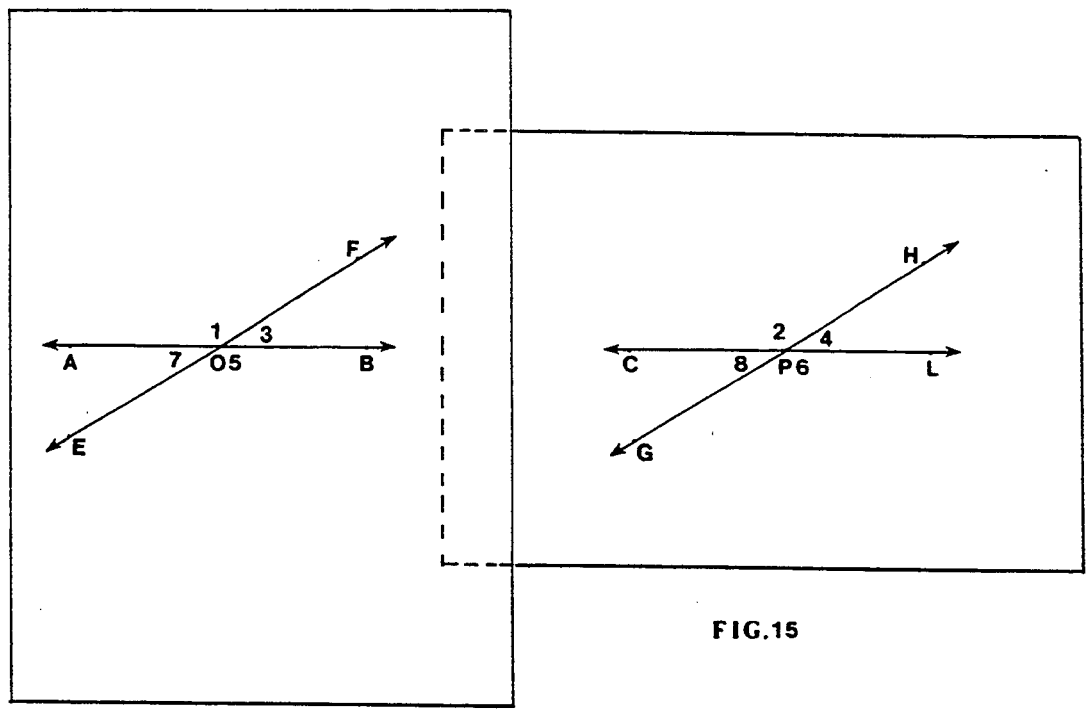
FIGS. 15, 17–21, 26, 27, 32, 35, 37, 42, 44, 47–50, 67, 69–77, 81, 82, 90, 91, 93, 95, 99, 100, 101, and 103, front views, in elevation of teaching aid devices for translating superimposed pictoral images in orthogonal dimensions with respect to stationary pictures of the base members, wherein each of these figures illustrates a base with a first graphical representation and an overlay member with a second graphical representation.

FIG. 15, a teaching aid adapted for use to demonstrate application on geometric theorems about angles formed when parallel lines cut by a transversal. The superimposed picture image of FIG. 15 can be removed, flipped over, then remounted to demonstrate two additional geometric theorems, "Supplement of two congruent angles are congruent", and "If two angles of a triangle are congruent, then the sides opposite these angles are congruent."

Figure 16:
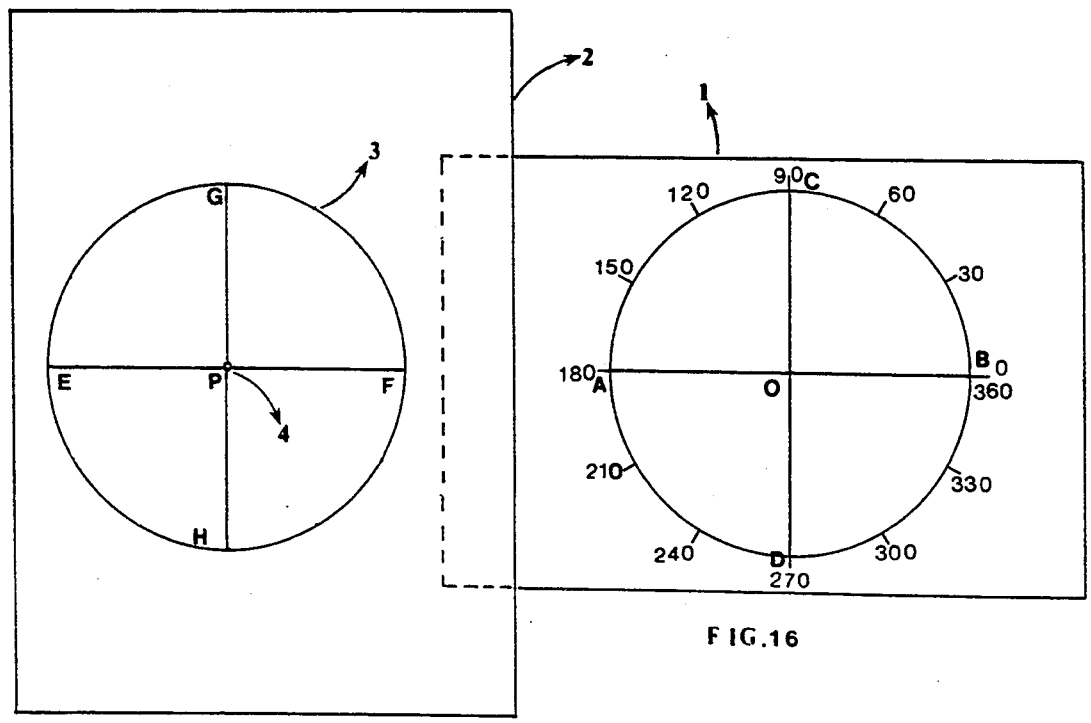
FIGS. 16, 22, 25, 28–31, 33, 34, 36, 38–41, 43, 45, 46, 51, 52–61, 68, 78–80, 87–89, 97, 98, 102, and 104, front views, in elevation of teaching aid devices for rotating and translating pictoral images in orthogonal dimensions with respect to stationary pictures of the base members, wherein each of these figures illustrates base member 1, which includes a first graphical representation, composite overlay member including a circular flat surface 3 with a second graphical representation, pivotally mounted with its center 4 on a transparent flat surface 2, wherein transparent flat surface 2 substantially clear of graphs or prints.

FIG. 16, a teaching aid adapted for use to demonstrate geometric theorems, "Complement of two congruent angles or same angle are congruent to each other", and "Vertical angles are congruent". In the process of demonstrating this device, the center of the rotating circular flat surface P must coincide with center O.

Figure 17:
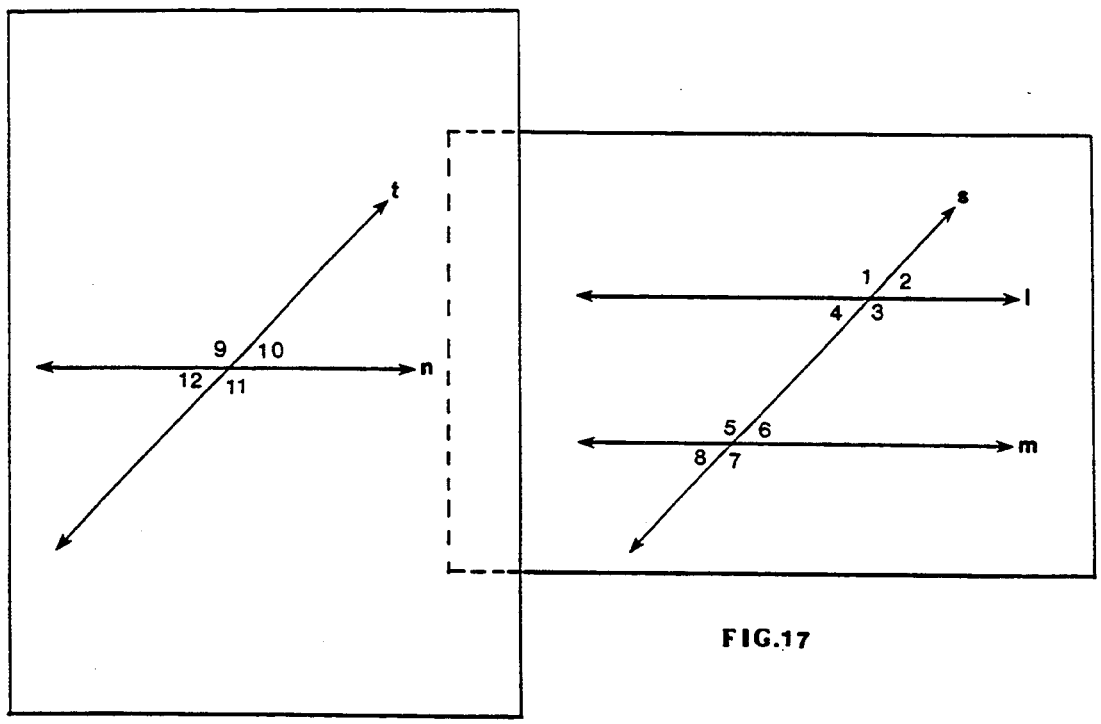

FIG. 17, a teaching aid adapted for use to demonstrate geometric theorems as application on angles formed when two parallel lines cut by a transversal.

Figure 18:
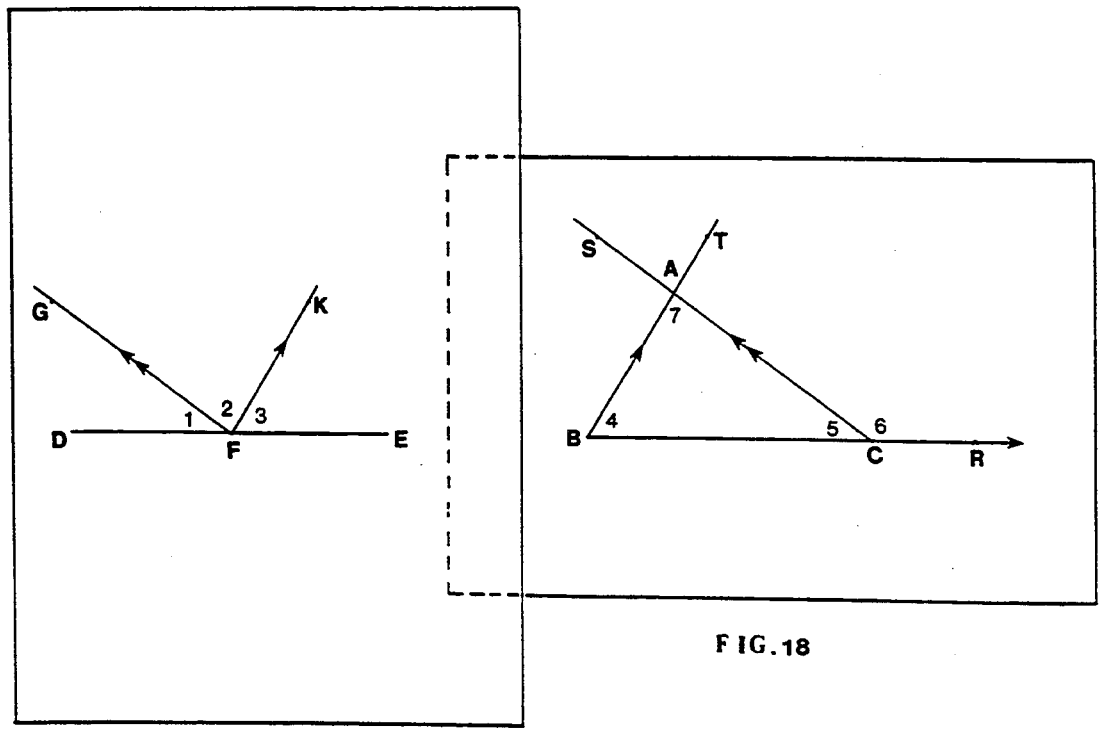

FIG. 18, a teaching aid adapted for use to demonstrate two geometric theorems "The sum of the angles of a triangle 180 degrees" and "The measure of the exterior angle of a triangle equals the sum of the measures of the two remote interior angles."

Figure 19:
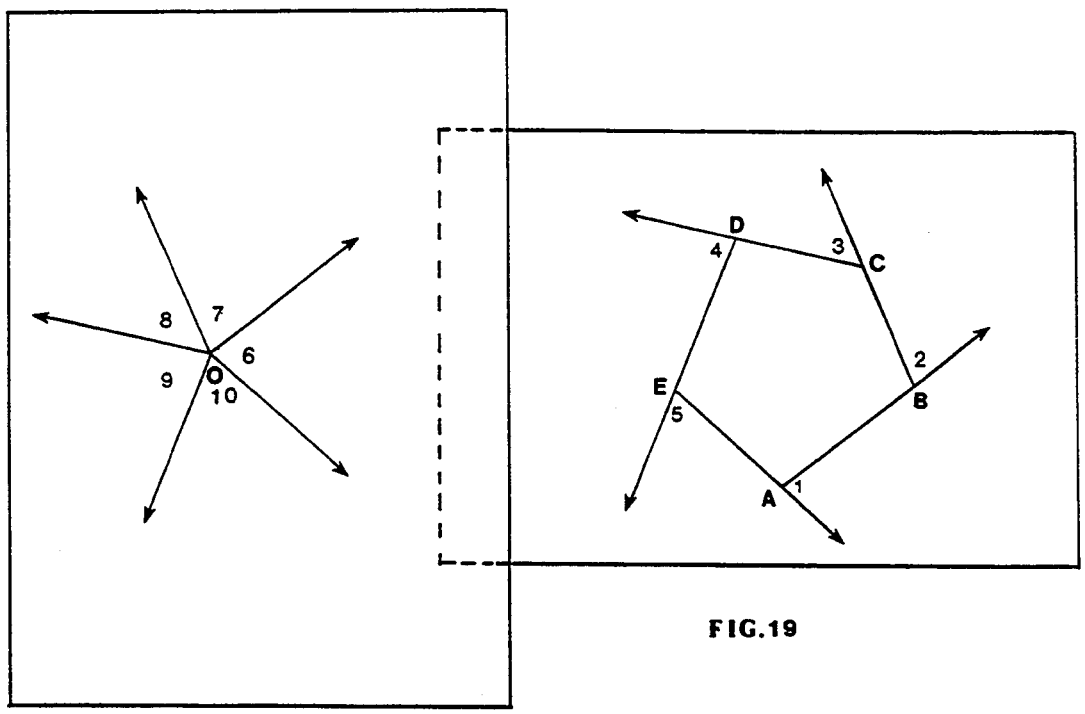

FIG. 19, a teaching aid adapted for use to demonstrate a geometric theorem "The sum of the measures of the exterior angles of a convex polygon is 360 degrees."

Figure 20:
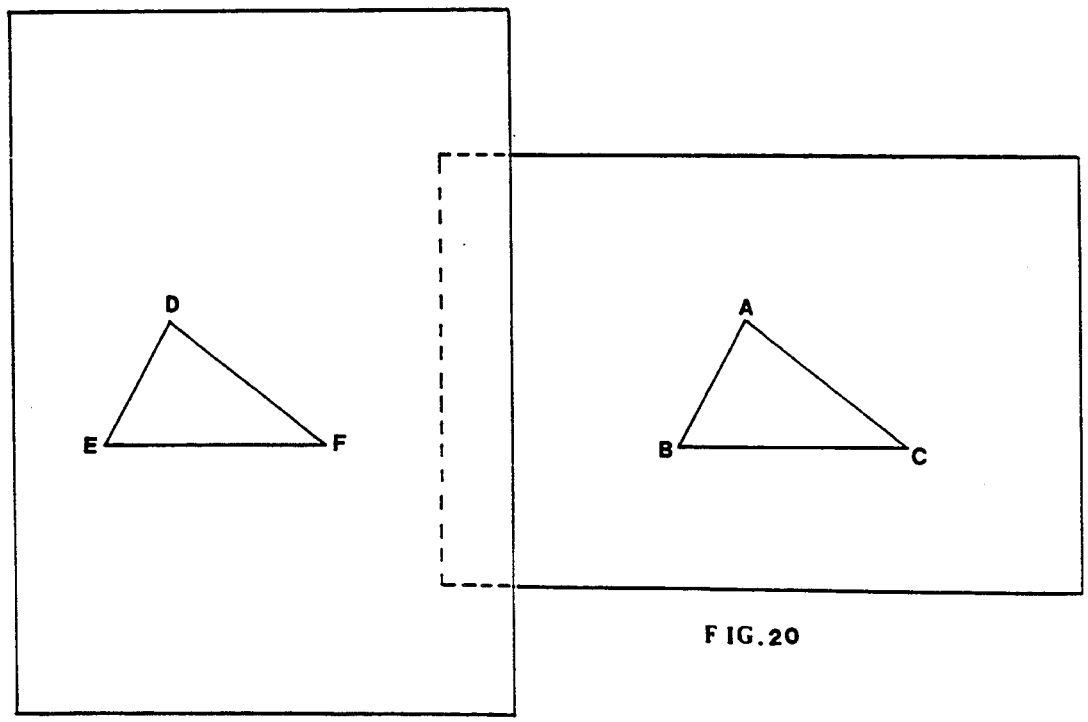

FIG. 20, a teaching aid adapted for use to demonstrate geometric problem solving which apply SSS, SAS, and ASA postulates to prove triangles congruent in two-column proof format. The superimposed image picture which represents triangle DEF can be remounted in three additional different settings as illustrated previously.

Figure 21:
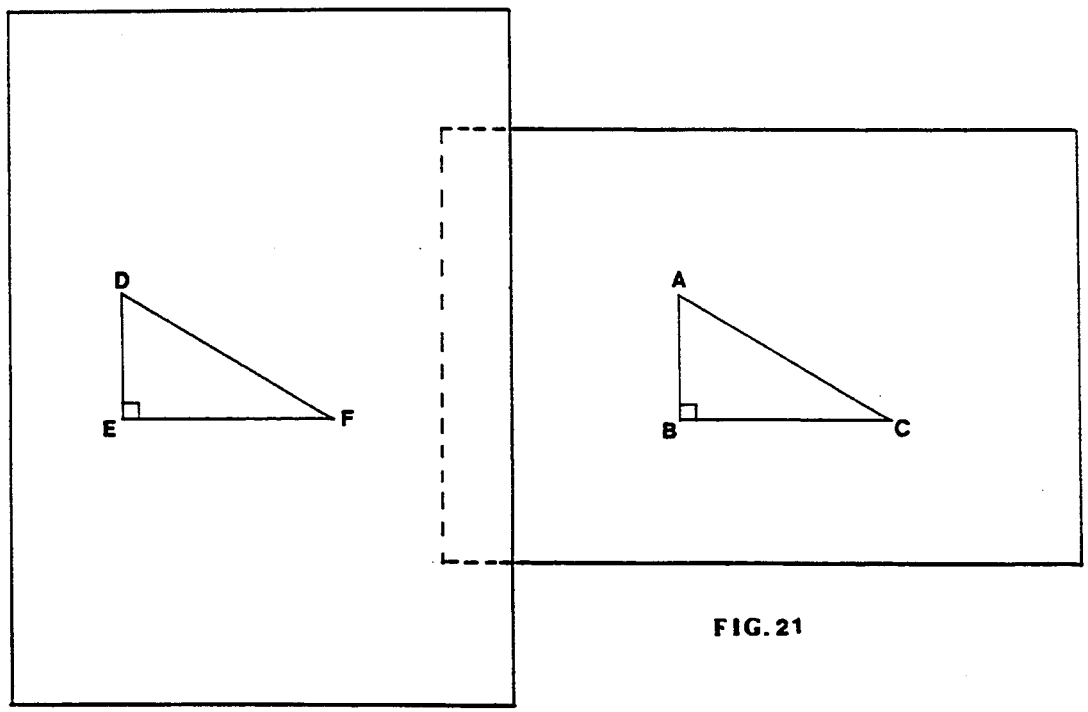

FIG. 21, a teaching aid adapted for use to demonstrate geometric problem solving which apply SSS, SAS, ASA postulates; HL, and HA theorems to prove triangles congruent in two-column proof format. The superimposed picture image which represents triangle DEF can be remounted in three additional different settings as illustrated previously.

Figure 22:
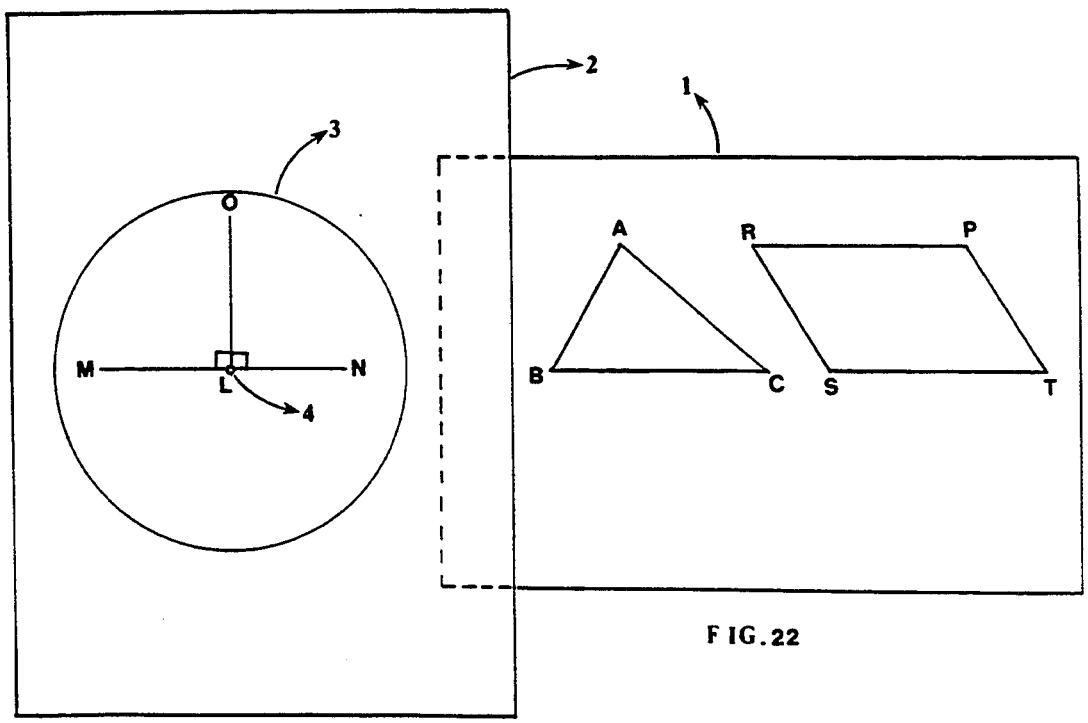

FIG. 22, a teaching aid adapted for use to demonstrate geometric definitions of the altitudes of a triangle and a parallelogram. The rotating circular flat surface including MN perpendicular to OL.

Figure 23:
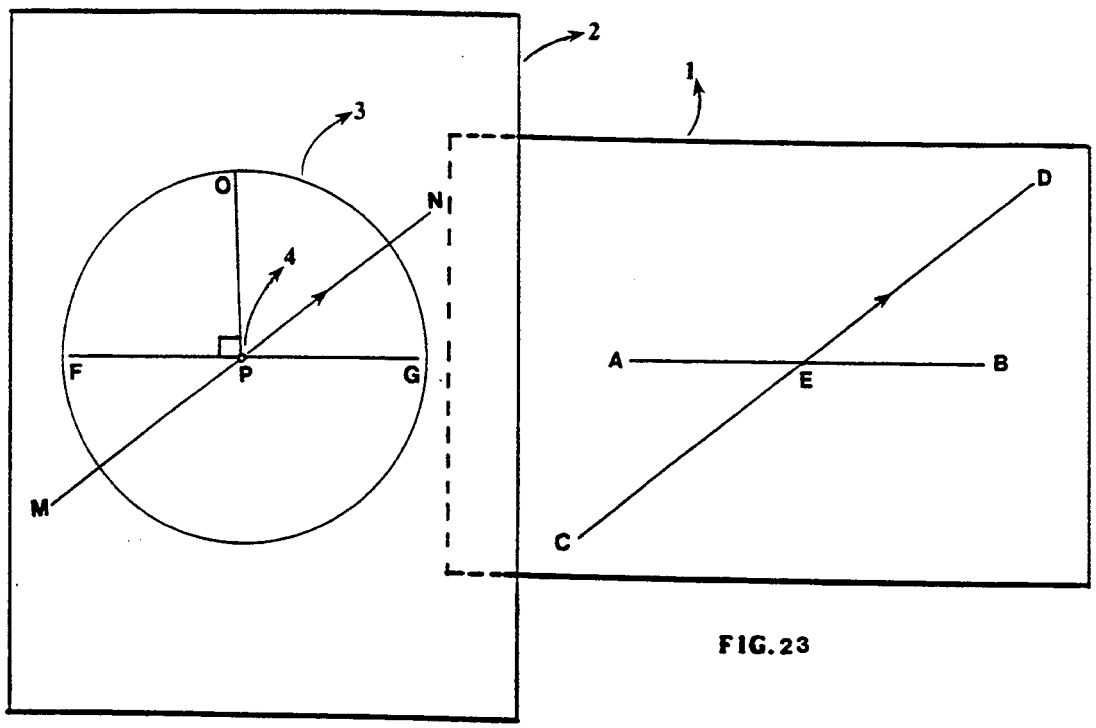
FIGS. 23, 24, 62–66, 83–86, 92, 94, and 96, front views, in elevations of teaching aid devices for rotating and translating pictoral images in orthogonal dimensions with respect to stationary pictures, wherein each of these figures illustrates base member 1, which includes a first graphical representation; composite overlay member including a circular flat surface 3 with a second graphical representation, pivotally mounted with its center 4 on a transparent flat surface 2, wherein transparent flat surface 2 including a third graphical representation.

FIG. 23, the flat surface of composite overlay member including line MN and the rotating circular flat surface including segment FG perpendicular to radius PO. This teaching aid is adapted for use to demonstrate a geometric definition of perpendicular lines and a geometric theorem "Two parallel lines are equidistant at all points."

Figure 24:
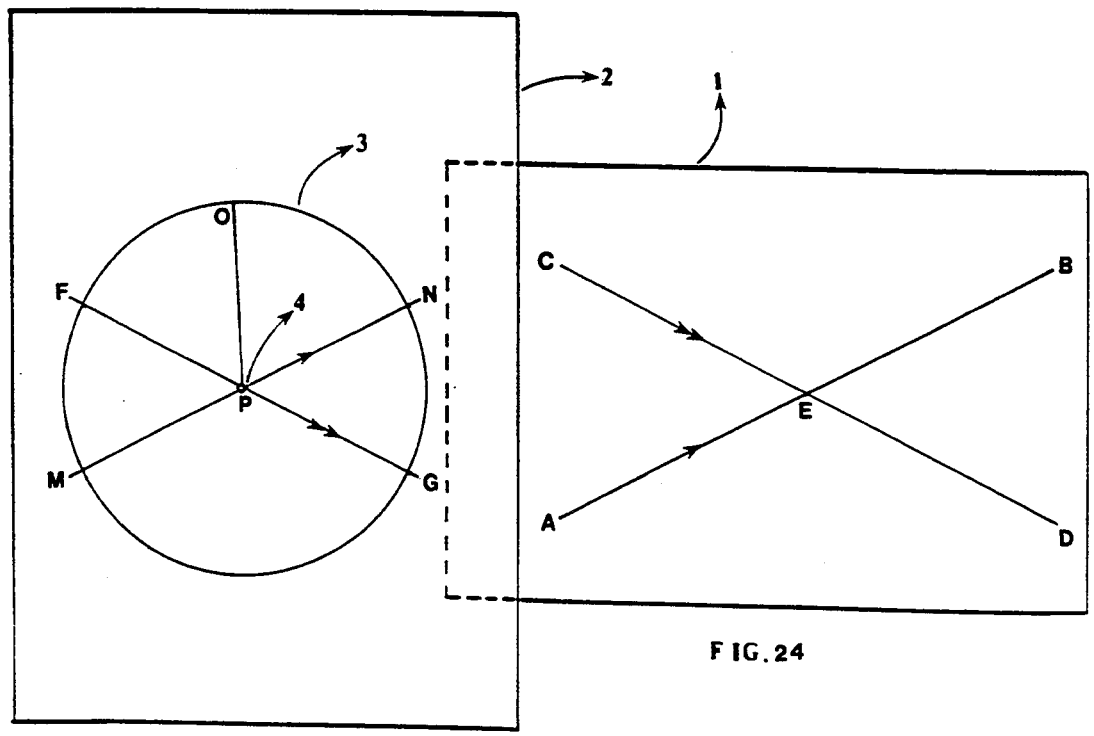

FIG. 24, the flat surface of composite overlay member including lines MN and FG and the rotating circular flat surface including radius PO. This teaching aid is adapted for use to demonstrate a geometric definition of a rhombus and a geometric theorem "The diagonals of a rhombus bisect the opposite angles."

Figure 25:
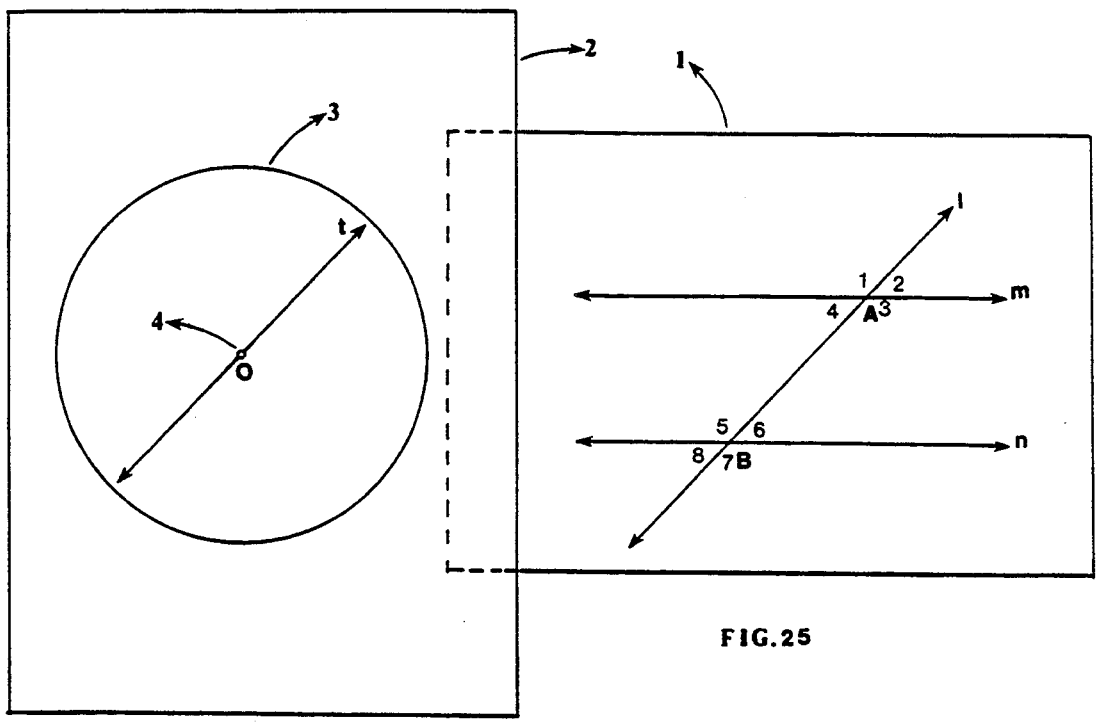

FIG. 25, a teaching aid adapted for use to demonstrate geometric problem solving for parallel lines cut by a transversal.

Figure 26:
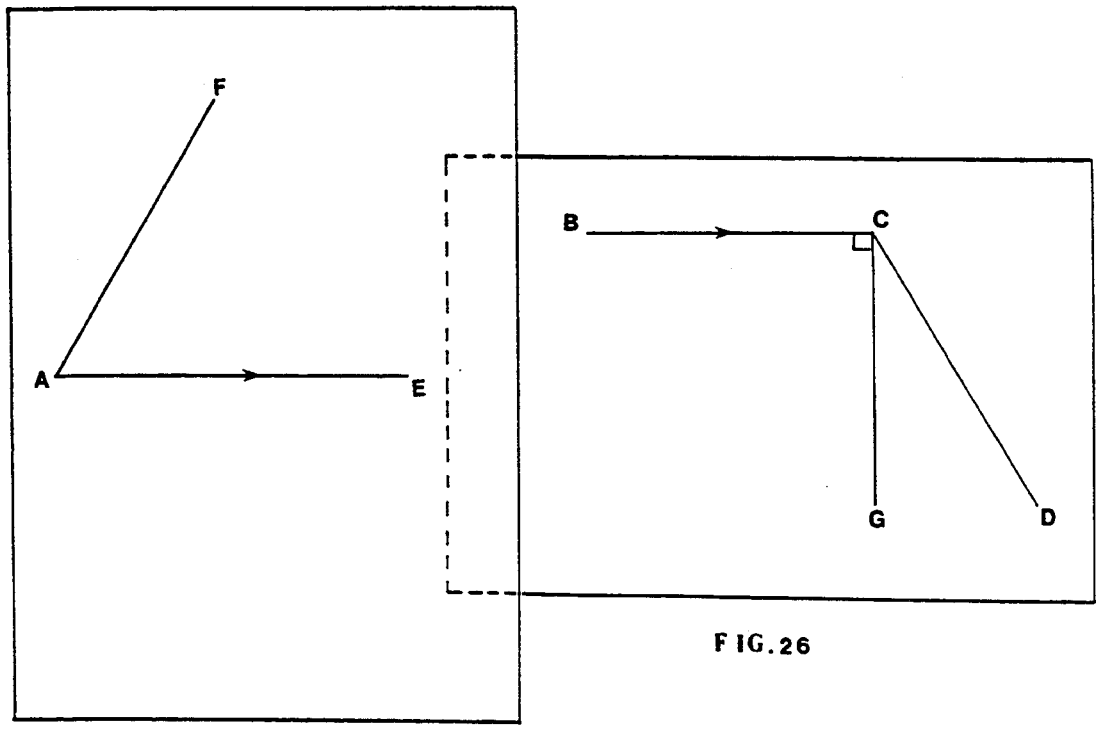

FIG. 26, a teaching aid adapted for use to demonstrate geometric definitions of an isosceles trapezoid and the altitude of isosceles trapezoid. It also illustrates a geometric theorem, "Each pair of base angles of an isosceles trapezoid are congruent."

Figure 27:
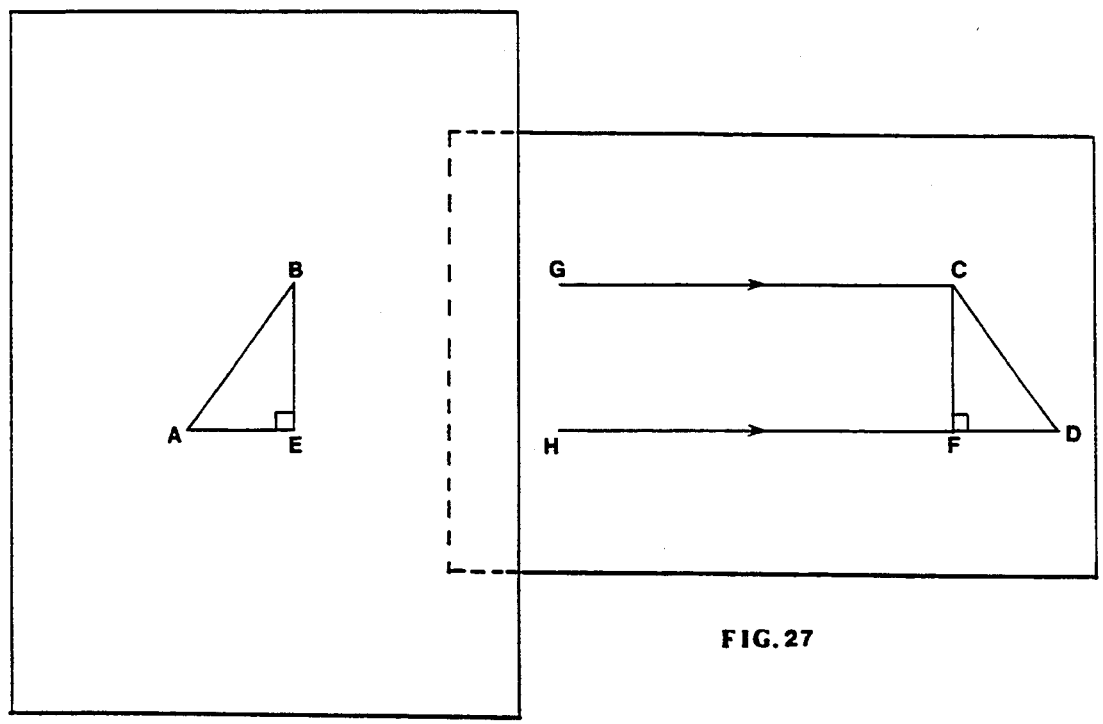

FIG. 27, a teaching aid adapted for use to demonstrate the proof of a geometric theorem, "Each pair of base angles of an isosceles trapezoid are congruent."

Figure 28:
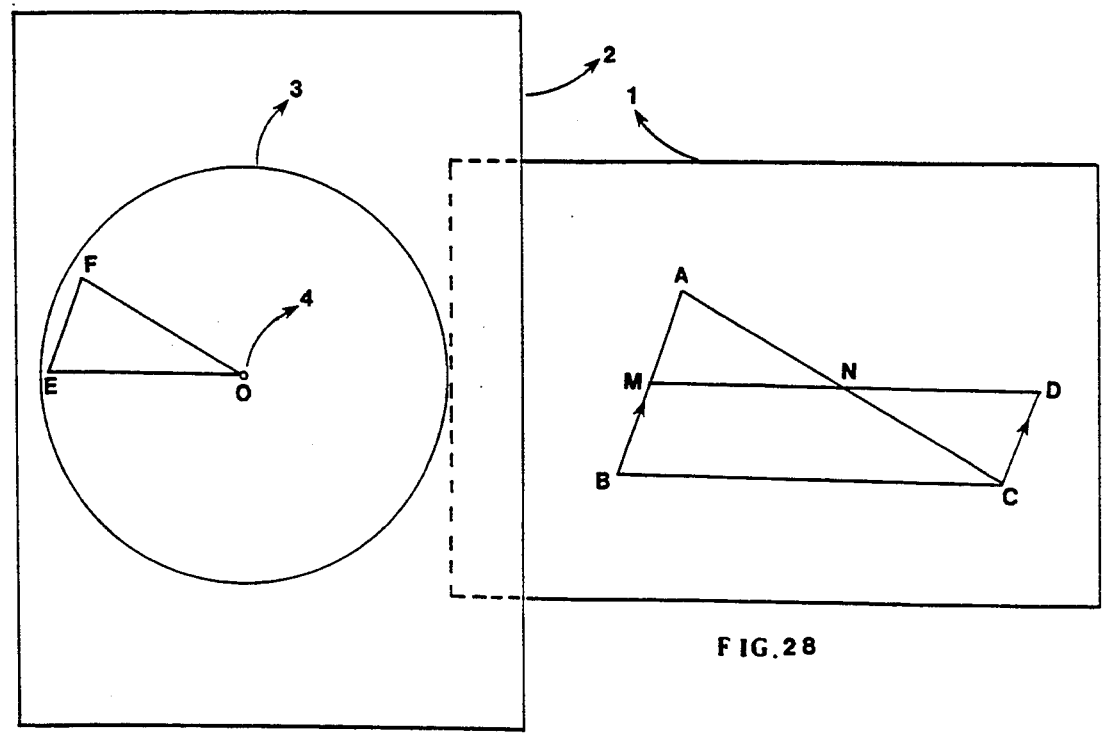

FIG. 28, a teaching aid adapted for use to demonstrate the proof of a geometric theorem, "The segment that joins the midpoints of two sides of a triangle is parallel to the third side and its length equals to half the length of the third side."

Figure 29:
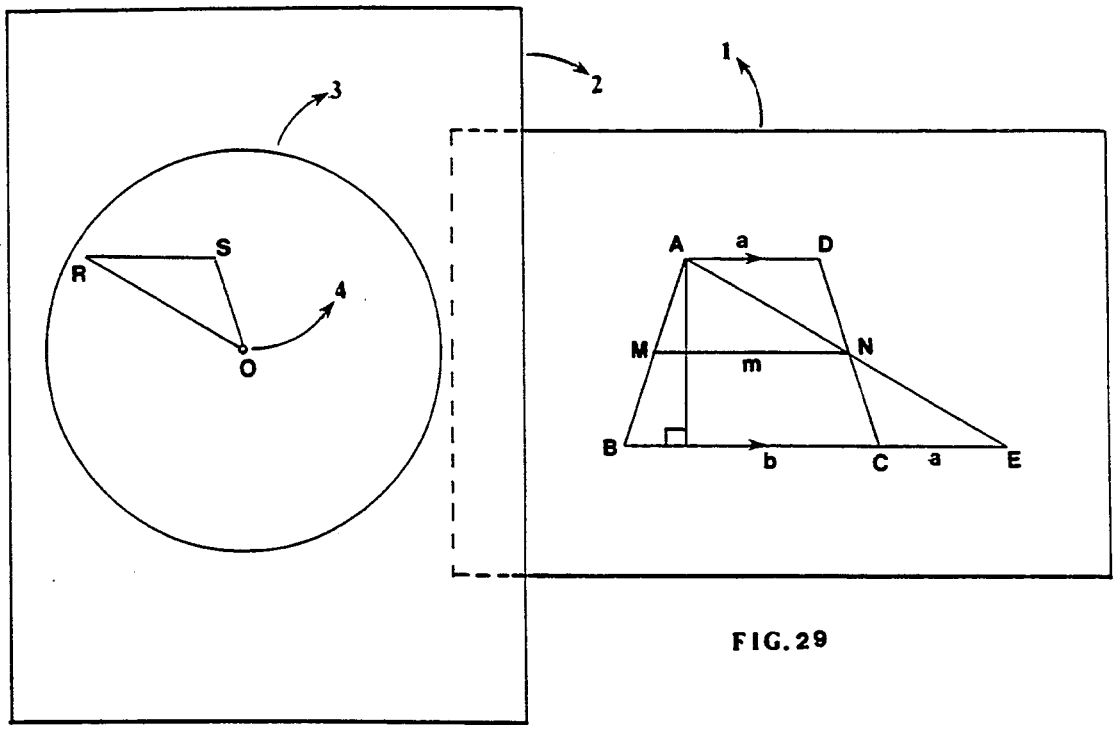

FIG. 29, a teaching aid adapted for use to demonstrate the proof of two geometric theorems, "The median of a trapezoid is parallel to the bases and its length equals to half the sum of the lengths of the bases." and "The area of a trapezoid equals one-half the product of the height and the sum of the two bases."

Figure 30:
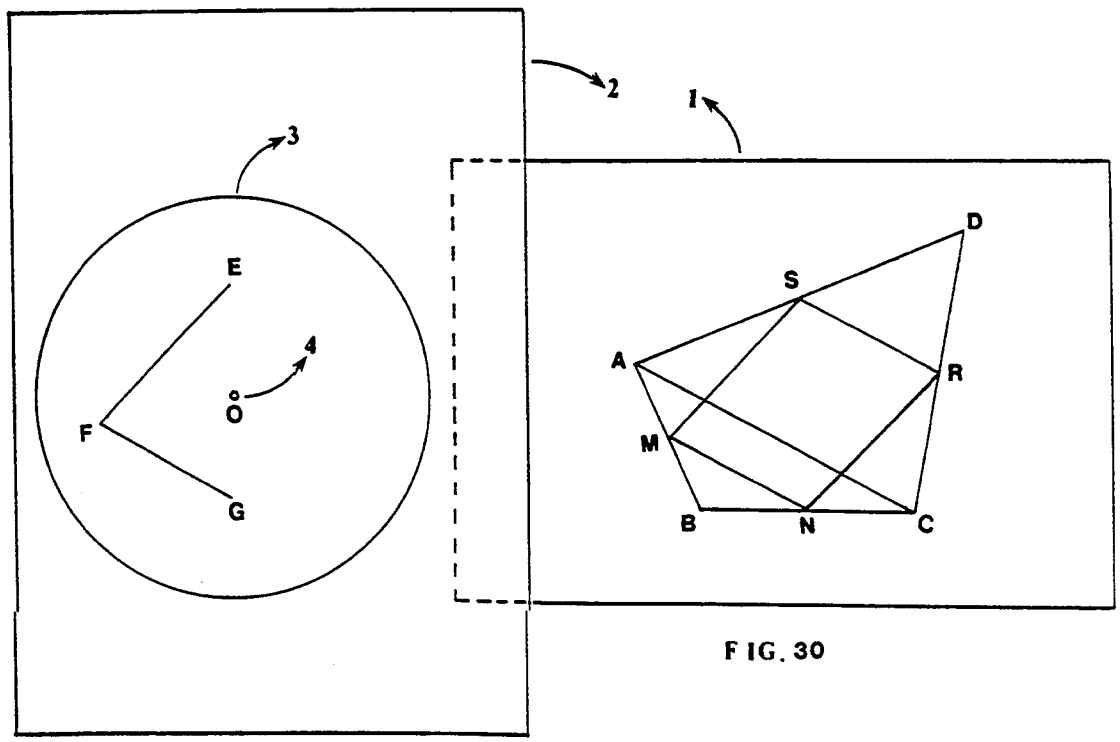

FIG. 30, a teaching aid adapted for use to demonstrate a geometric theorem, "The segments that join the midpoints of the consecutive sides of a quadrilateral from a parallelogram.

Figure 31:
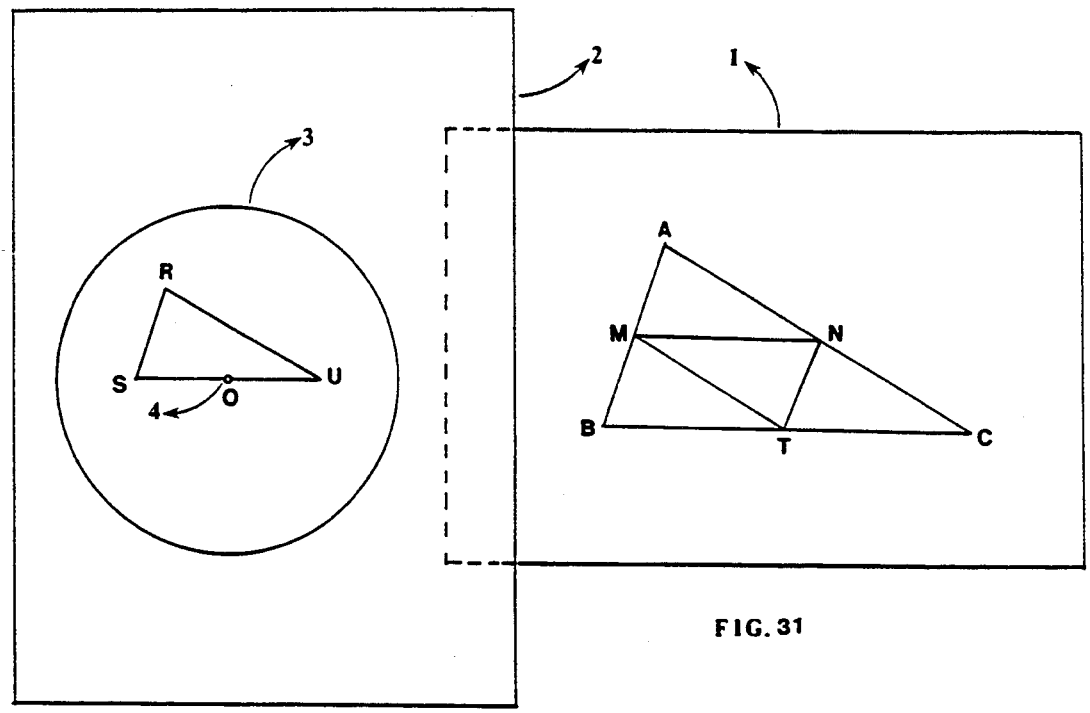

FIG. 31, a teaching aid adapted for use to demonstrate a geometric problem "The segments that join the midpoints of the sides of a triangle form congruent triangles, each is similar to the original triangle."

Figure 32:
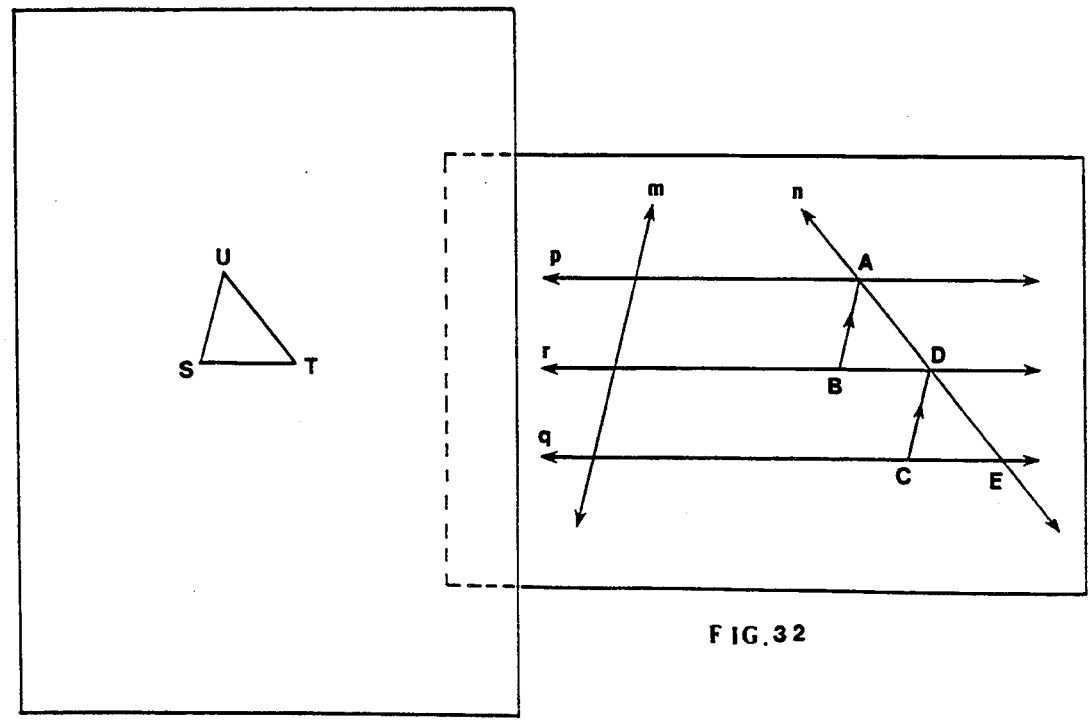

FIG. 32, a teaching aid adapted for use to demonstrate the proof of a geometric theorem, "If three or more parallel lines intercept equal segments on one transversal, then they intercept equal segments on every transversal."

Figure 33:
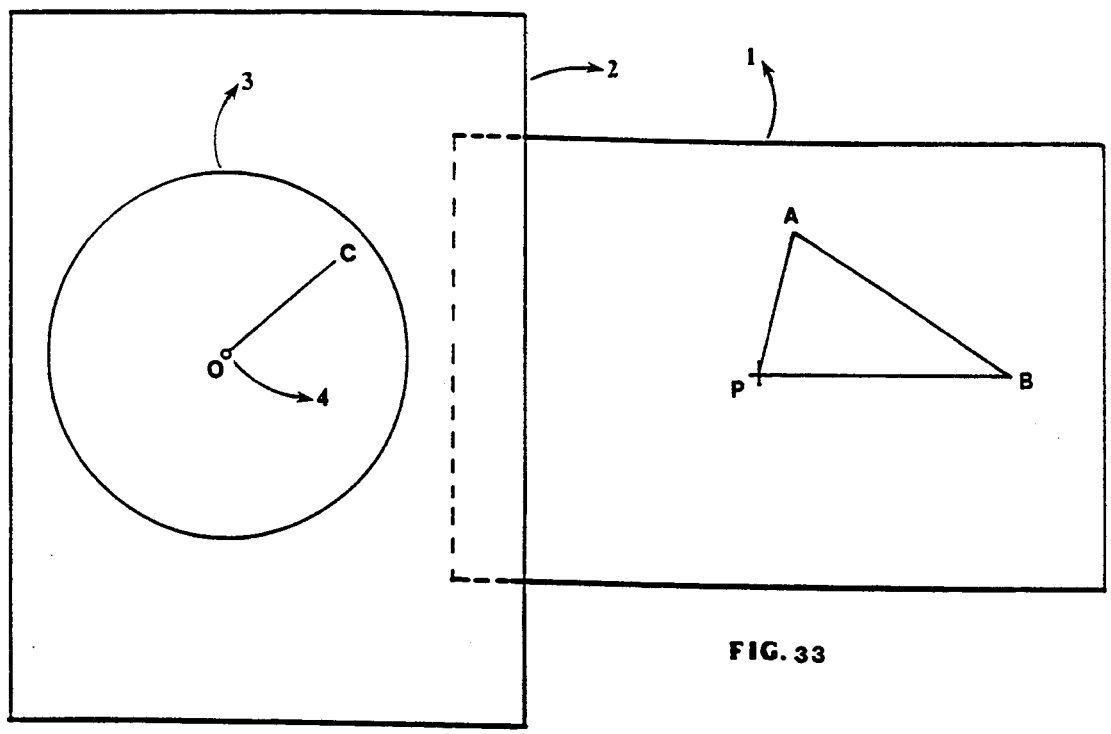

FIG. 33, a teaching aid adapted for use to demonstrate a geometric theorem, "If two sides of a triangle are unequal, then the angles opposite these sides are unequal and the measure of the angle opposite the longer side is greater than the measure of the angle opposite the shorter side."

Figure 34:
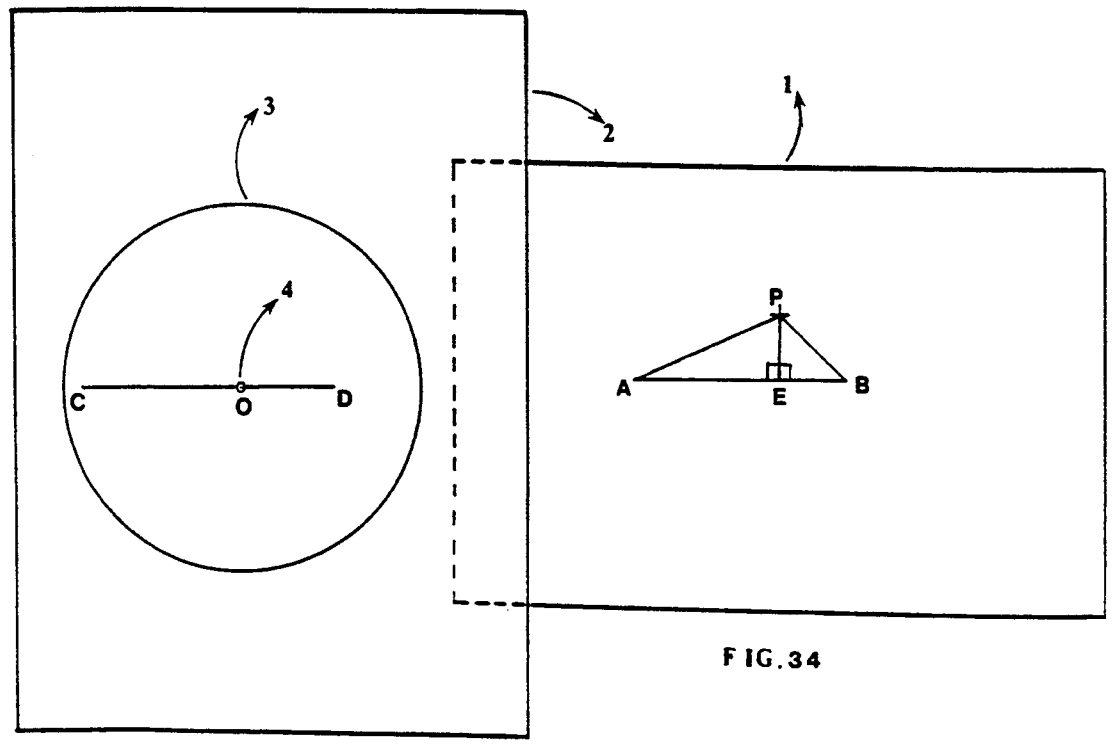

FIG. 34, a teaching aid adapted for use to prove a geometric theorem, "The sum of the lengths of any two sides of a triangle is greater than the length of the third side."

Figure 35:
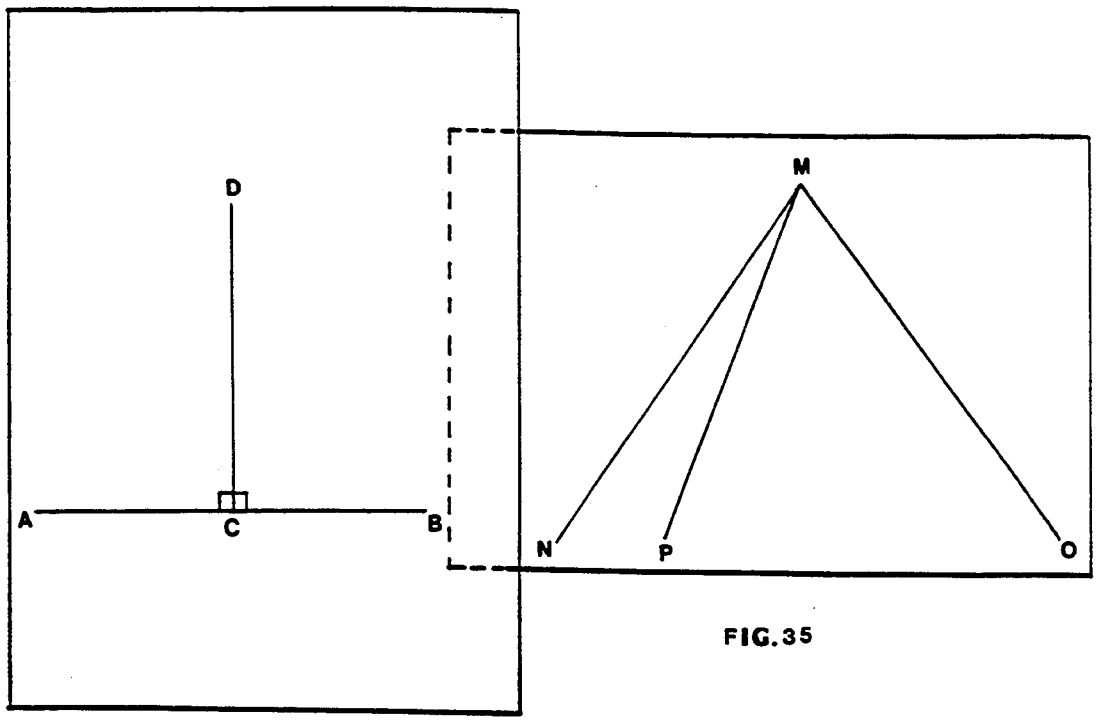

FIG. 35, a teaching aid adapted for use to demonstrate geometric theorems; "If two sides of a triangle are congruent, then the angles opposite those sides are congruent." and "In a triangle, if two angles of a triangle are unequal, then the lengths of the sides opposite those angles are unequal, and the side opposite the larger angle is longer than the side opposite the smaller angle."

Figure 36:
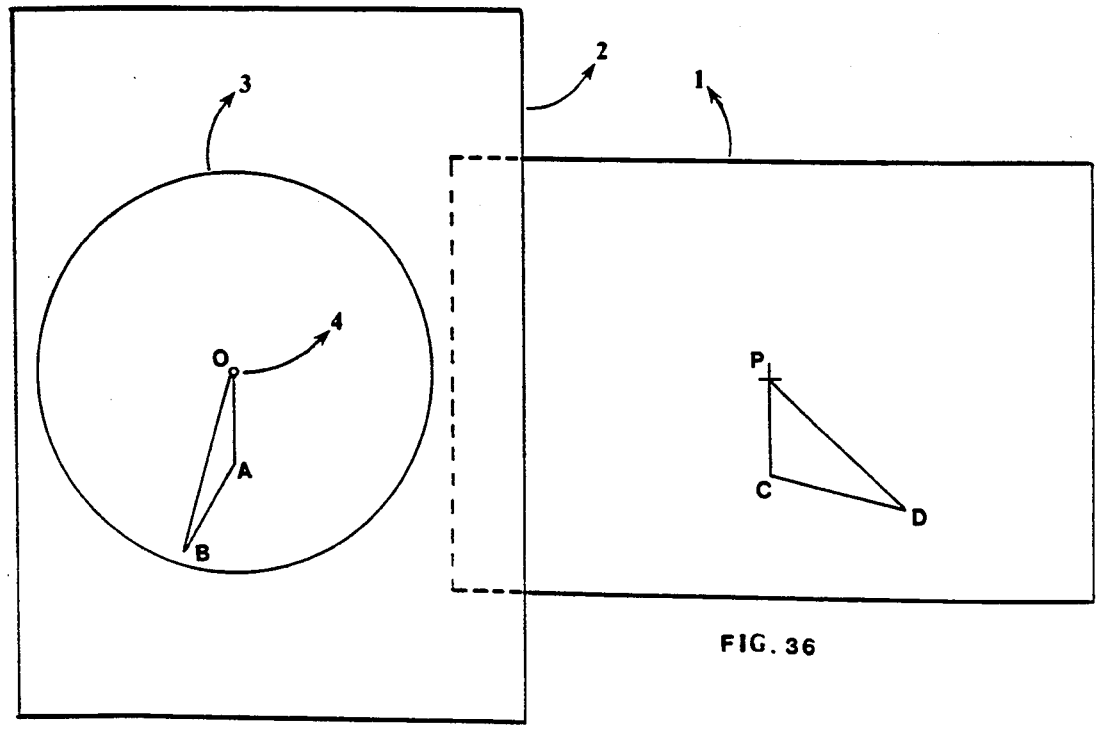

FIG. 36, a teaching aid adapted for use to demonstrate a geometric theorem, "If two sides of a triangle are congruent to two sides in a second triangle and the included angle of the first triangle is greater than the included angle of the second triangle, then the third side of the first triangle is longer than the third side of the second triangle."

Figure 37:
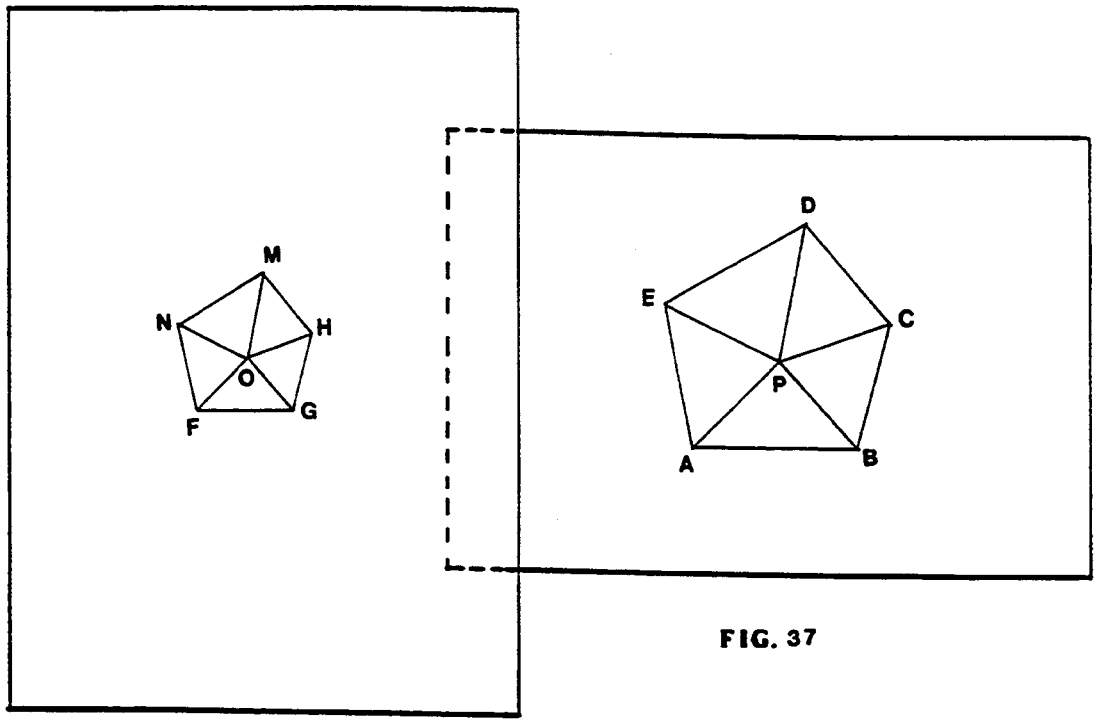

FIG. 37, a teaching aid adapted for use to demonstrate geometric property of similar polygons, "If two polygons are similar, then their corresponding angles are congruent and their corresponding sides are proportional."

Figure 38:
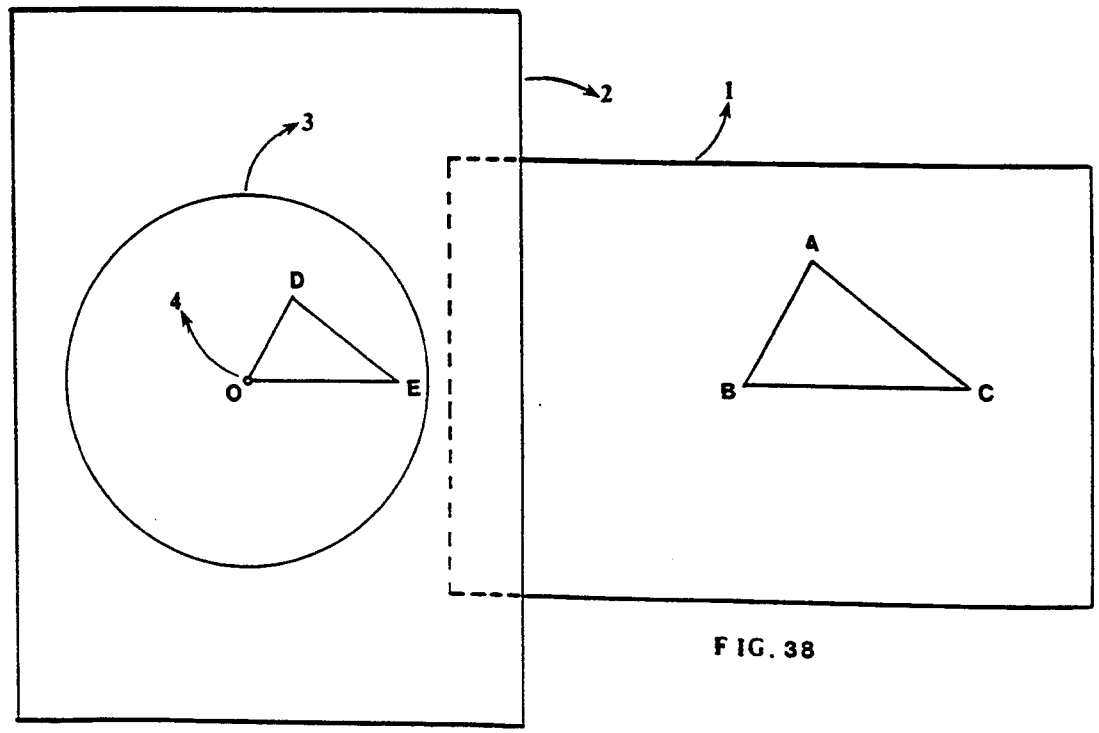

FIG. 38, a teaching aid adapted for use to demonstrate geometric theorems of similar triangles. "Two triangles are similar if two angles of one triangle are congruent to two corresponding angles in another triangle," and "If an angle of one triangle is congruent to an angle of another triangle, and if the sides including these angles are proportional, then the triangles are similar."

Figure 39:
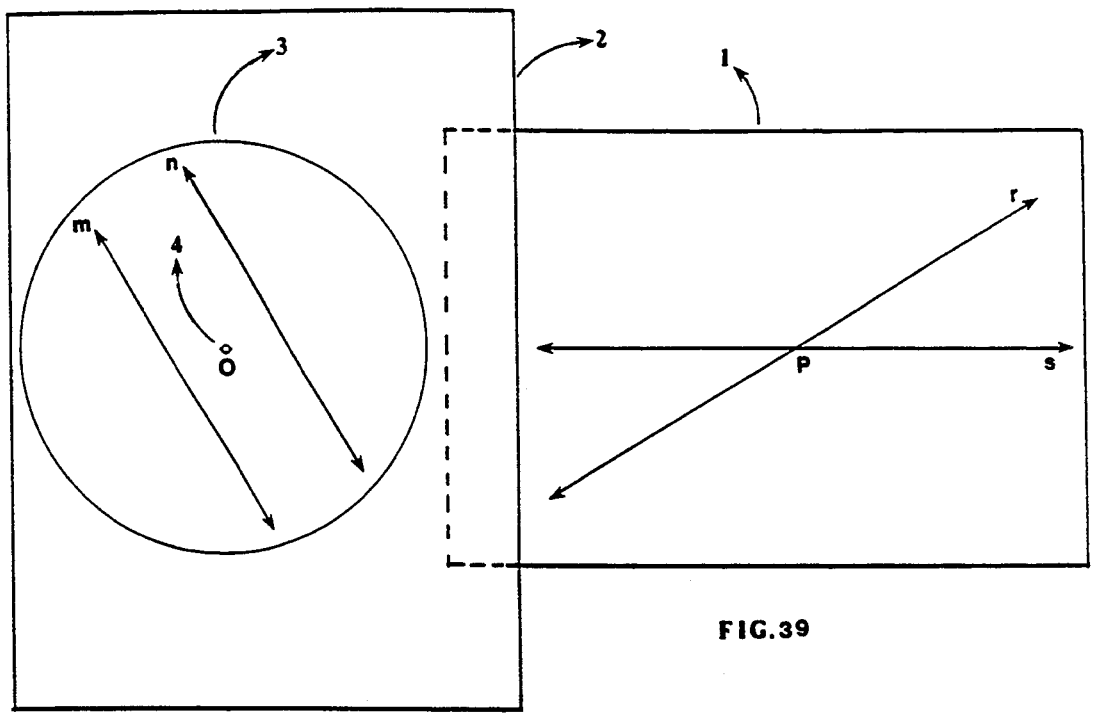

FIG. 39, a teaching aid adapted for use to demonstrate geometric problems as application on similar triangles.

Figure 40:
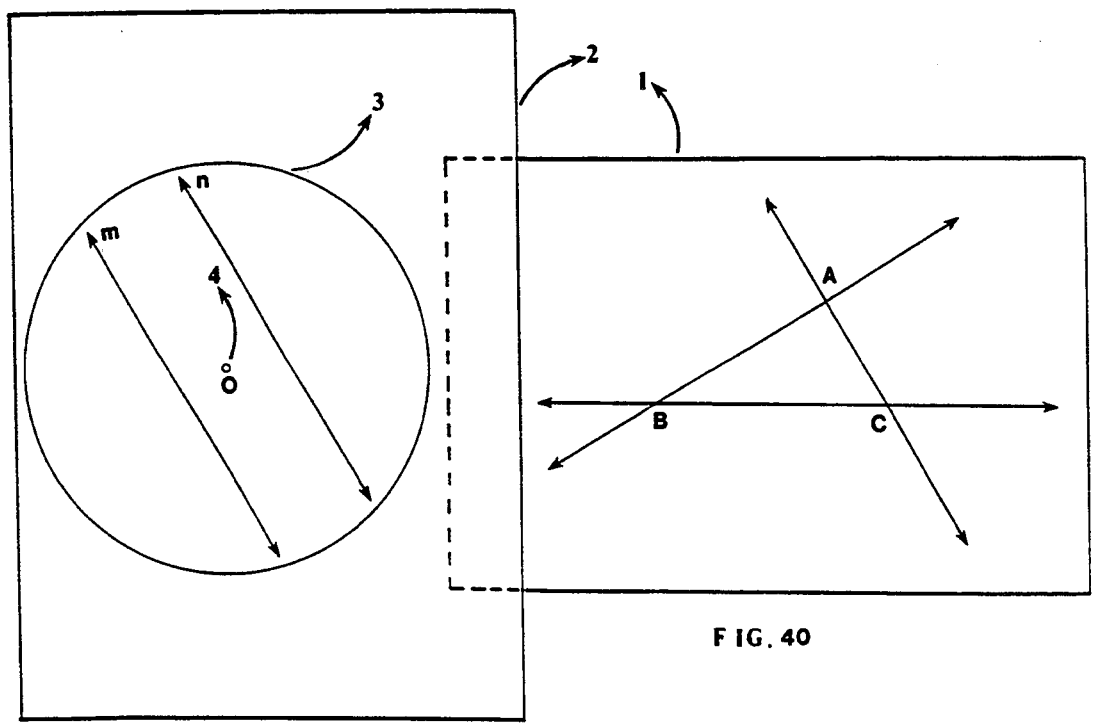

FIG. 40, a teaching aid adapted for use to demonstrate geometric problems as additional application on similar triangles.

Figure 41:
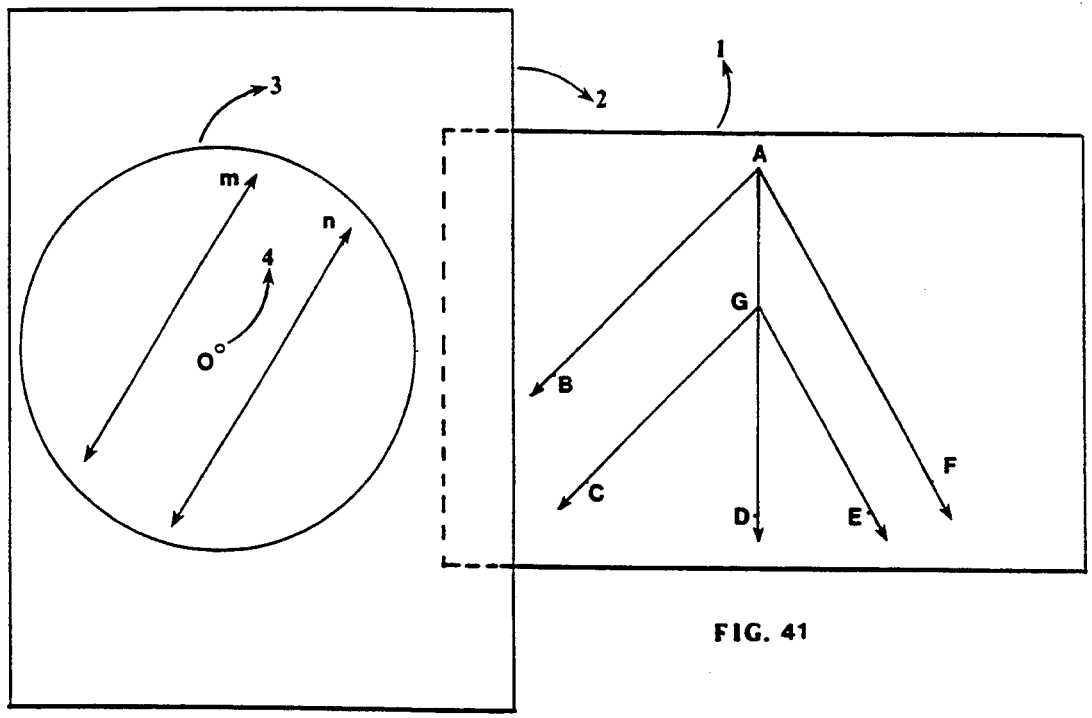

FIG. 41, a teaching aid adapted for use to demonstrate geometric problems for plurality of similar triangles.

Figure 42:
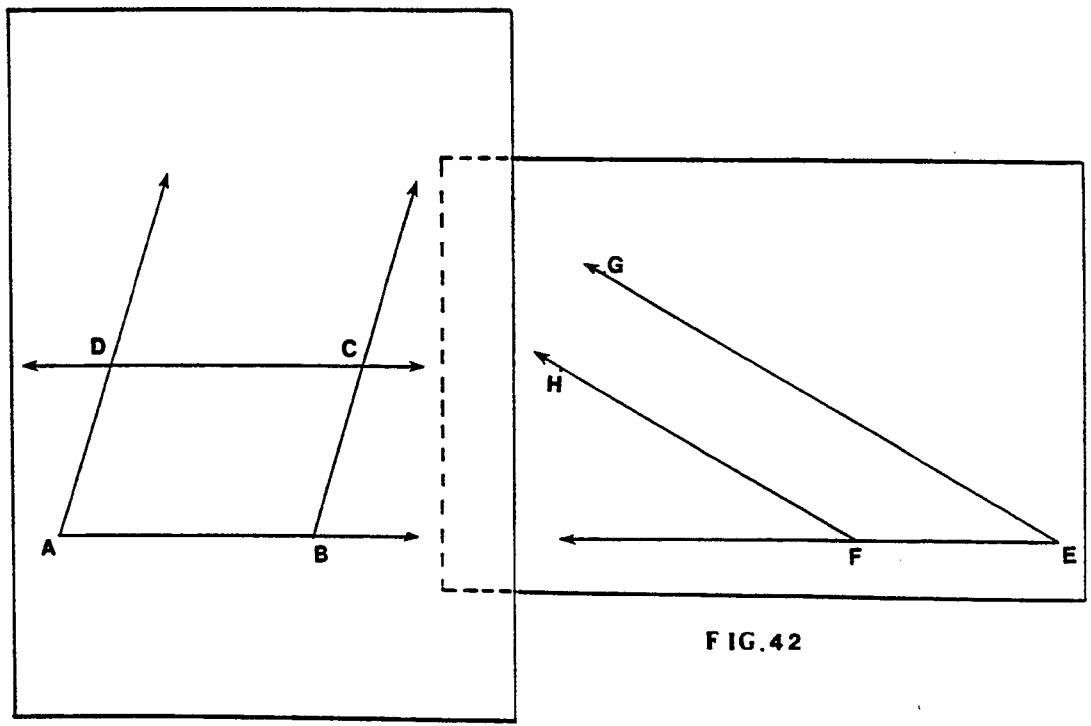

FIG. 42, a teaching aid adapted for use to demonstrate additional geometric problems on similar triangles.

Figure 43:
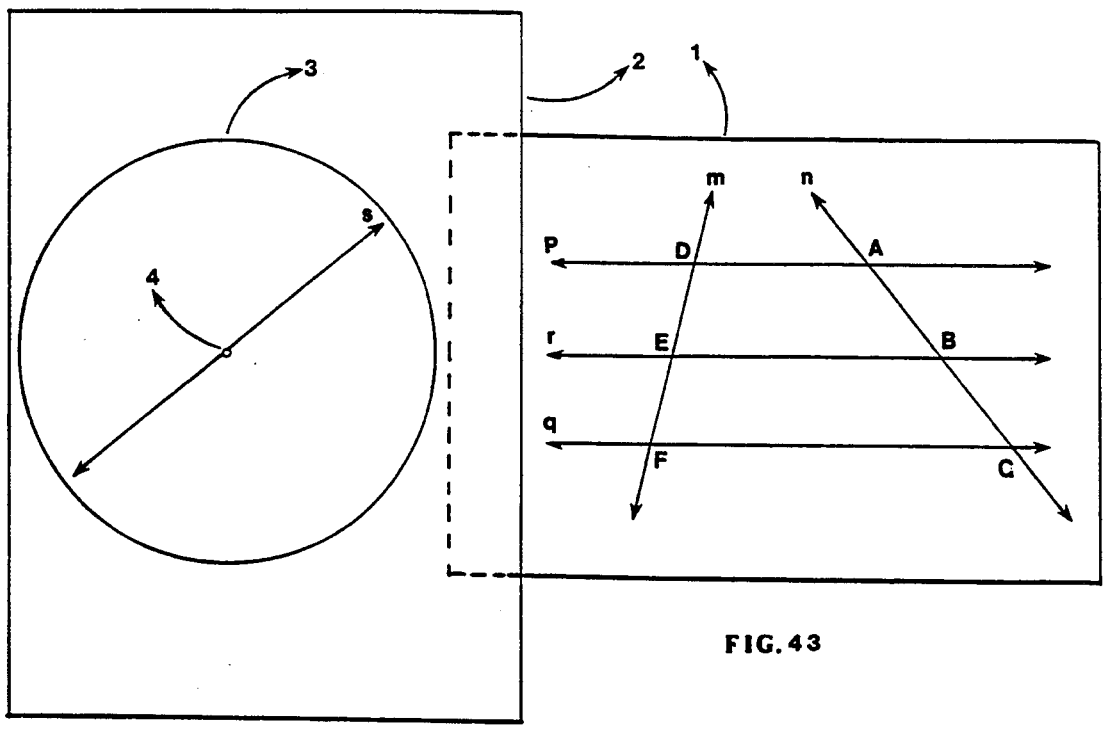

FIG. 43, a teaching aid adapted for use to prove a geometric theorem, "If three or more parallel lines intercept equal segments on one transversal, then they intercept equal segments on every transversal." The device illustrated in FIG. 32 is also applied to prove the same theorem.

Figure 44:
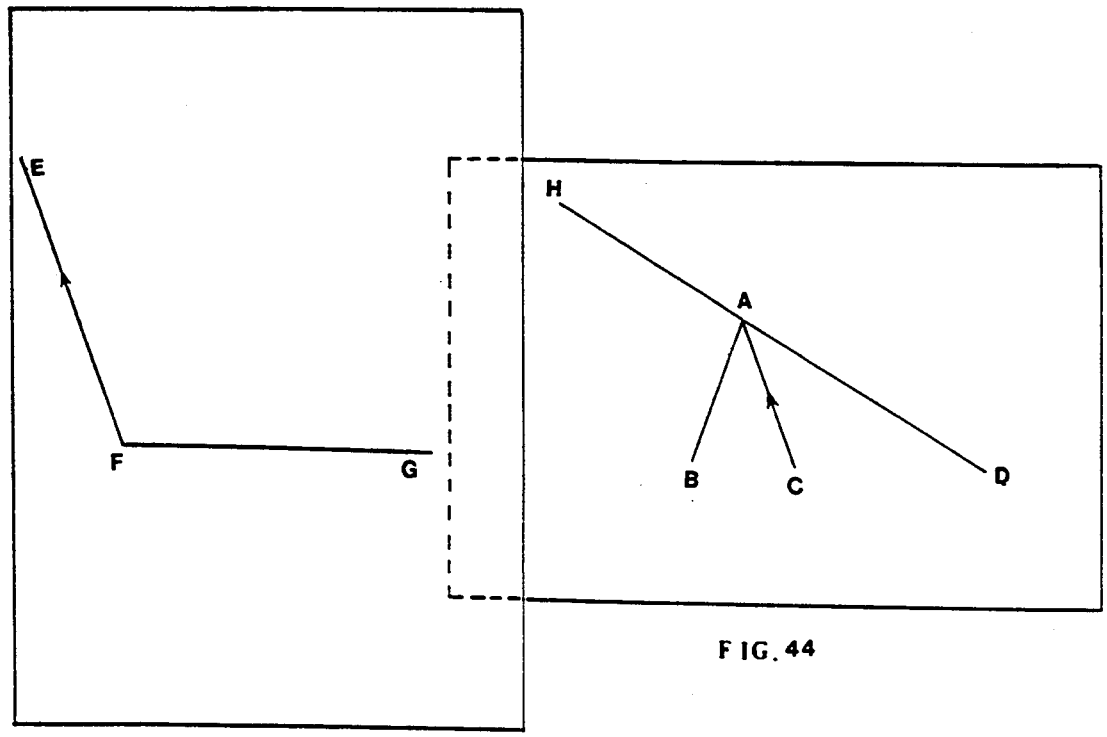

FIG. 44, a teaching aid adapted for use to prove a geometric theorem, "The bisector of an angle of a triangle divides the opposite side into two segments which are proportional to the adjacent sides.

Figure 45:
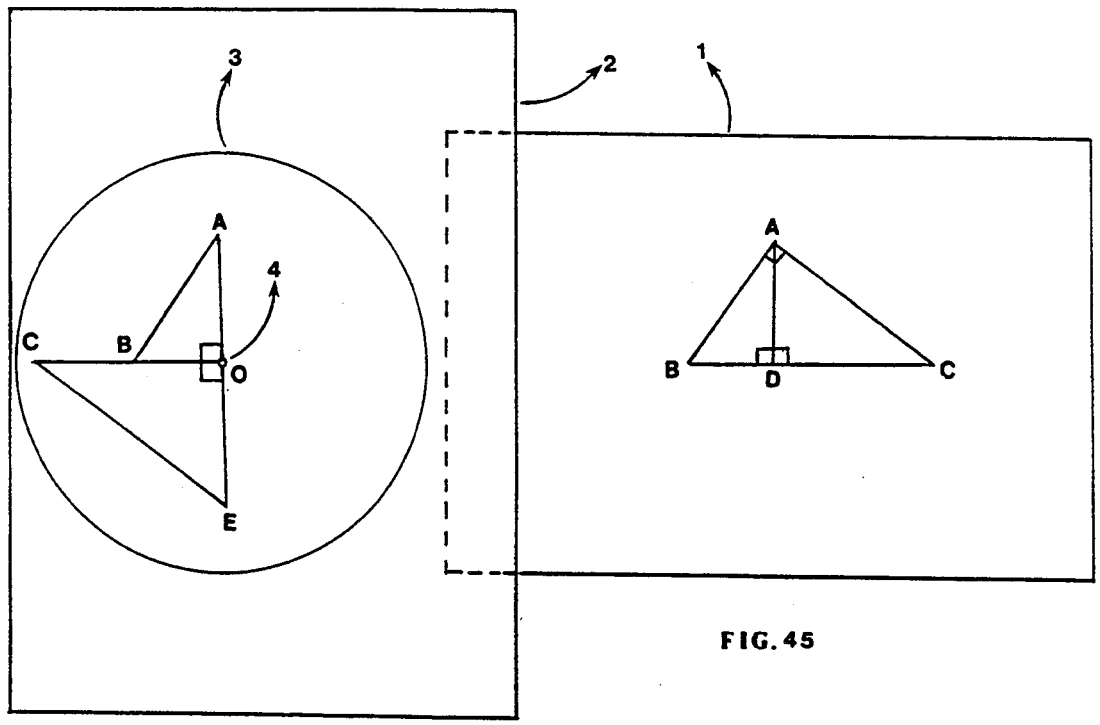

FIG. 45, a teaching aid adapted for use to prove a geometric theorem, "In a right triangle, the altitude to the hypotenuse divides the triangle into two triangles which are similar to each other and to the original triangle.

Figure 46:
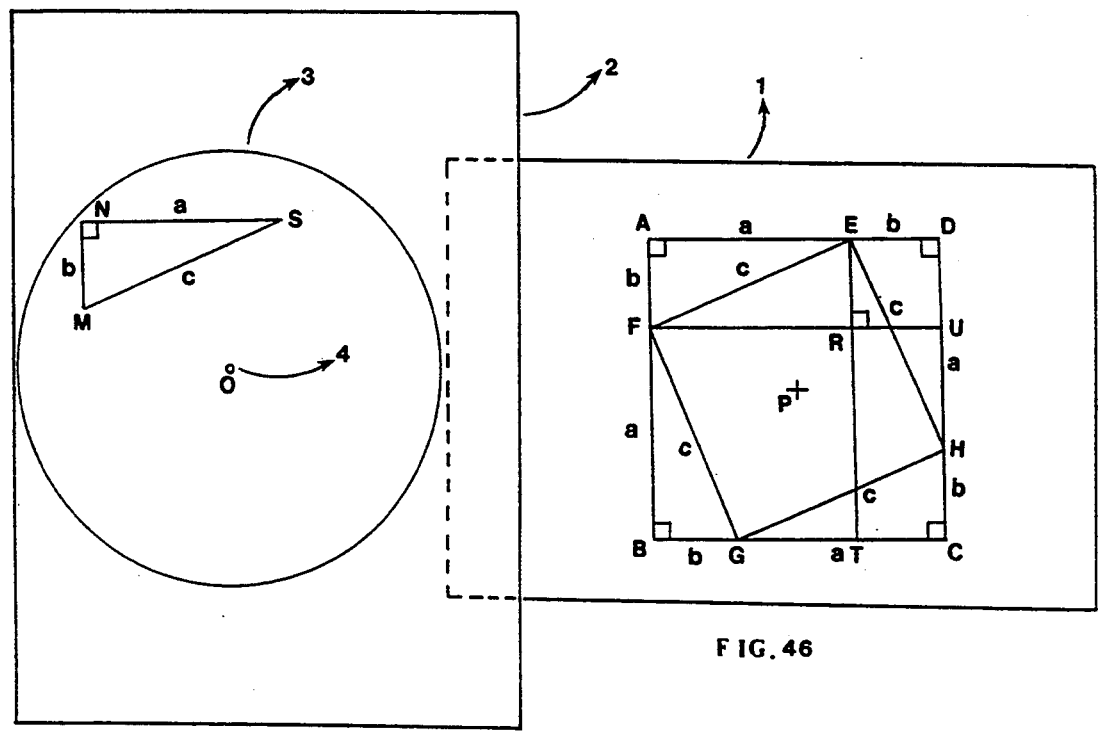

FIG. 46, a teaching aid adapted for use to prove the Pythagorean theorem in geometry, "In a right triangle, the square of the length of the hypotenuse equals the sum of the squares of the lengths of the legs."

Figure 47:
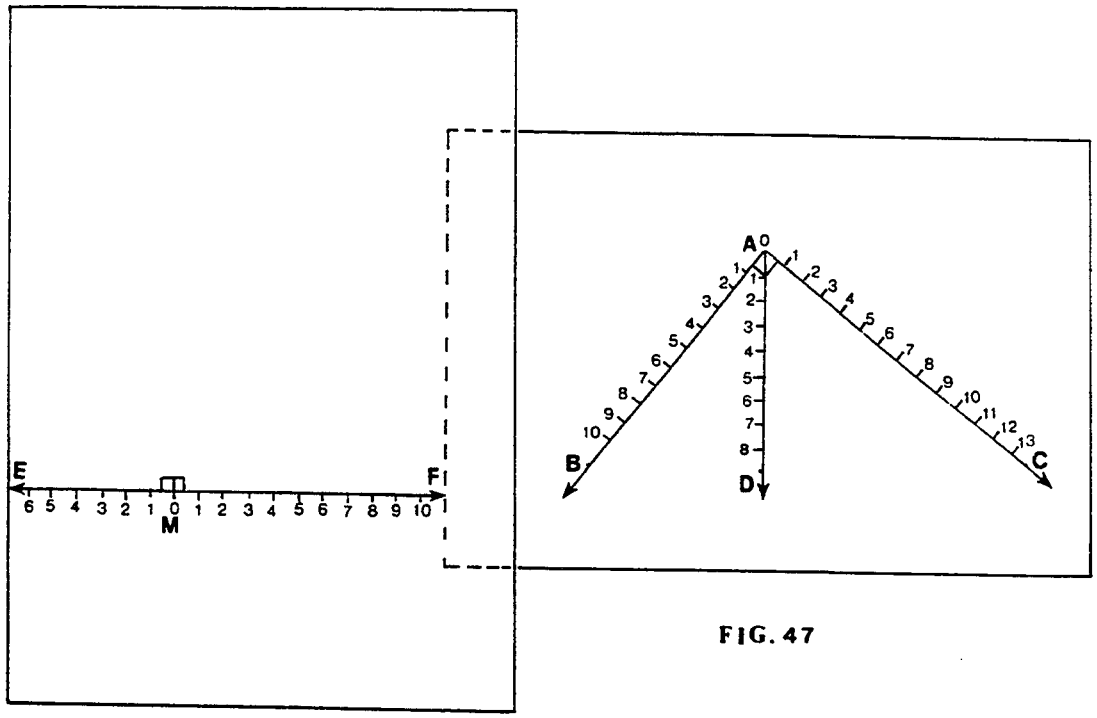

FIG. 47, a teaching aid adapted for use to demonstrate application of a geometric theorem, "In a right triangle, the square of the altitude to the hypotenuse equals the product of the two segments on the hypotenuse; and the square of a leg equals the product of the hypotenuse and the segment of the hypotenuse adjacent to that leg."

Figure 48:
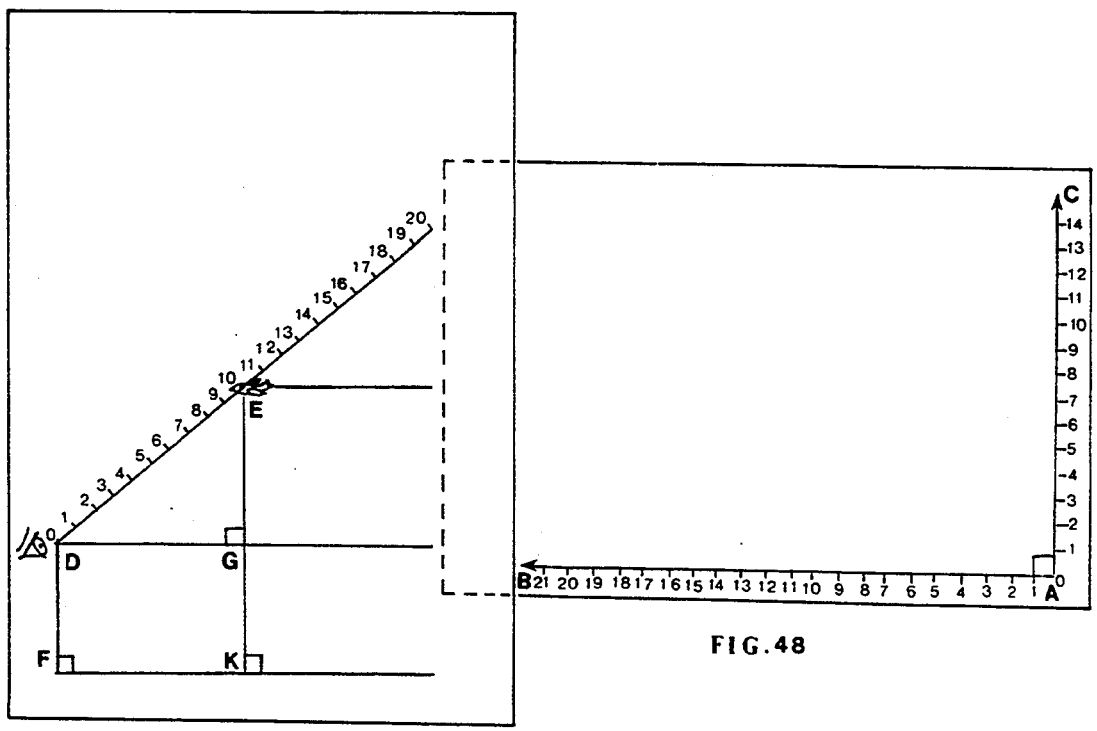

FIG. 48, a teaching aid adapted for use to demonstrate geometric problem solving as application on angles of elevation and similar right triangles.

Figure 49:
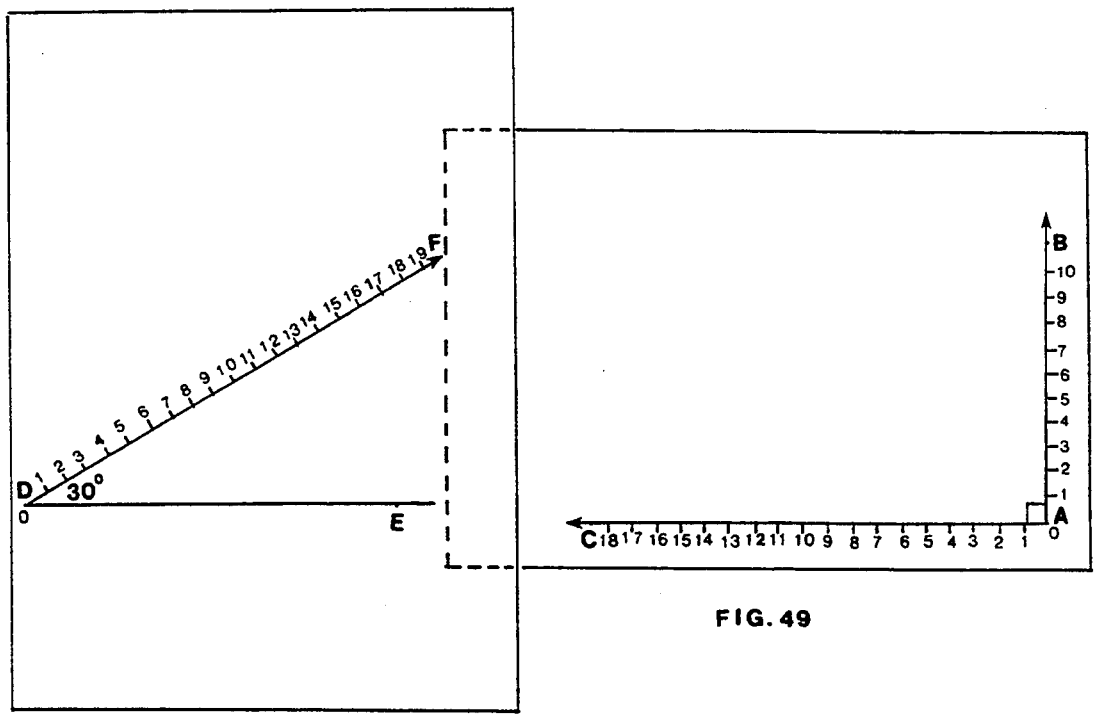
Figure 50:
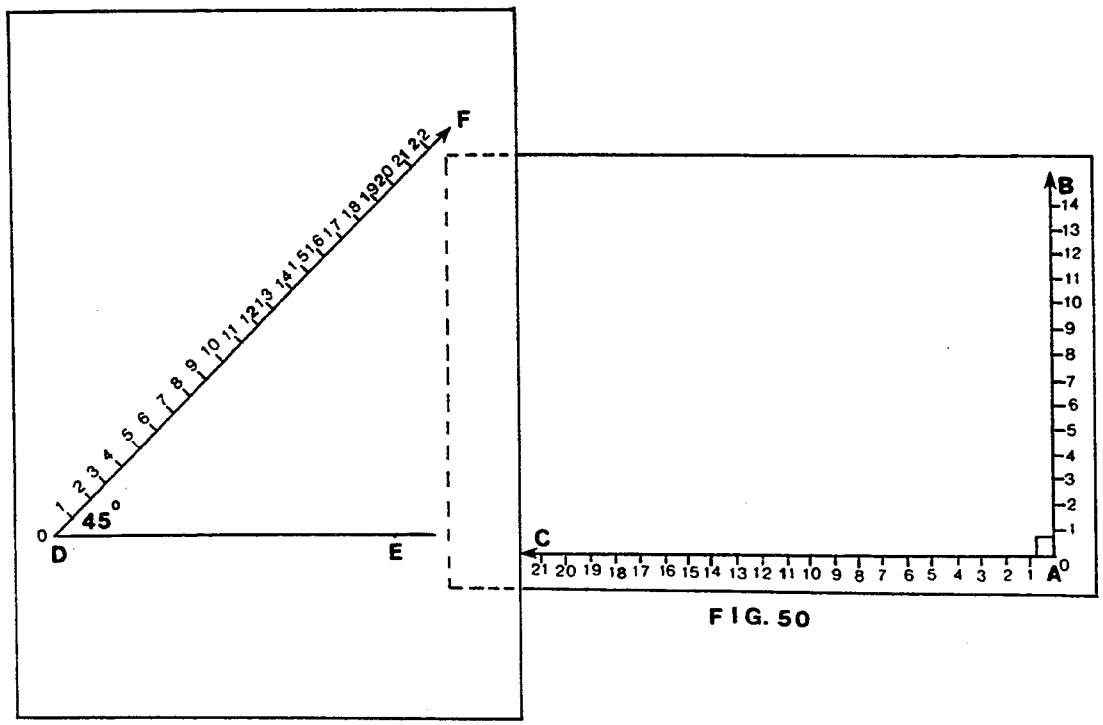

FIGS. 49 and 50 are teaching aids adapted for use to demonstrate geometric problems as application on special right triangles 30°–60°–90° and 45°–45°–90° respectively.

Figure 51:
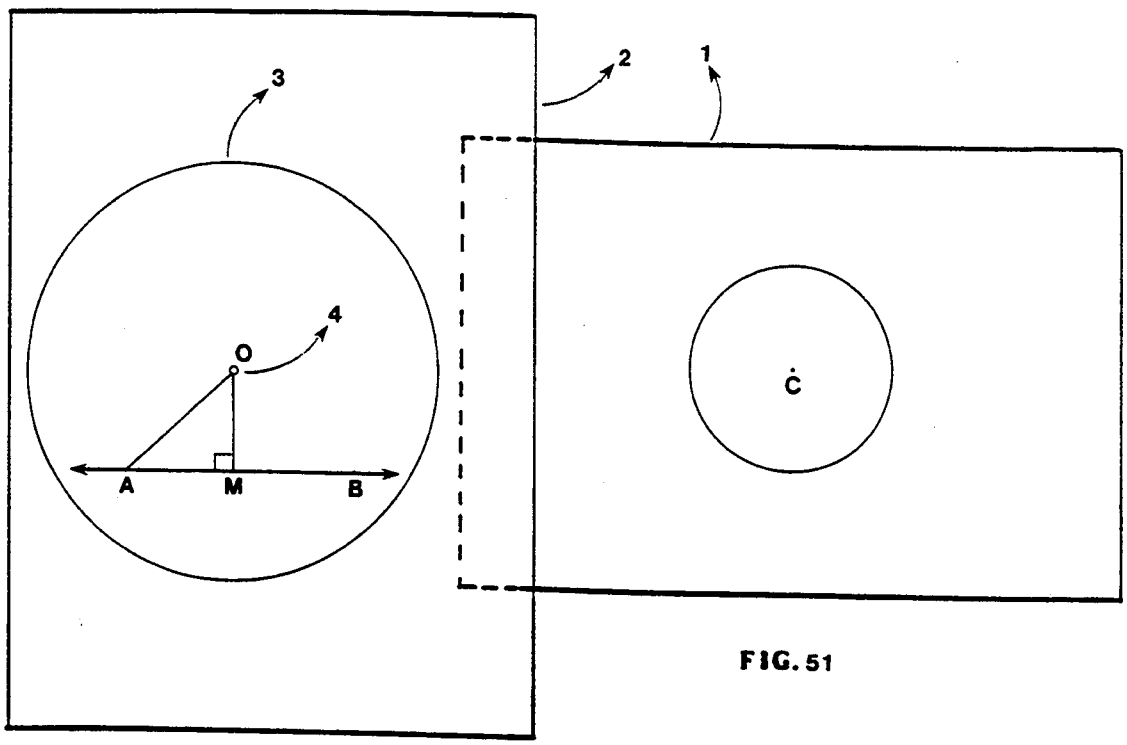

FIG. 51, a teaching aid adapted for use to prove two geometric theorems. "The tangent line to a circle is perpendicular to the radius at the point of tangency." and "a line perpendicular to a radius of a circle at a point on the circle is tangent to a circle."

Figure 52:
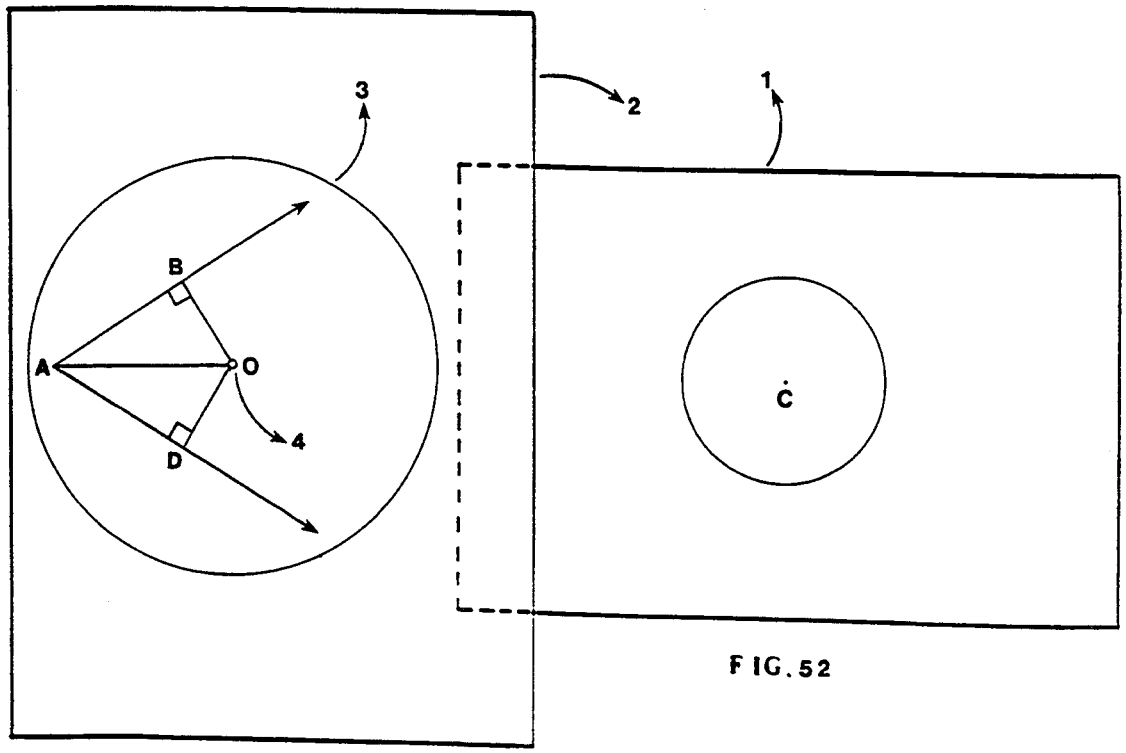

FIG. 52, a teaching aid adapted for use to prove a geometric theorem, "The lengths of two tangent segments from an exterior point of a circle are congruent."

Figure 53:
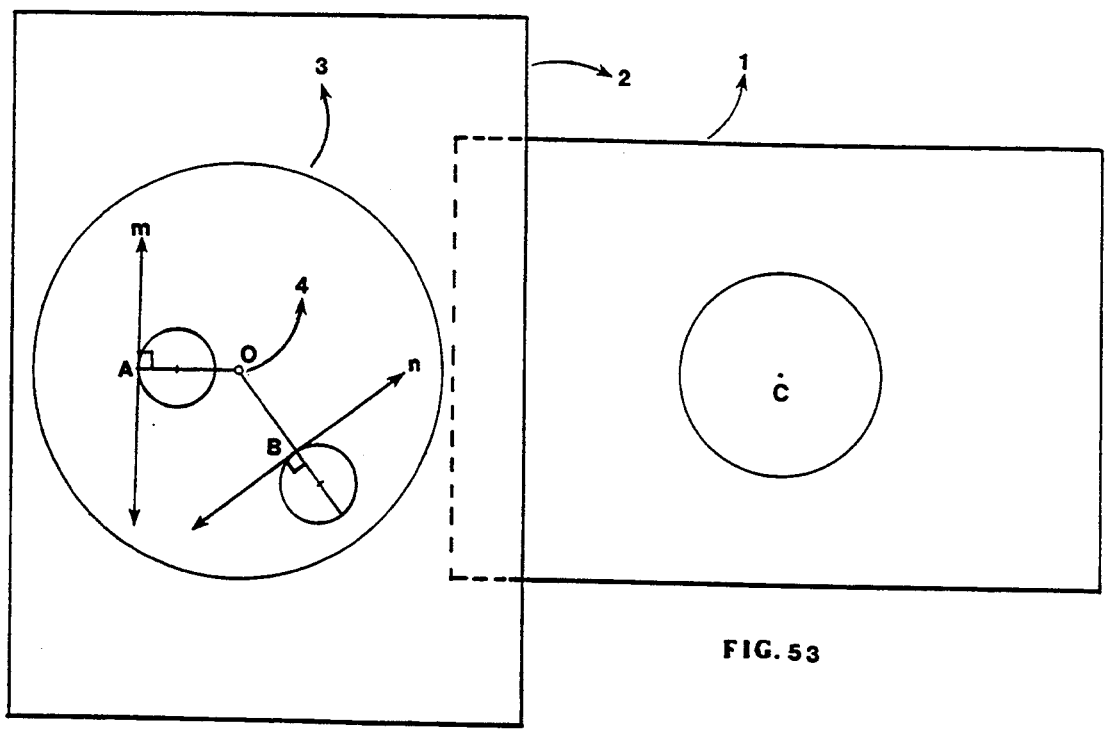

FIG. 53, a teaching aid adapted for use to demonstrate common internal tangents and common external tangents in geometry.

Figure 54:
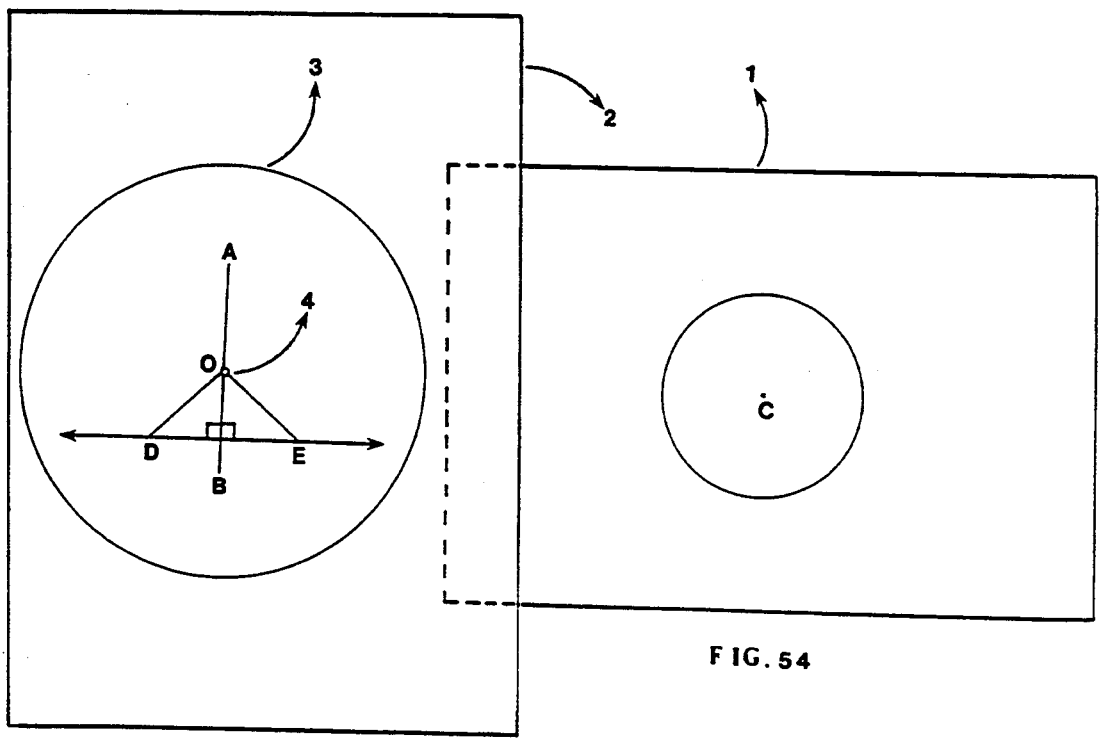

FIG. 54, a teaching aid adapted for use to prove two geometric theorems. "In a circle, if a diameter is perpendicular to a chord, then it bisects the chord and its two arcs." and "If a diameter bisects a chord which is not itself a diameter, then the diameter is perpendicular to the chord."

Figure 55:
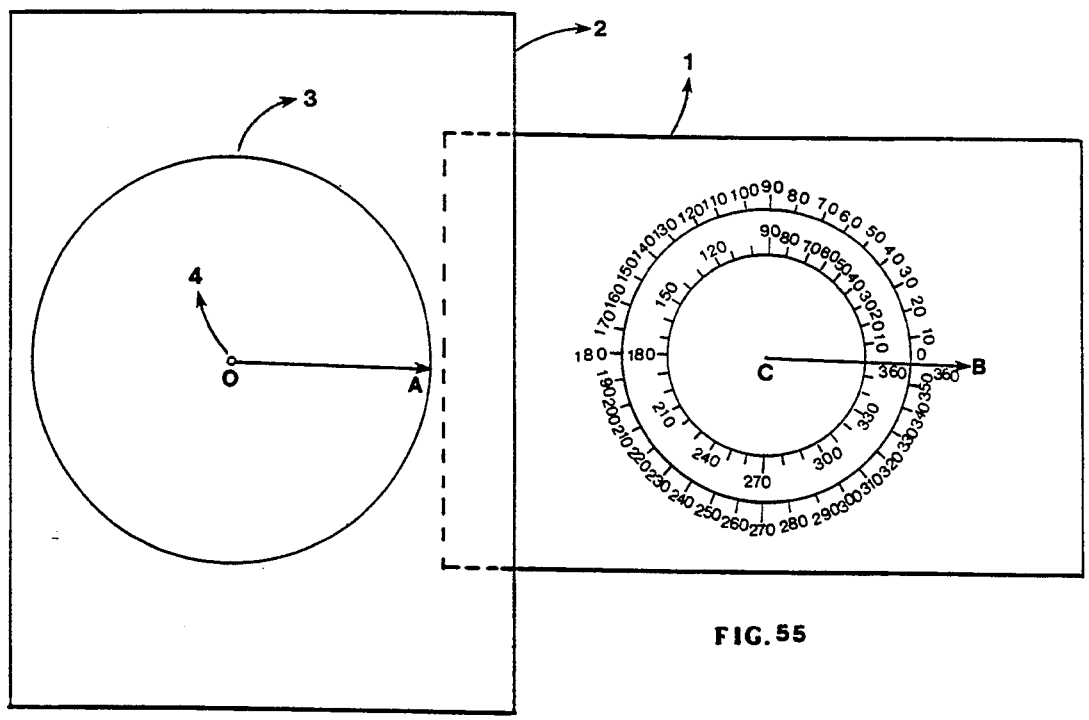

FIG. 55, a teaching aid adapted for use to demonstrate geometric definitions of arcs and central angles of a circle.

Figure 56:
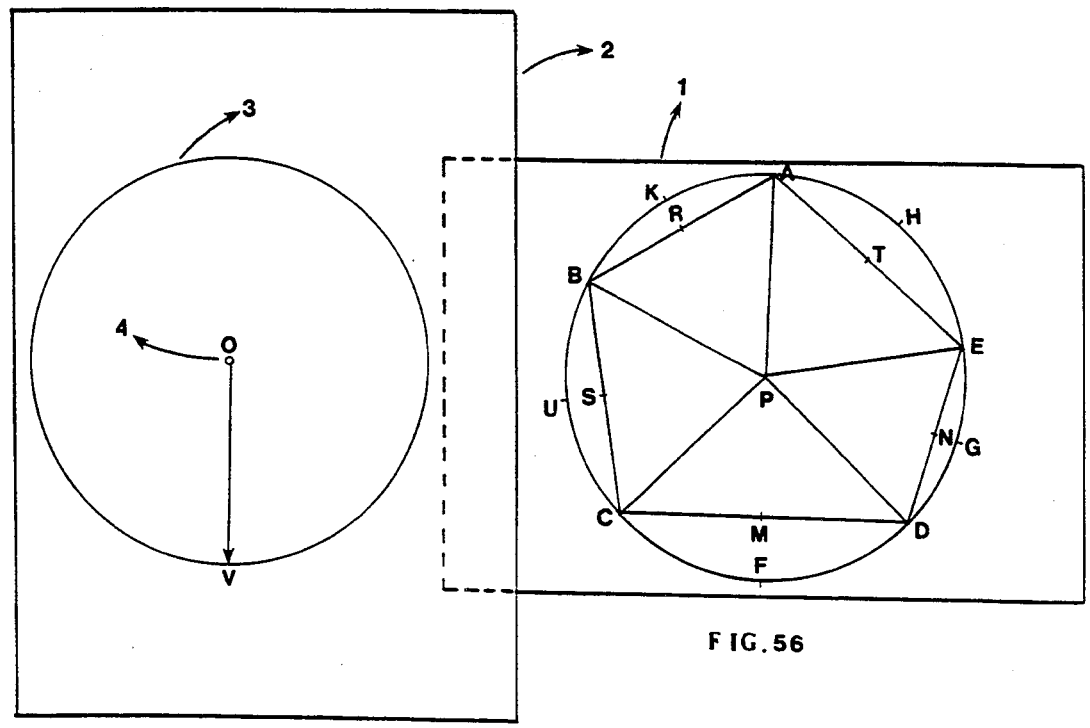

FIG. 56, a teaching aid adapted for use to demonstrate application of a geometric theorem, "If a radius of a circle bisects a chord, then it is perpendicular to the chord and bisects its intercepted arc."

Figure 57:
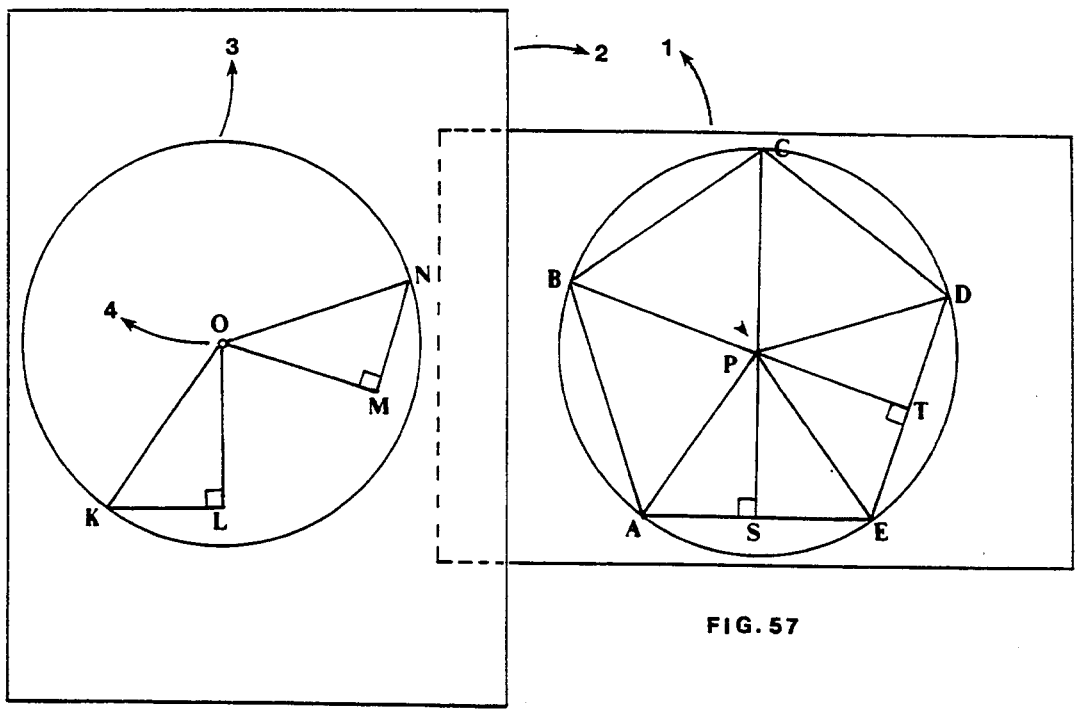

FIG. 57, a teaching aid adapted for use to demonstrate two geometric theorems, "Congruent chords of the same circle or of equal circles are equidistant from the center." and "The area of a regular polygon equals one half the product of its apothem and its perimeter."

Figure 58:
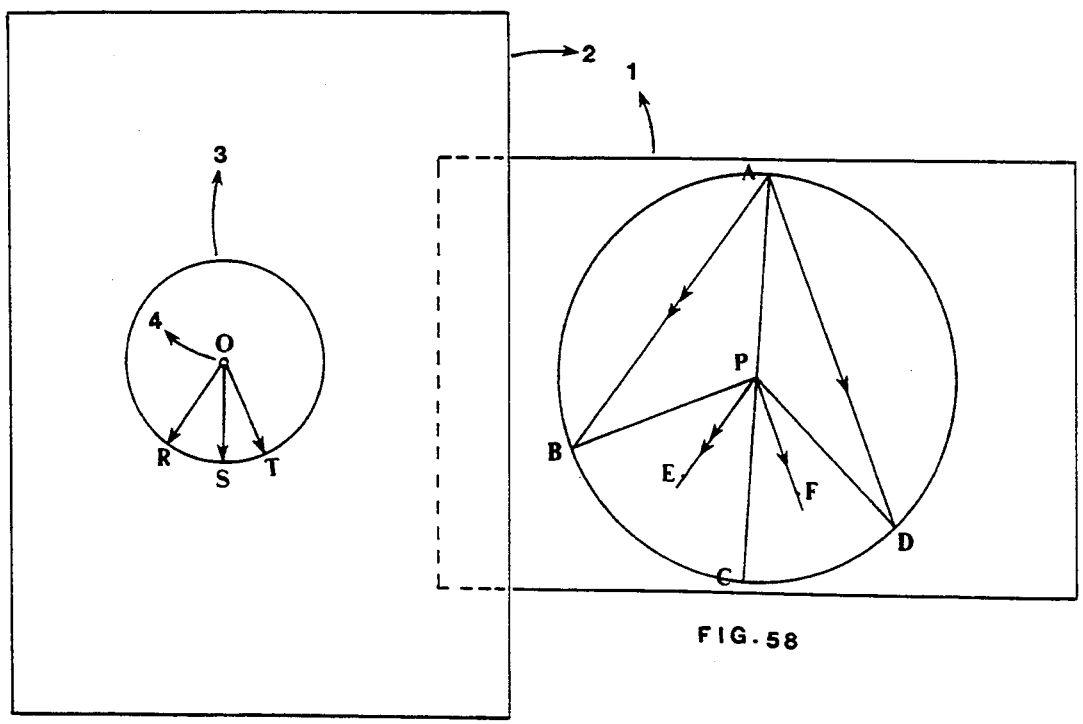

FIG. 58, a teaching aid adapted for use to demonstrate a geometric theorem, "An inscribed angles is measured by half the measure of its intercepted arc."

Figure 59:
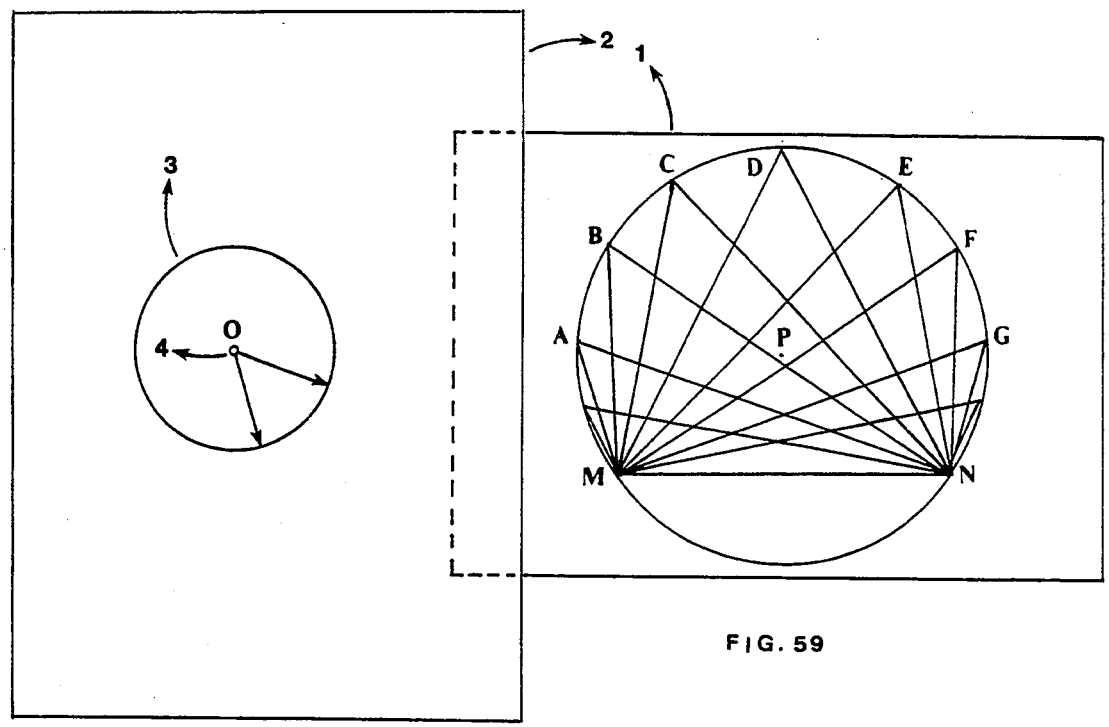

FIG. 59, a teaching aid adapted for use to demonstrate a geometric corollary, "If two or more inscribed angles intercept the same arc, then the angles are congruent."

Figure 60:
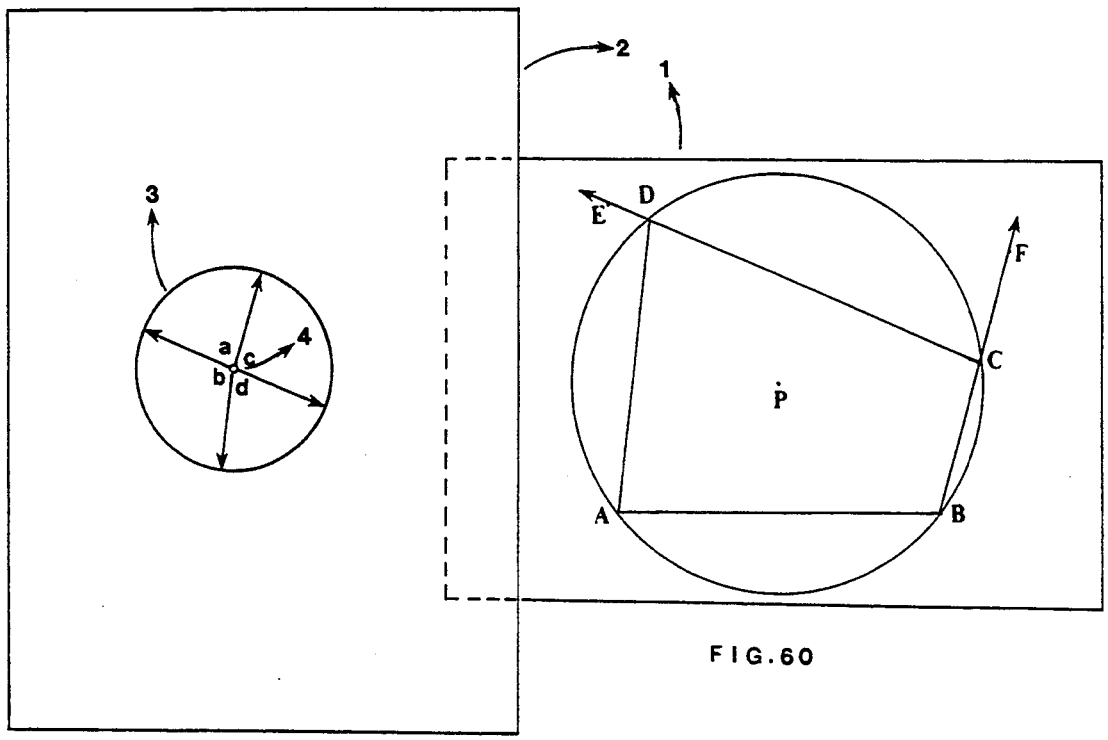

FIG. 60, a teaching aid adapted for use to demonstrate a geometric corollary, "If a quadrilateral is inscribed in a circle, then its opposite angles are supplementary."

Figure 61:
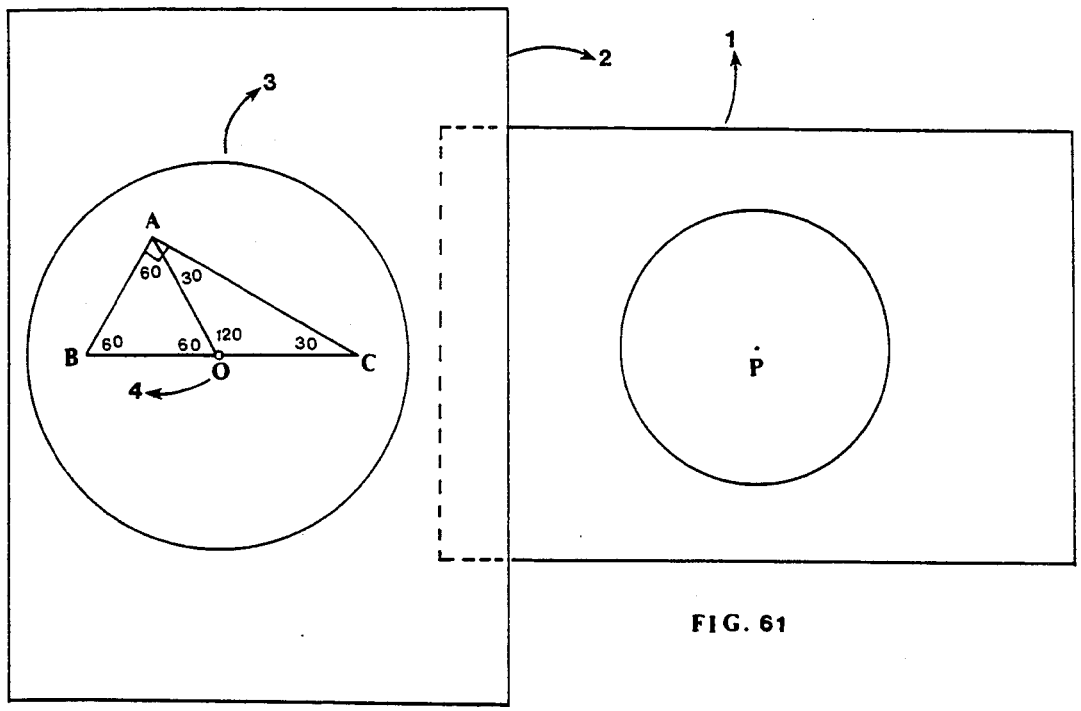

FIG. 61, a teaching aid adapted for use to demonstrate a geometric corollary and two geometric theorems, "An inscribed angle in a semicircle is a right angle.", "In a right triangle, the median to the hypotenuse is one-half the hypotenuse.", and "In 30°-60°-90° triangle the short leg is half the hypotenuse."

Figure 62:
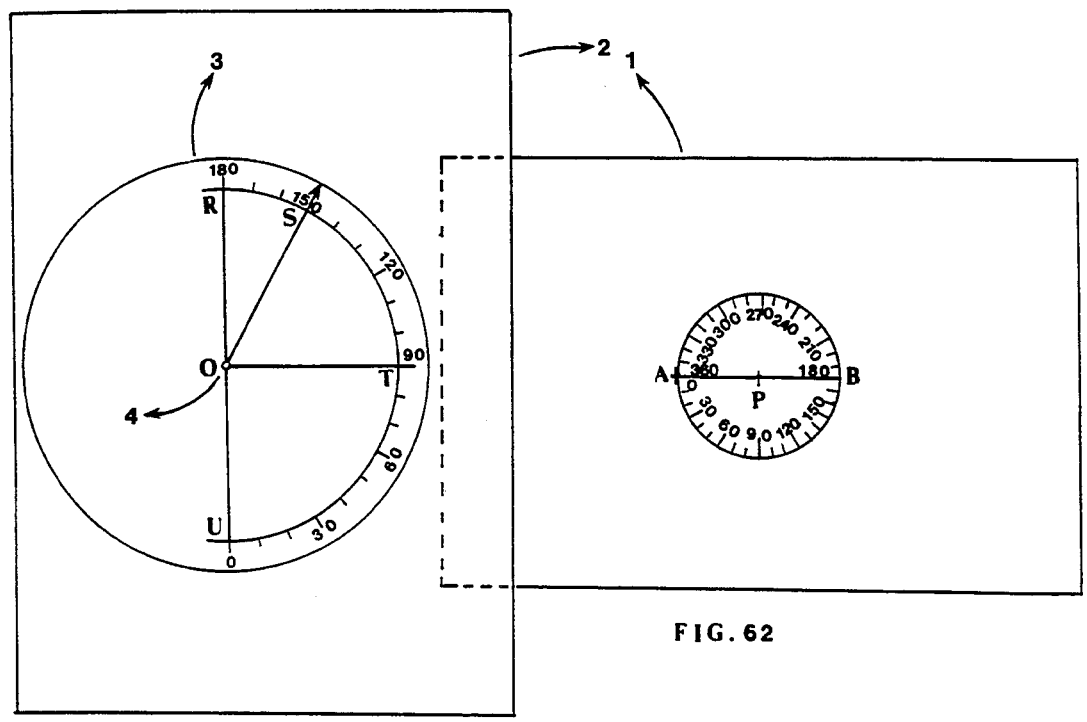

FIG. 62, the flat surface of composite overlay member including a semicircle, calibrated in angular degree measurements 0° through 180° and diameter RU is perpendicular to radius OT. The rotating circular flat surface including OS. In demonstrating this device, the center O can be positioned on A. Thus, FIG. 62 is a teaching aid adapted for use to demonstrate a geometric theorem, "An inscribed angle is measured by half the measure of its intercepted arc."

Figure 63:
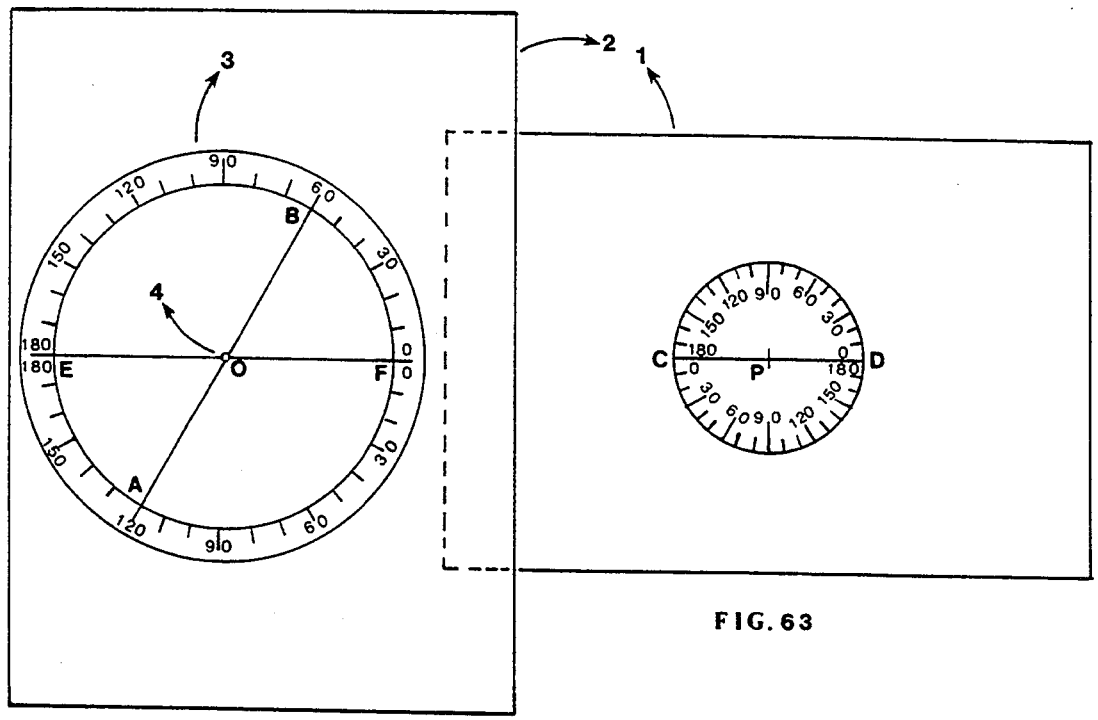

FIG. 63, the flat surface of composite overlay member including circle O, calibrated in angular degree measurements 0° through 360° and diameter EF; the rotating circular flat surface including diameter AB. In demonstrating this teaching aid of FIG. 63, the center O can be positioned on any point of CD, and the circular flat surface can be rotated to any desired position to register the angular degree of the flat surface of composite overlay member. Thus, FIG. 63 is a teaching aid adapted for use to demonstrate a geometric theorem, "The measure of an angle formed by two intersecting chords inside a circle is half the sum of the measure of the intercepted arcs."

Figure 64:
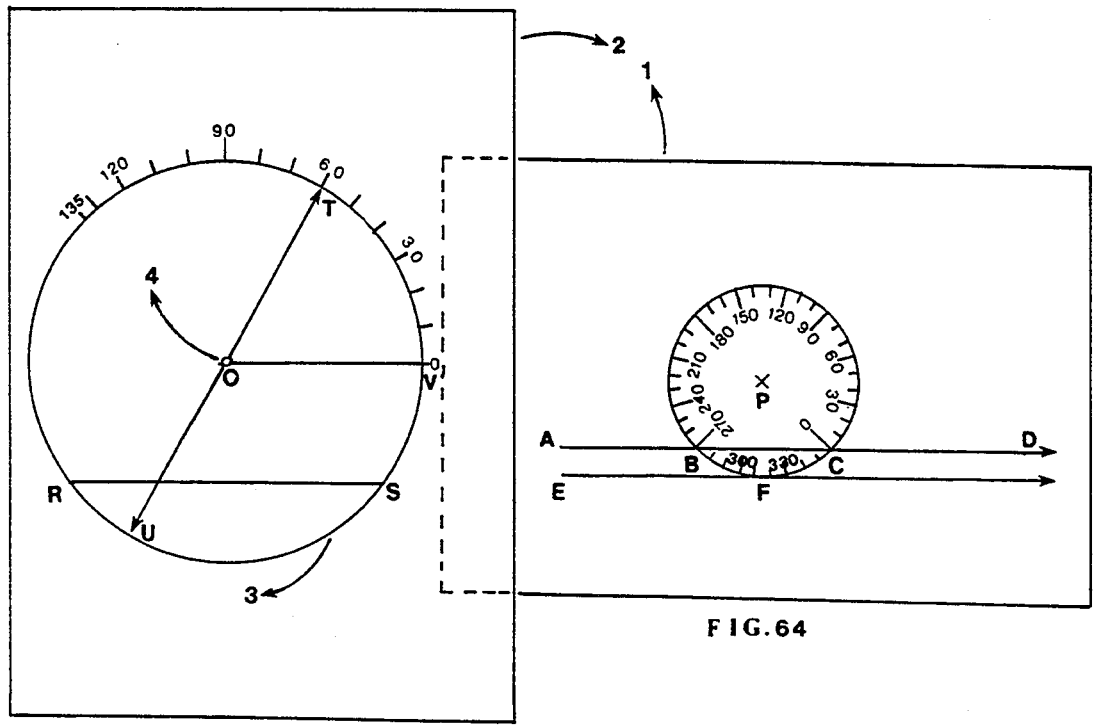

FIG. 64, the flat surface of the composite overlay member including circle O, calibrated from 0° to 135° and radius OV is parallel to chord RS. The rotating circular flat surface including diameter UT. In demonstrating this teaching aid of FIG. 64, chord RS can be translated such that AD or EF include RS. Thus, this teaching aid is adapted for use to demonstrate a geometric theorem, "The measure of an angle formed by two secants, or by a secant and a tangent, or by two tangents drawn to a circle from an external point is measured by half the difference between its intercepted arcs."

Figure 65:
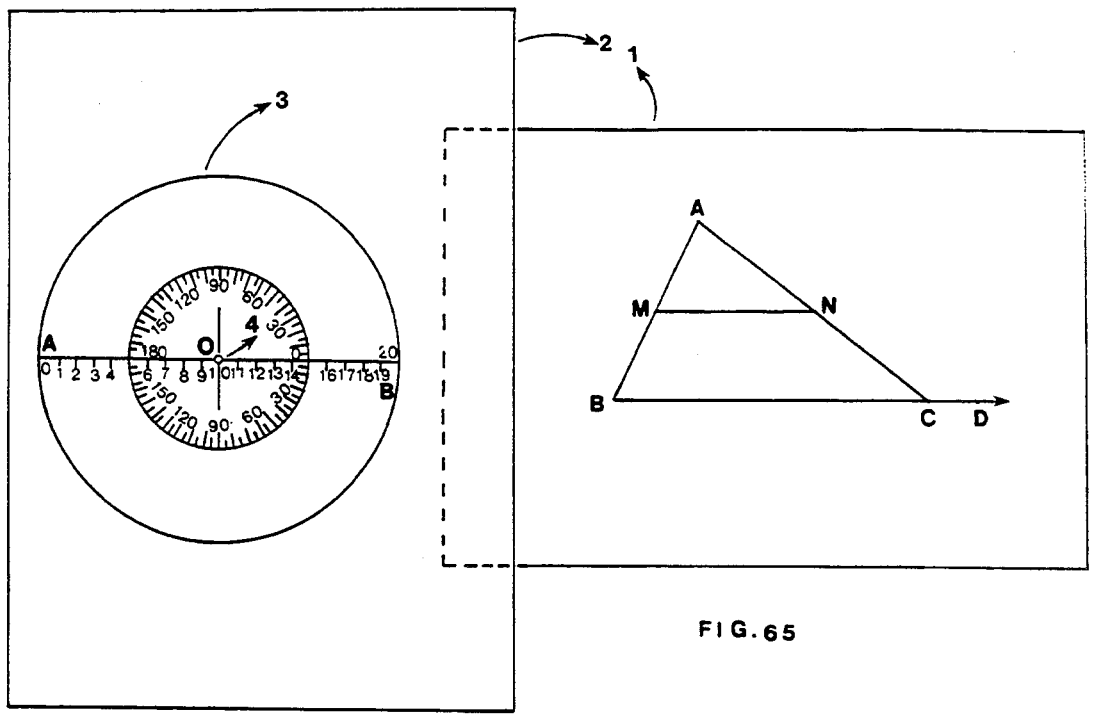

FIG. 65, the flat surface of composite overlay member including circle O, calibrated from 0° to 180° counterclockwise and clockwise, the rotating circular flat surface including diameter AB which is subdivided into calibrated unit length from 0 to 20. This teaching aid of FIG. 65 is adapted for use to measure the lengths of two sides and the included angle of a triangle or a polygon simultaneously. Thus, FIG. 65 is a teaching aid adapted for use to demonstrate geometric theorems, "The sum of the angles of a triangle 180°"; "The exterior angle of a triangle equals the sum of the two remote interior angles"; and "The segment that joins the midpoints of two sides of a triangle equals half the third side and parallel to the third side." Further, the overlay member and the rotating circular flat surface can be applied to demonstrate many geometric theorems, wherein the base member may include geometric diagrams thereon.

Figure 66:
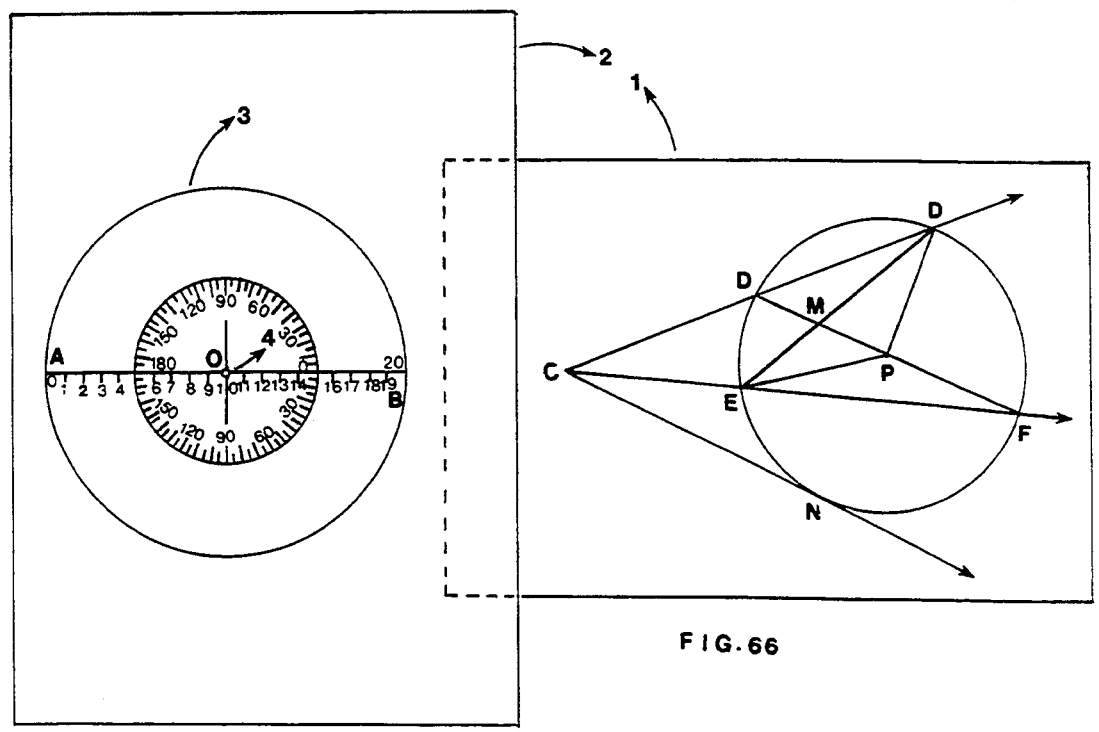

FIG. 66, a teaching aid adapted for use to demonstrate geometric theorems, "If two chords intersect in a circle, then the product of the segments of one chord equals the product of the segments of the other chord." and "If two secants are drawn from an exterior point to a circle, then the product of one secant segment and its external segment equals the product of the other secant segment and its external segment."

Figure 67:
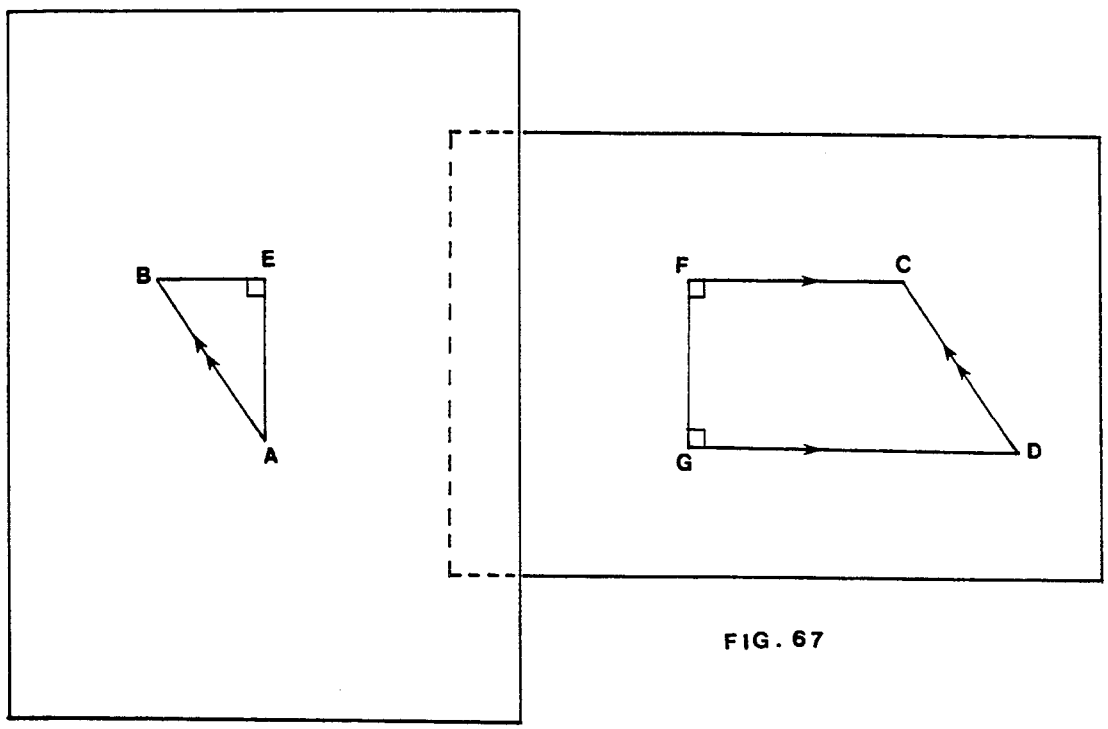

FIG. 67, a teaching aid adapted for use to demonstrate a geometric theorem, "The area of a parallelogram equals the product of the base and the altitude."

Figure 68:
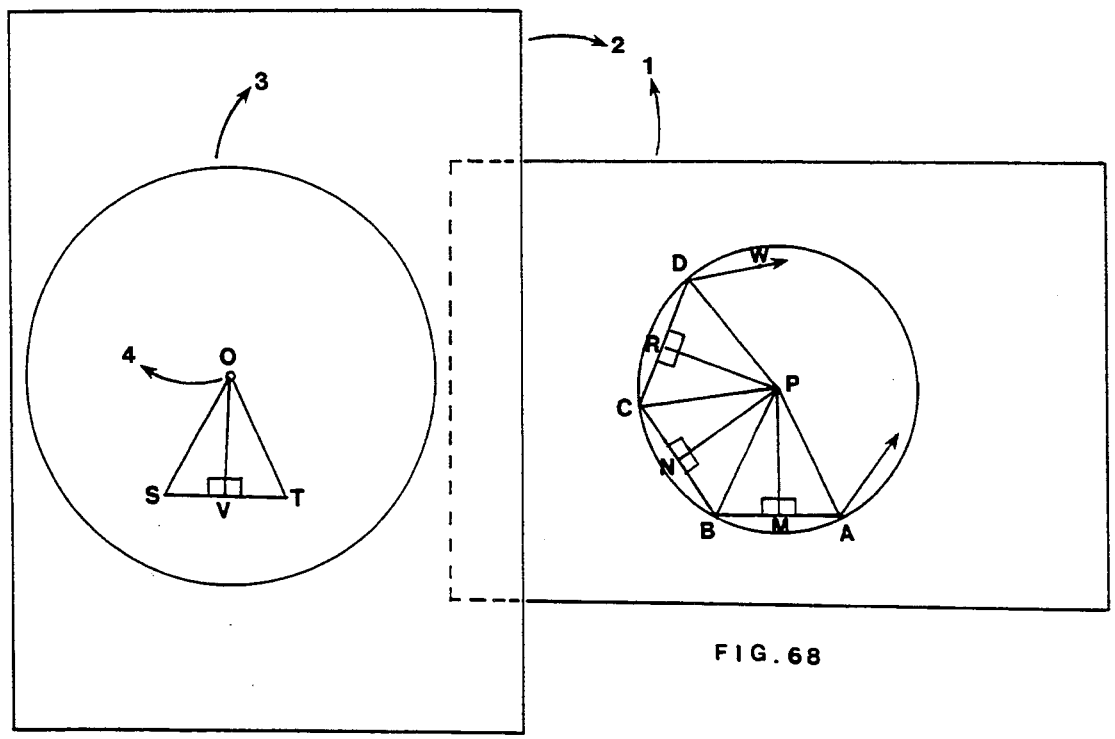

FIG. 68, a teaching aid adapted for use to demonstrate a geometric theorem, "The area of a regular polygon equals one-half the product of its apothem and its perimeter."

Figure 69:
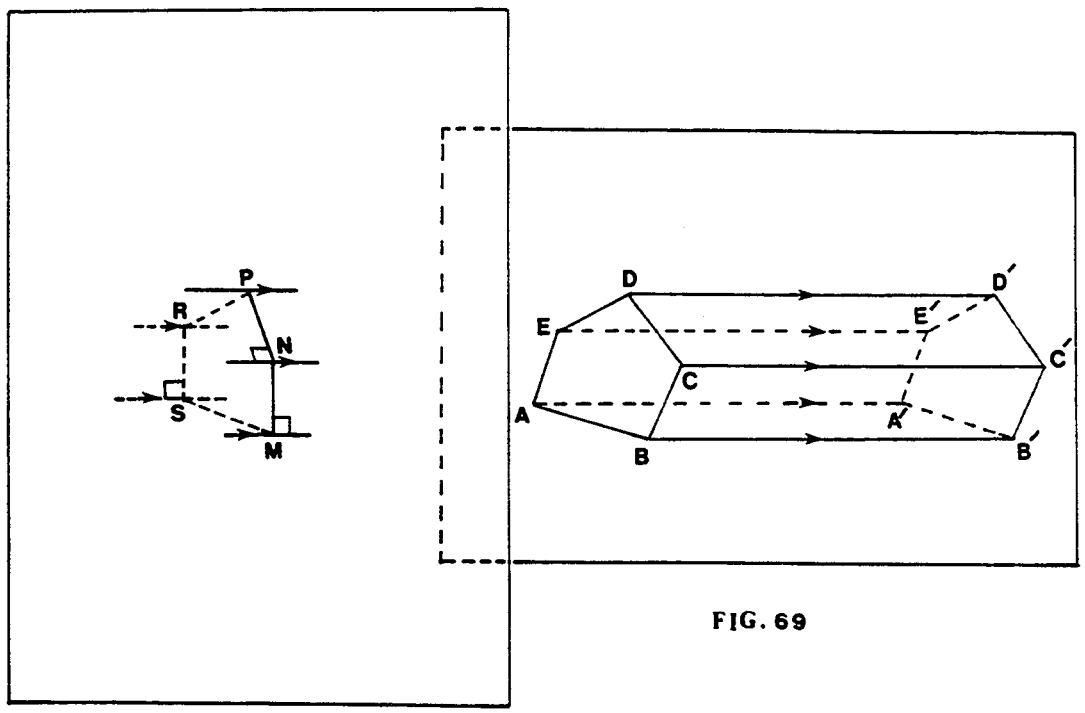

FIG. 69, a teaching aid adapted for use to demonstrate a geometric theorem, "The lateral area of a prism is the product of a lateral edge and the perimeter of a right section."

Figure 70:
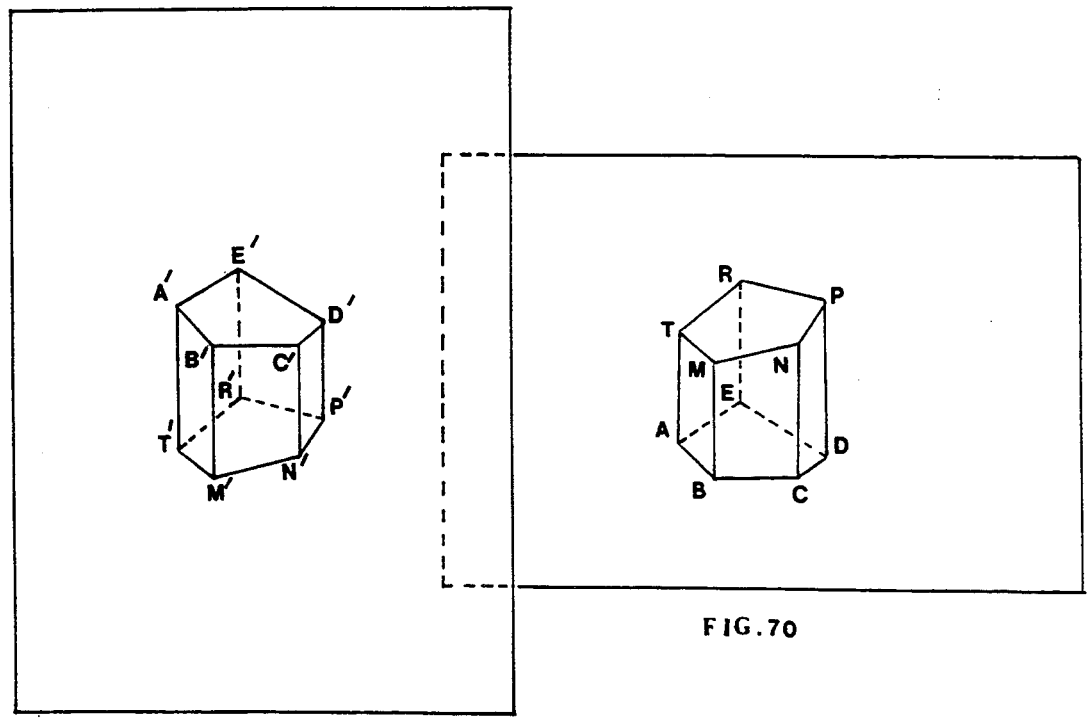

FIG. 70, a teaching aid adapted for use to demonstrate a geometric theorem, "An oblique prism is equivalent to a right prism whose base is equal to a right section of the oblique prism, and whose altitude is equal to a lateral edge of the oblique prism."

Figure 71:
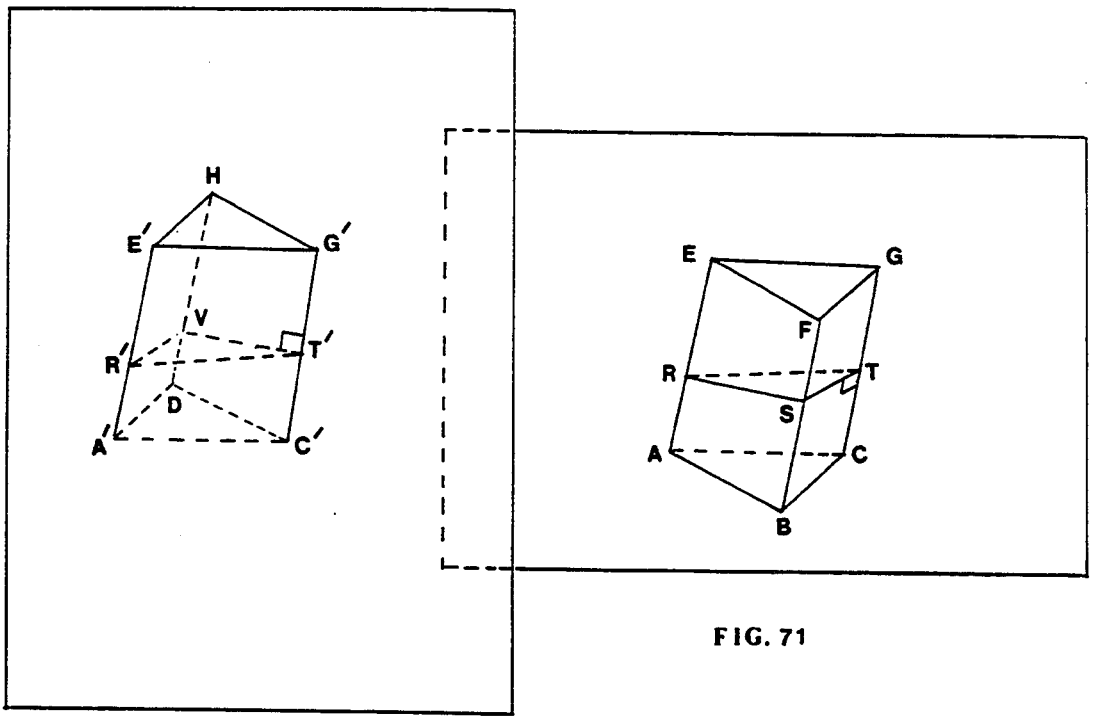

FIG. 71, a teaching aid adapted for use to demonstrate a geometric theorem, "The volume of a triangular prism is the product of the base and the altitude."

Figure 72:
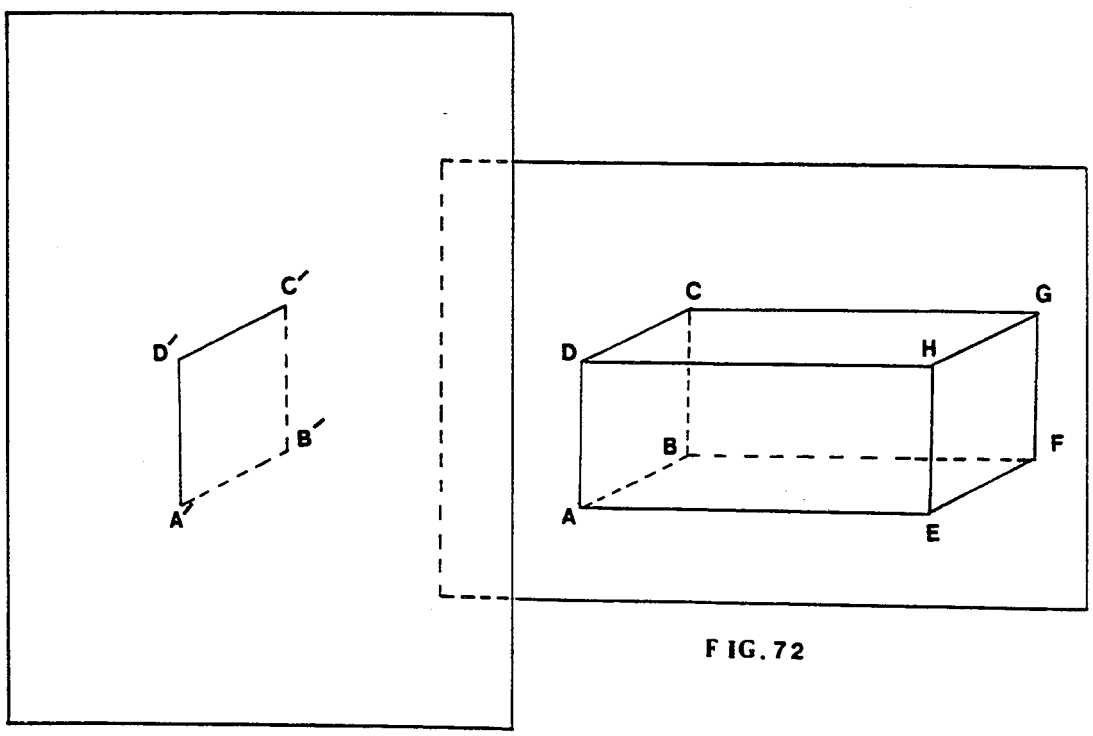

FIG. 72, a teaching aid adapted for use to demonstrate a geometric property of a right rectangular prism.

Figure 73:
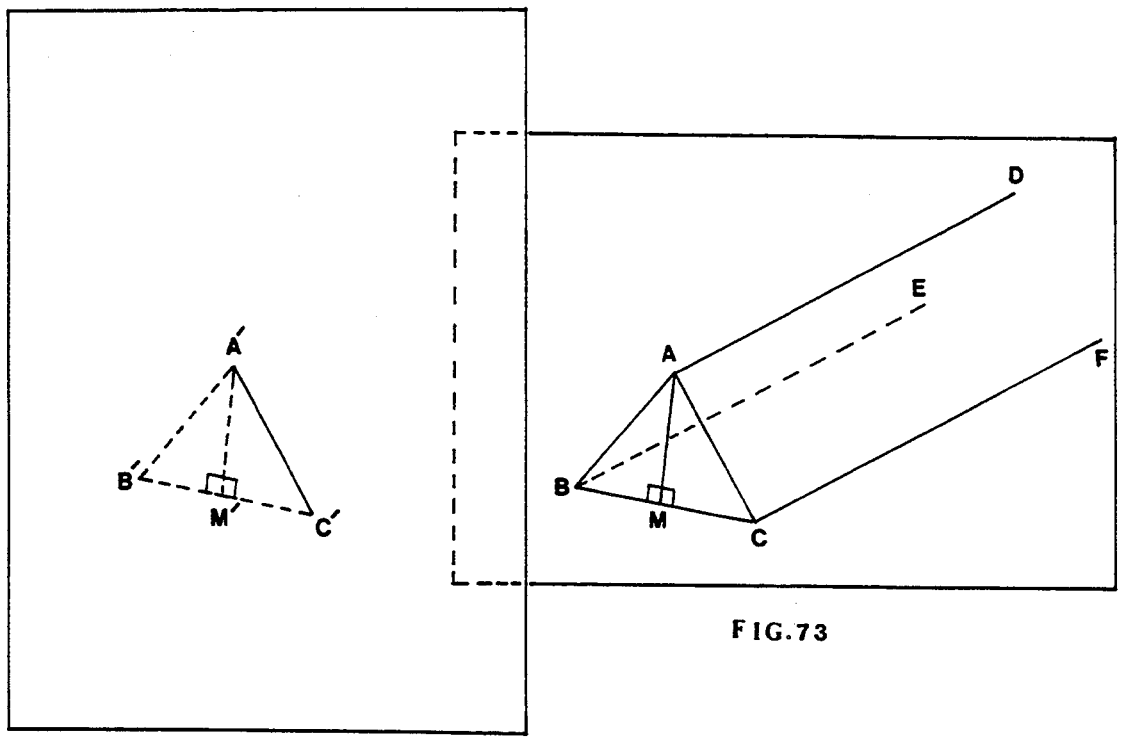

FIG. 73, a teaching aid adapted for use to demonstrate the property of a right rectangular prism. It also can be used to demonstrate geometric problems as application on a right rectangular prism.

Figure 74:
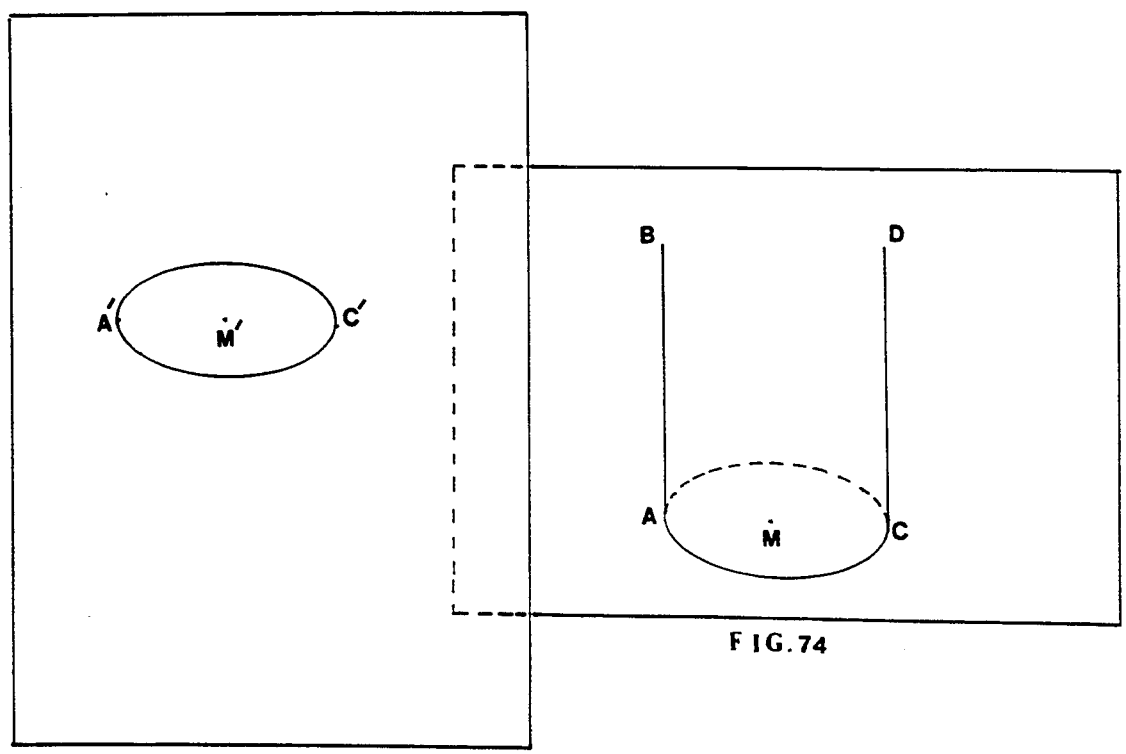

FIG. 74, a teaching aid adapted for use to demonstrate the definition of a right cylinder. It also can be used to demonstrate geometric problems as application on a right cylinder.

Figure 75:
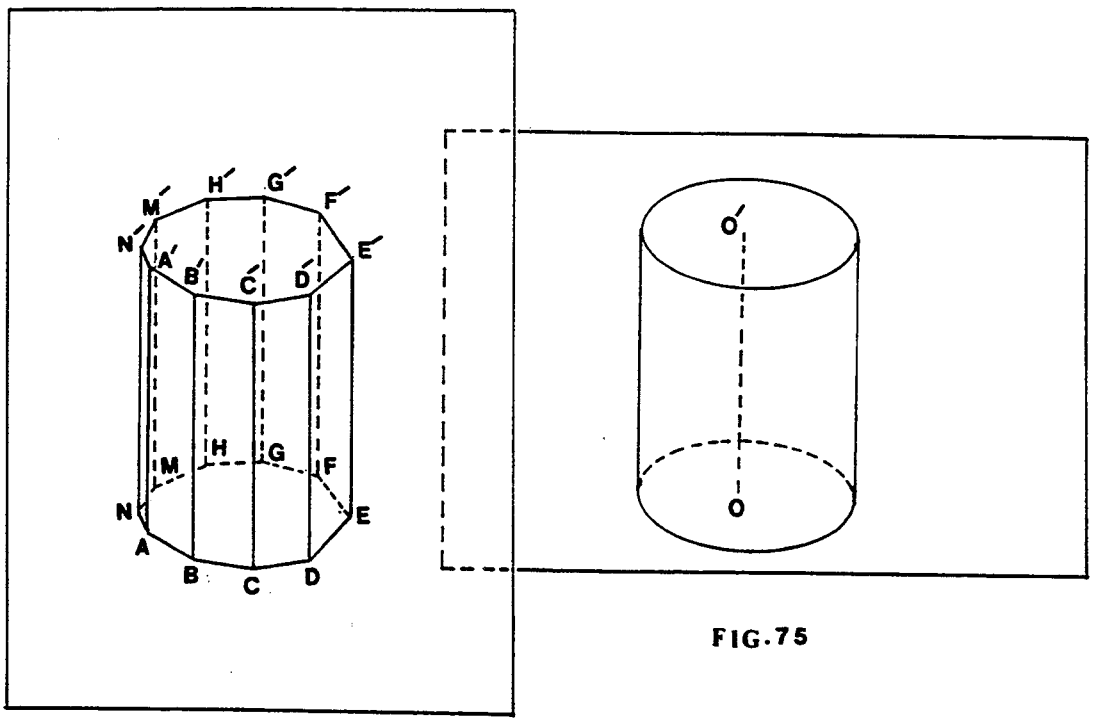

FIG. 75, a teaching aid adapted for use to demonstrate a geometric theorem, "The volume of a right cylinder is the product of the base and the altitude."

Figure 76:
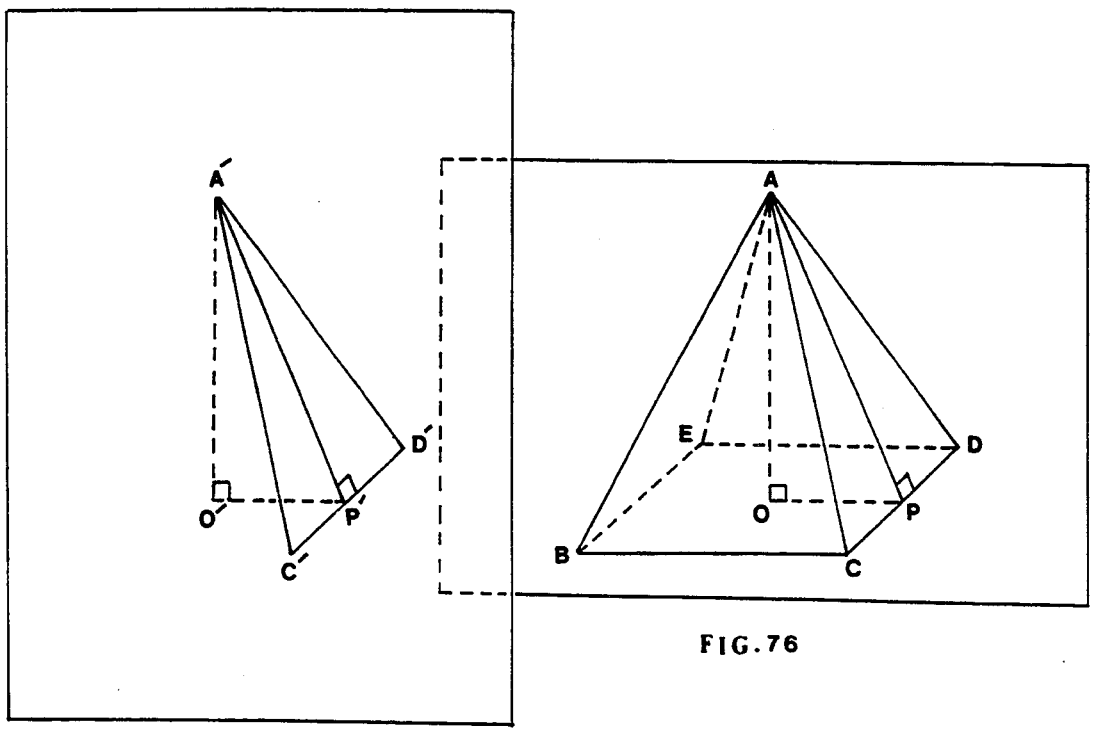

FIG. 76, a teaching aid adapted for use to demonstrate geometric problem solving for a regular pyramid.

Figure 77:
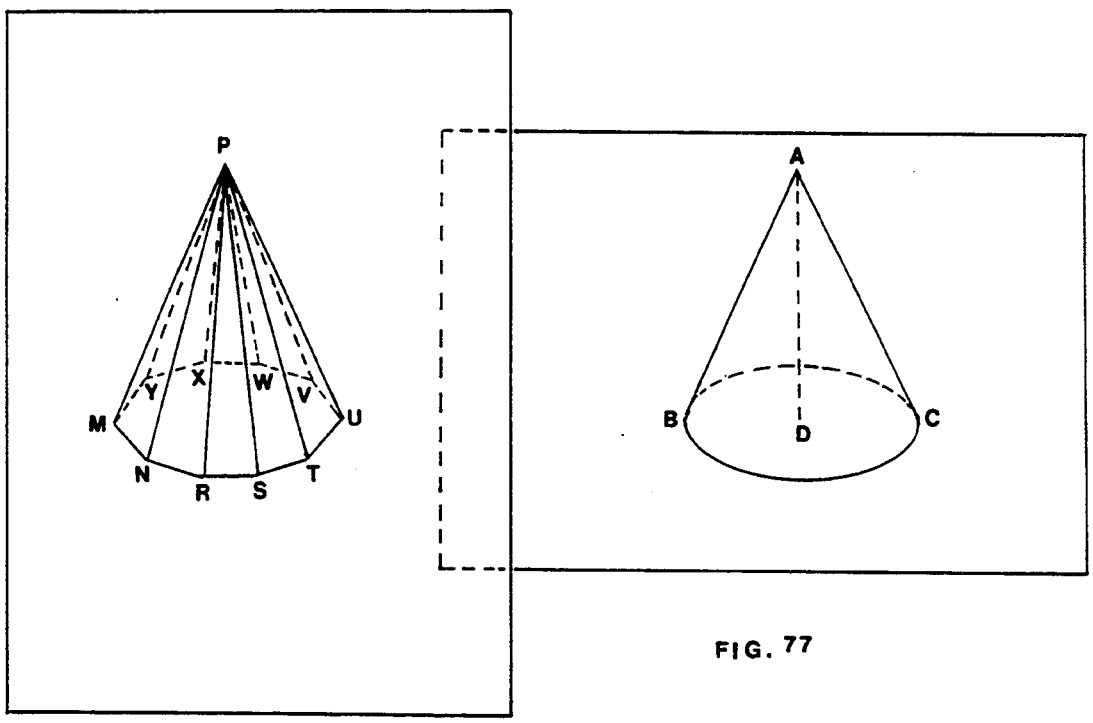

FIG. 77, a teaching aid adapted for use to demonstrate a geometric theorem, "The volume of a right cone is one third the product of the base and the altitude."

Figure 78:
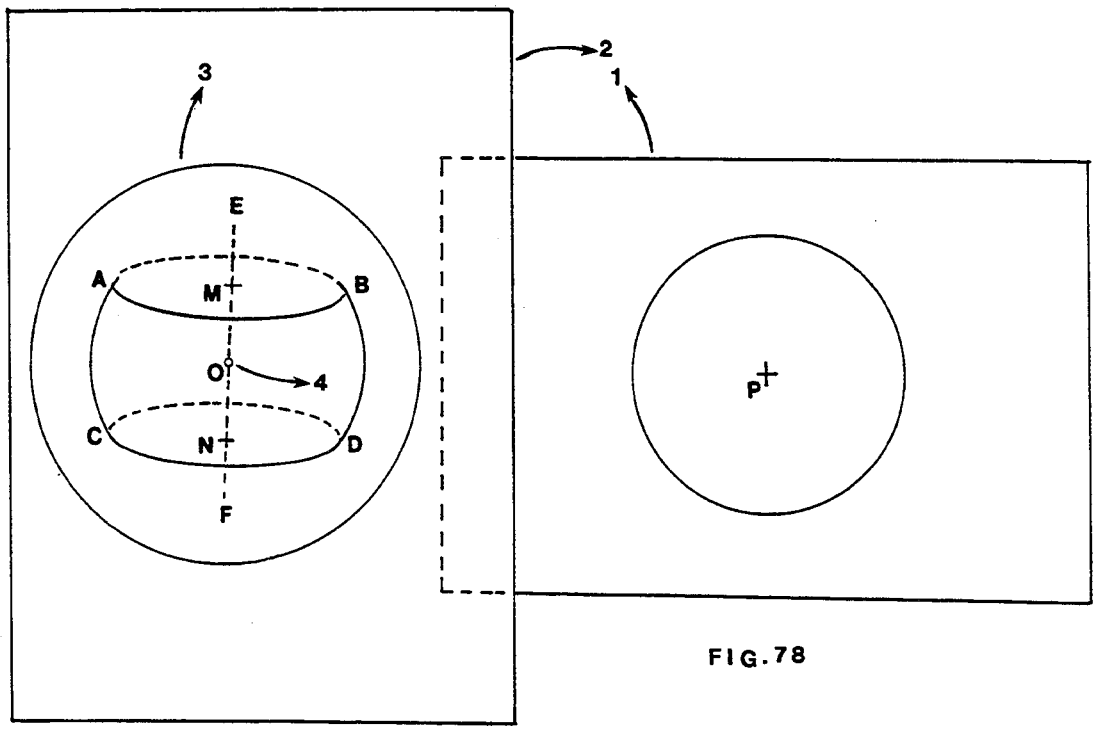

FIG. 78, a teaching aid adapted for use to demonstrate a geometric corollary, "The area of a zone is the product of the circumference of a great circle and its altitude."

Figure 79:
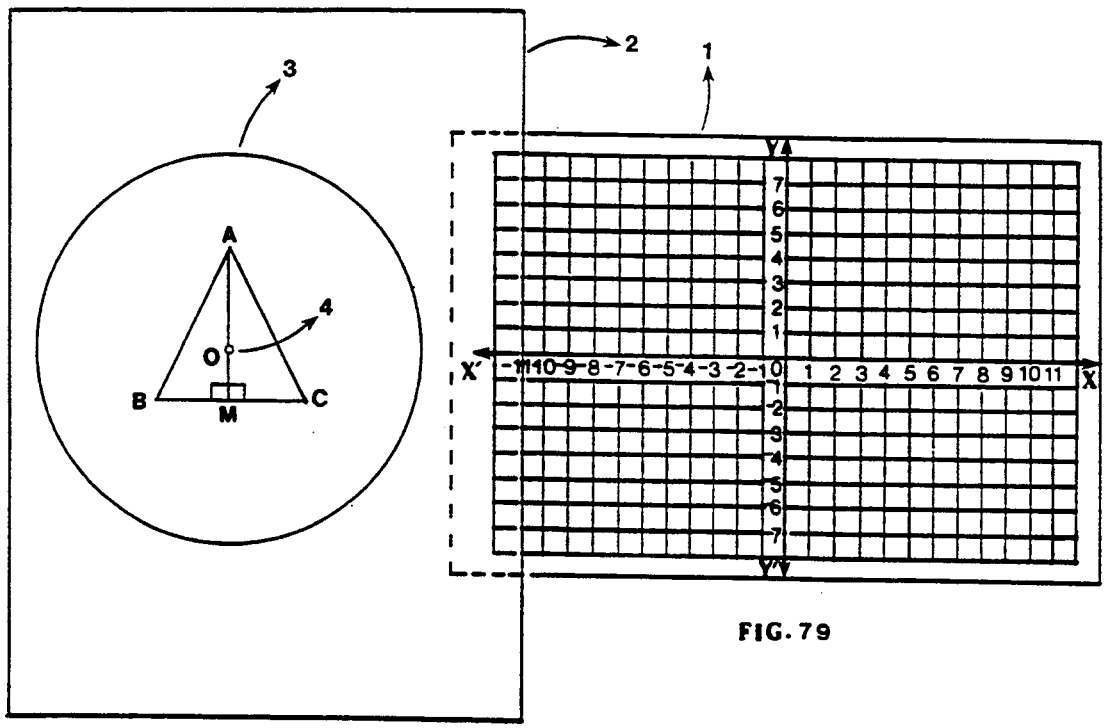

FIG. 79, a teaching aid adapted for use to demonstrate the proof of a geometric theorem in coordinate geometry, "The median to the base of an isosceles triangle is perpendicular to the base."

Figure 80:
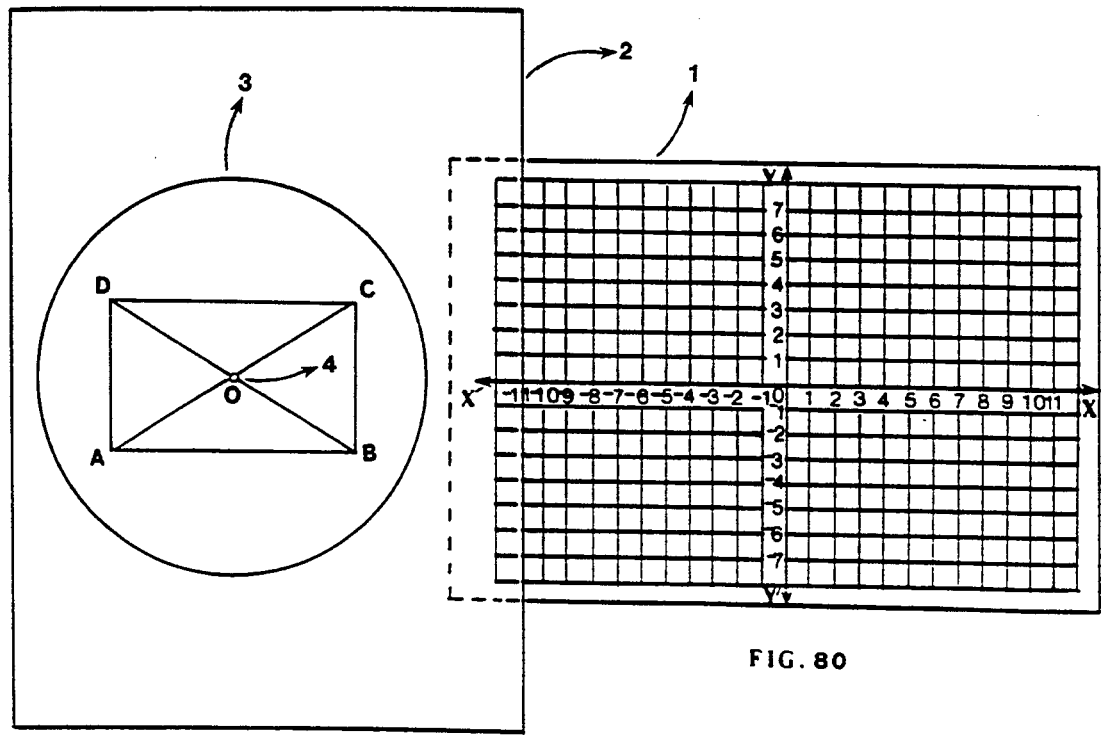

FIG. 80, a teaching aid adapted for use to demonstrate the proof of a geometric theorem in coordinate geometry, "The diagonals of a rectangle are congruent."

Figure 81:
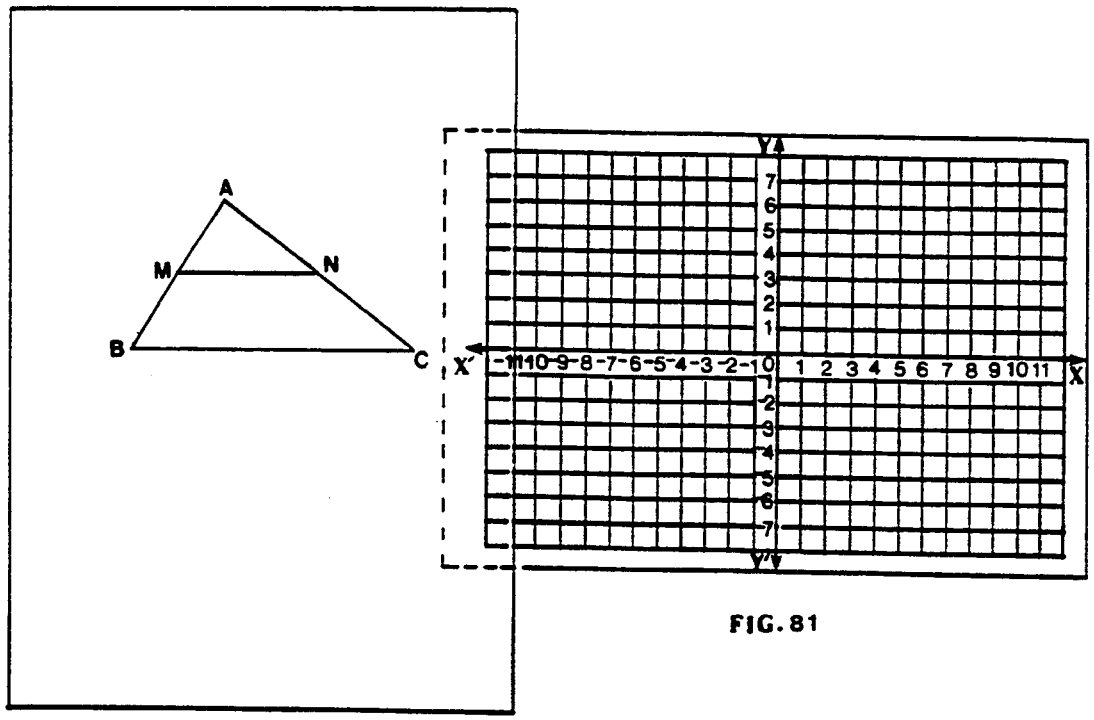

FIG. 81, a teaching aid adapted for use to demonstrate the proof of a geometric theorem in coordinate geometry, "The segment that joins the midpoints of two sides of a triangle is parallel to the third side and has length equal to half the length of the third side."

Figure 82:
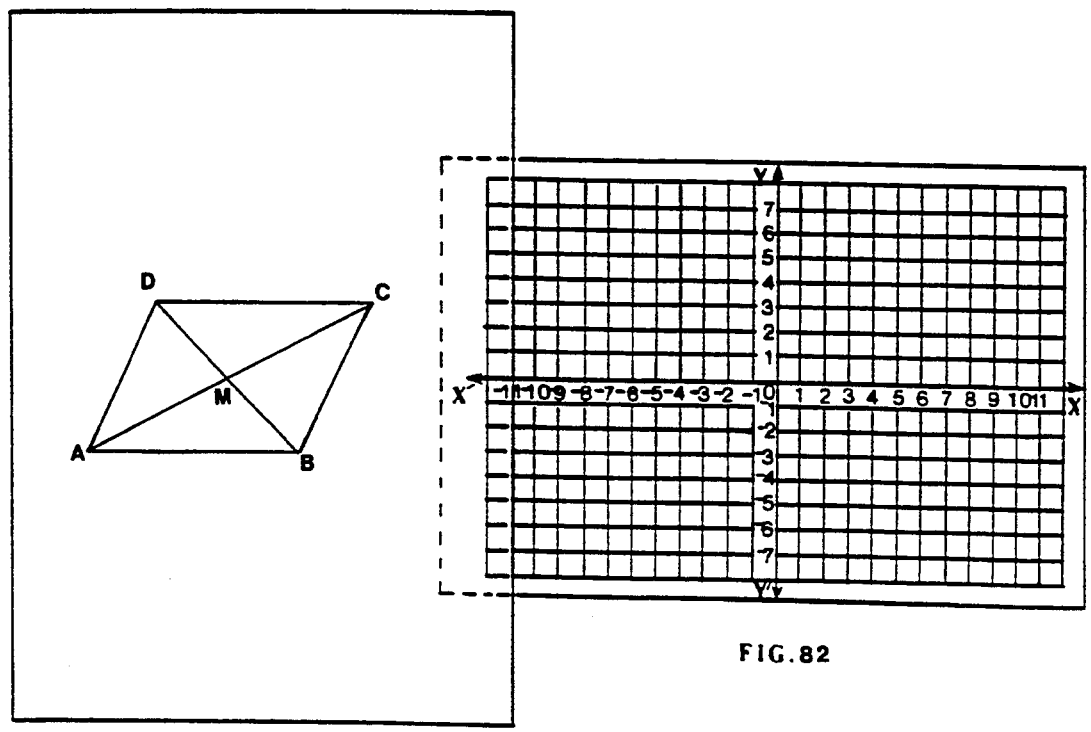

FIG. 82, a teaching aid adapted for use to demonstrate a geometric theorem in coordinate geometry, "In a parallelogram both opposite sides are congruent."

Figure 83:
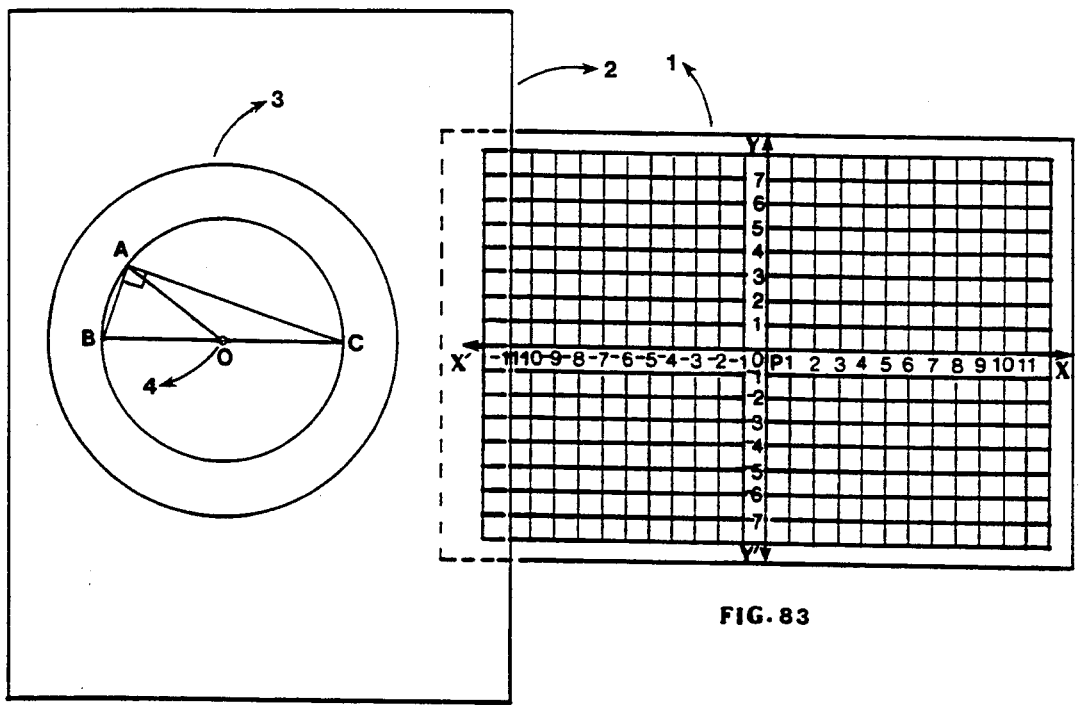

FIG. 83, a teaching aid adapted for use to demonstrate the proofs of two geometric theorems in coordinate geometry, "An inscribed angle in a semicircle is a right angle." and "In a right triangle, the median to the hypotenuse is one-half the hypotenuse."

Figure 84:
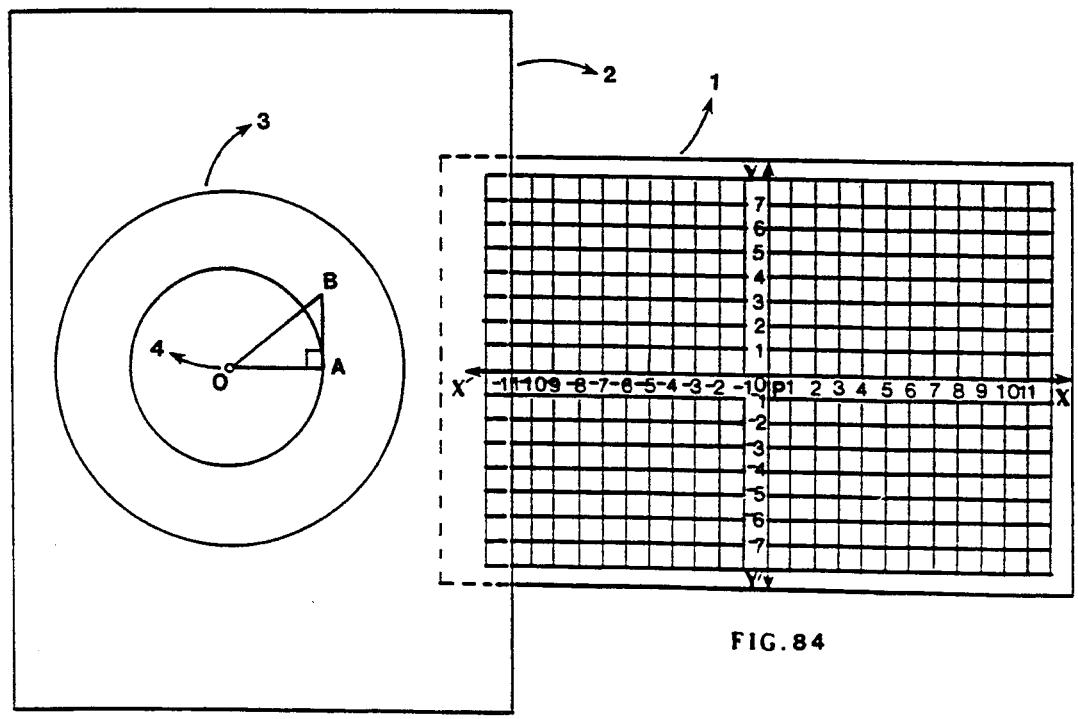

FIG. 84, a teaching aid adapted for use to demonstrate the proof of a geometric theorem in coordinate geometry, "If a line is perpendicular to a radius of a circle at a point on the circle, then the line is tangent to the circle."

Figure 85:
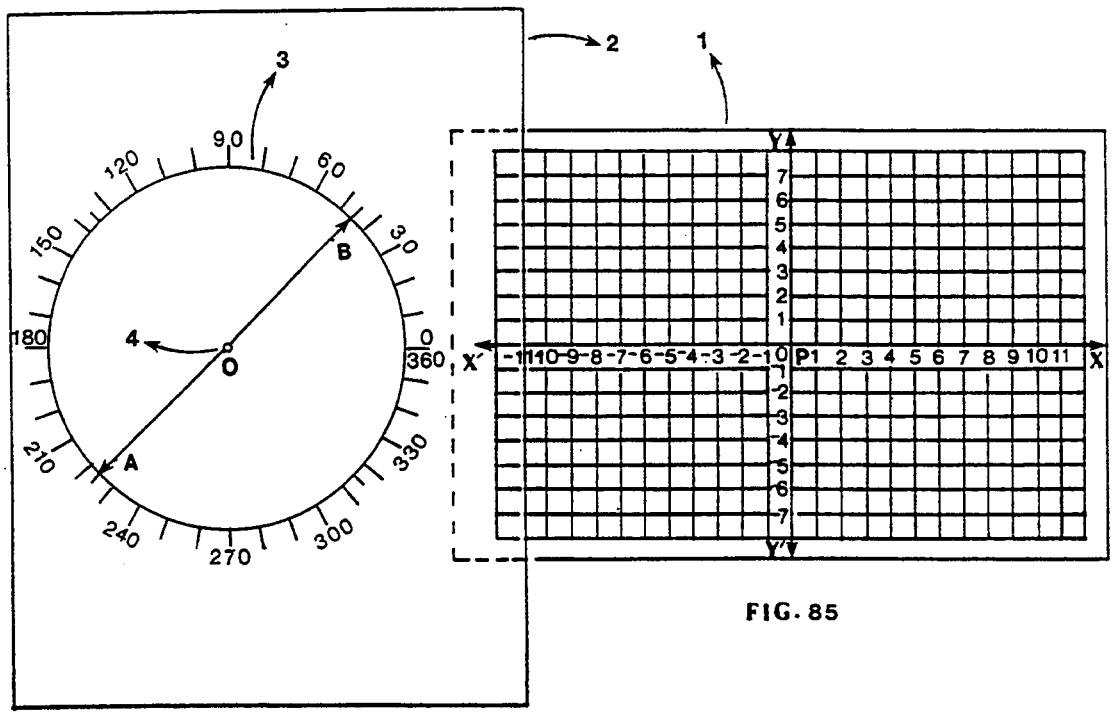

FIG. 85, the flat surface of composite overlay member including calibrated circle from 0° to 360°. The rotating circular flat surface including diameter AB.

This teaching aid of FIG. 85 is adapted for use to find linear equations graphically for many algebraic problems in slope and y-intercept forms, wherein the slopes equal the tangents of the trigonometric functions of the angular degrees.

Figure 86:
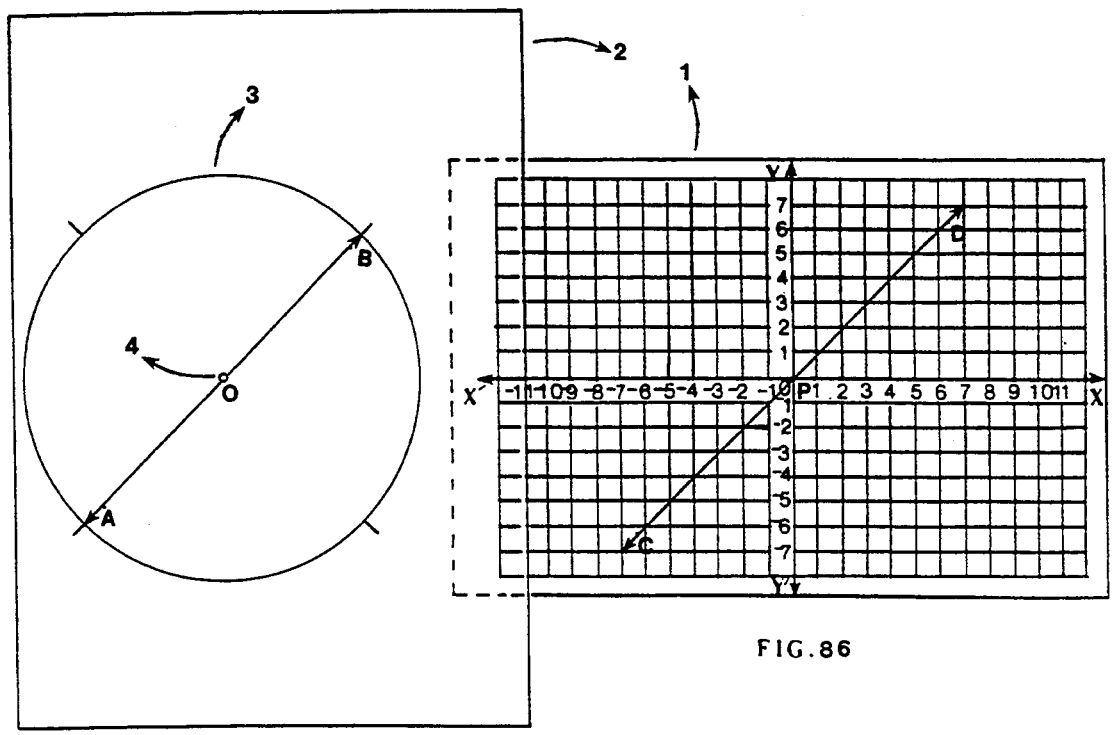

FIG. 86, the rotating circular flat surface including line AB. This teaching aid of FIG. 85 is adapted for use to visually demonstrate a family of linear graphs with respect to a stationary line graph y=x under composition of transformations.

Figure 87:
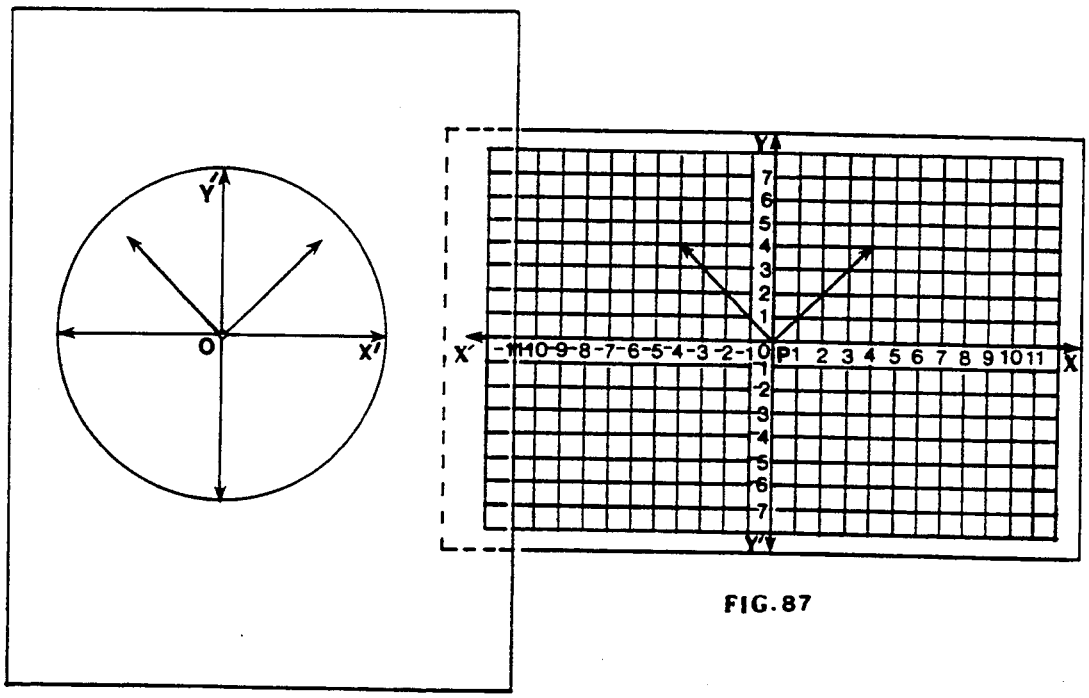

FIG. 87, the rotating circular flat surface including coordinate axes X' and Y', and a graph represents f(x)=|x|. The stationary graph on the Cartesian coordinate graph represents the same graph f(x)=|x|. This teaching aid of FIG. 87 is adapted for use to visually demonstrate a family of the absolute value function graphs under composition of transformations.

Figure 88:
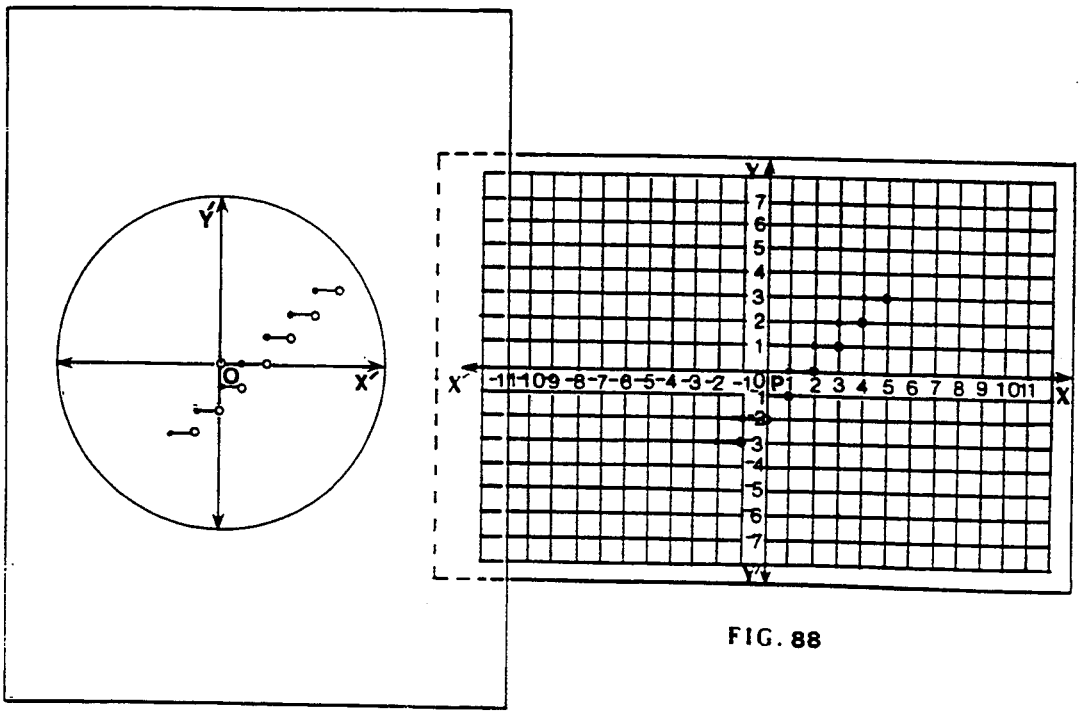

FIG. 88, the rotating circular flat surface including coordinate axes X' and Y', and a graph representing the greatest integer function f(x)=[x]. The stationary graph on the Cartesian coordinate represents the same graph f(x)=[x]. This device is adapted for use to visually demonstrate a family of the greatest integer function graphs under composition of transformations.

Figure 89:
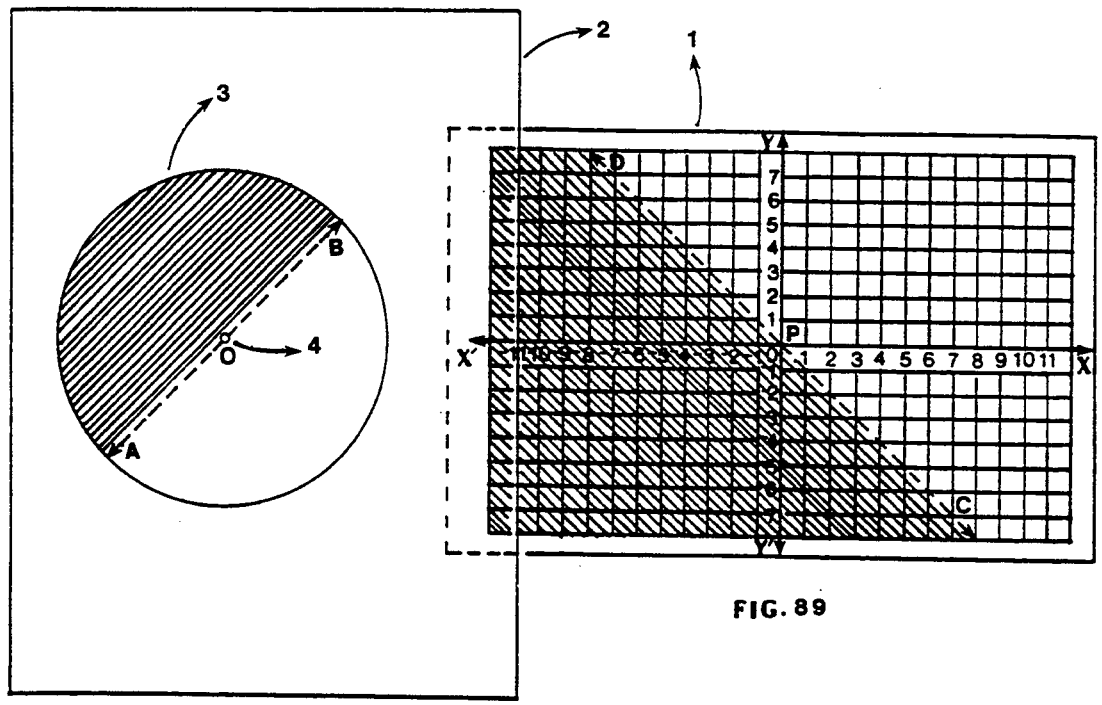

FIG. 89, a teaching aid adapted for use to demonstrate algebraic graphs of inequalities under composition of transformations.

Figure 90:
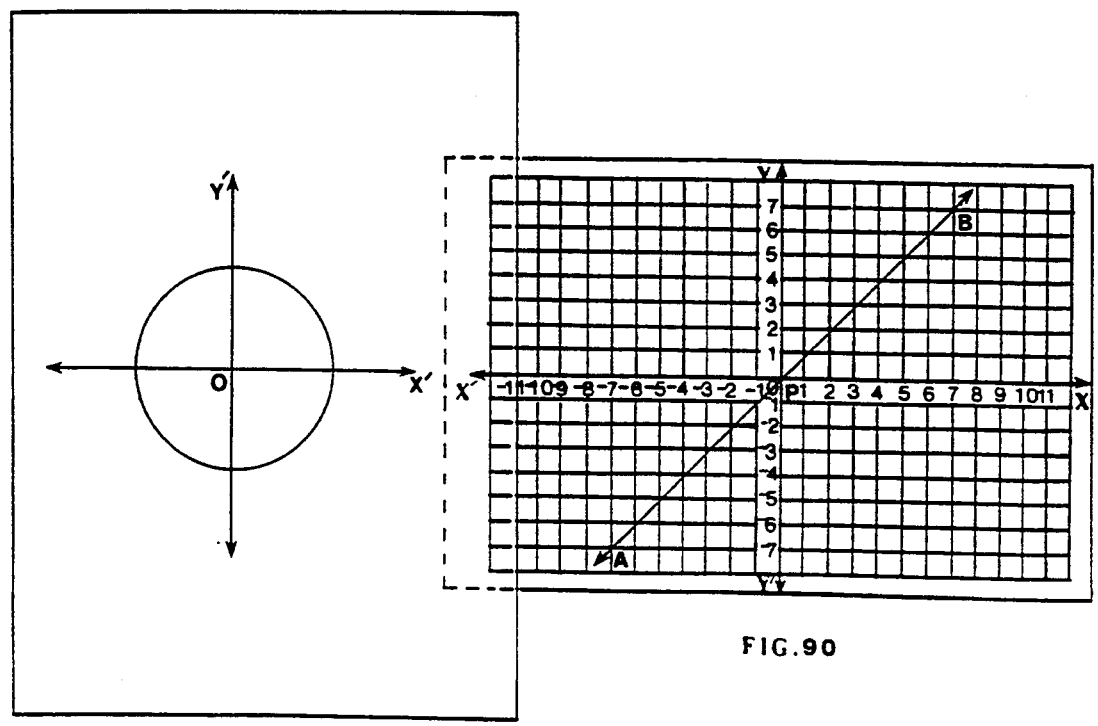

FIG. 90, a teaching aid adapted for use to visually demonstrate algebraic graphs which involve equations of a family of circles under composition of translations with reference to a stationary line graph y=x on the Cartesian graph.

Figure 91:
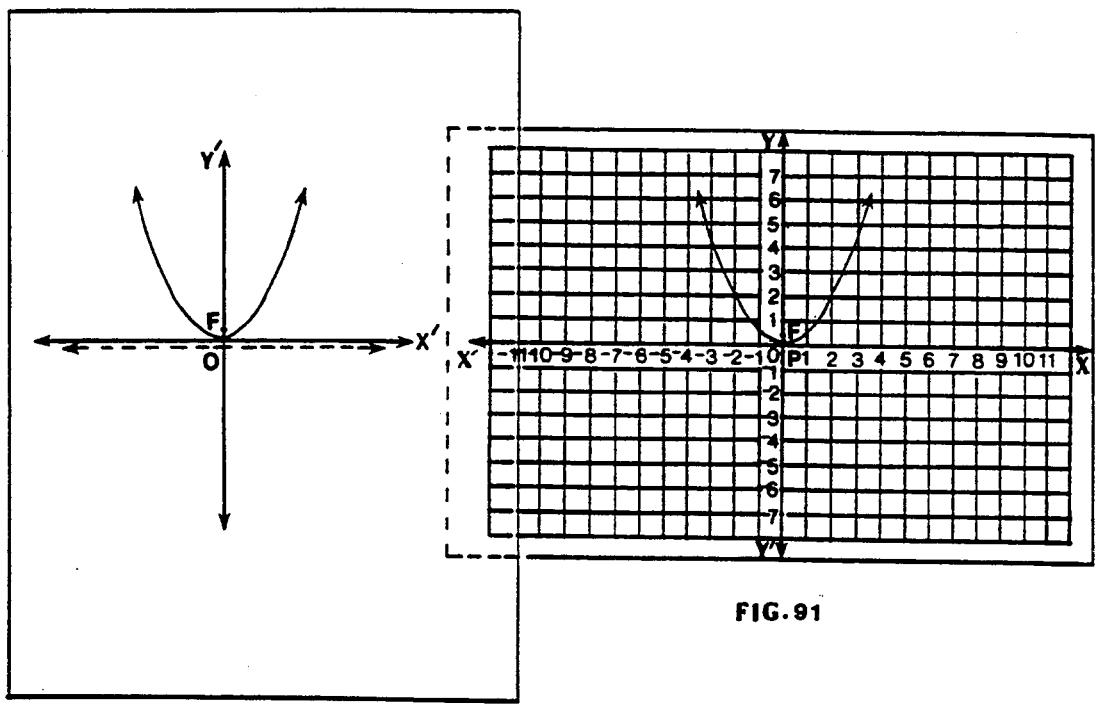

FIG. 91, a teaching aid adapted for use to visually demonstrate algebraic graphs which involve a family of parabolic graphs under composition of translations.

Figure 92:
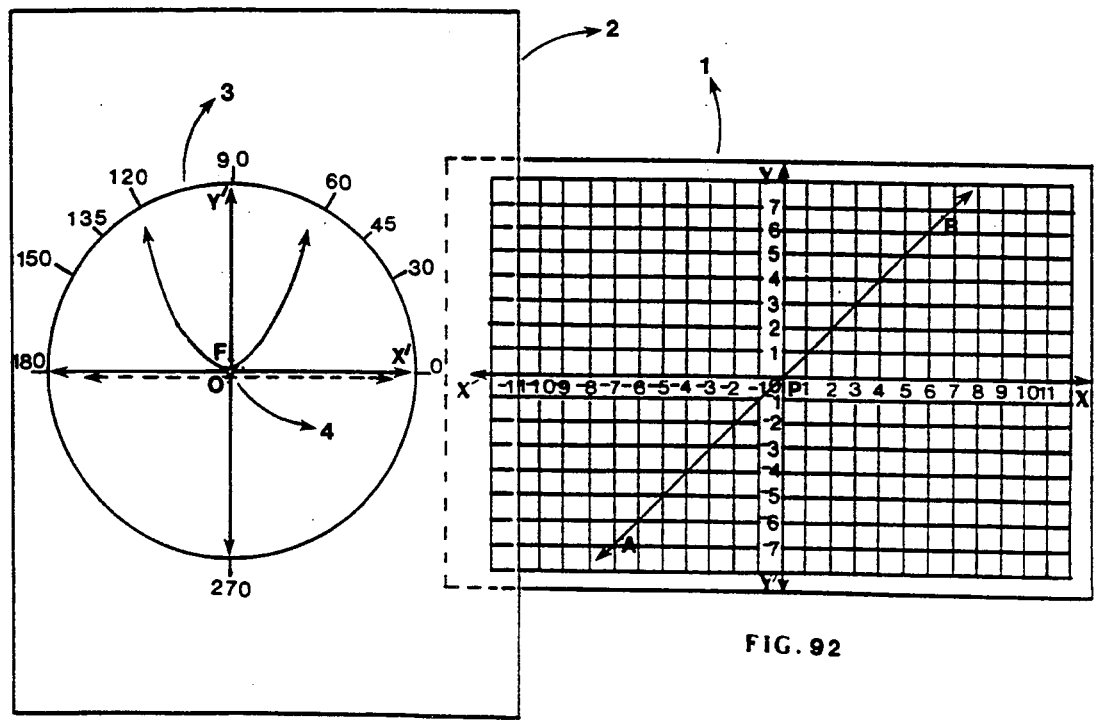

FIG. 92, the flat surface of composite overlay member including calibrated semicircle in angular degrees, the rotating circular flat surface including a graph which represents parabola and coordinate axes 'X' and Y'. The underlay Cartesian coordinate including a line graph which represents the equation y=x. This teaching aid of FIG. 92 is adapted for use to demonstrate algebraic graphs for a family of parabolic graphs relative to the line graph y=x under composition of transformations.

Figure 93:
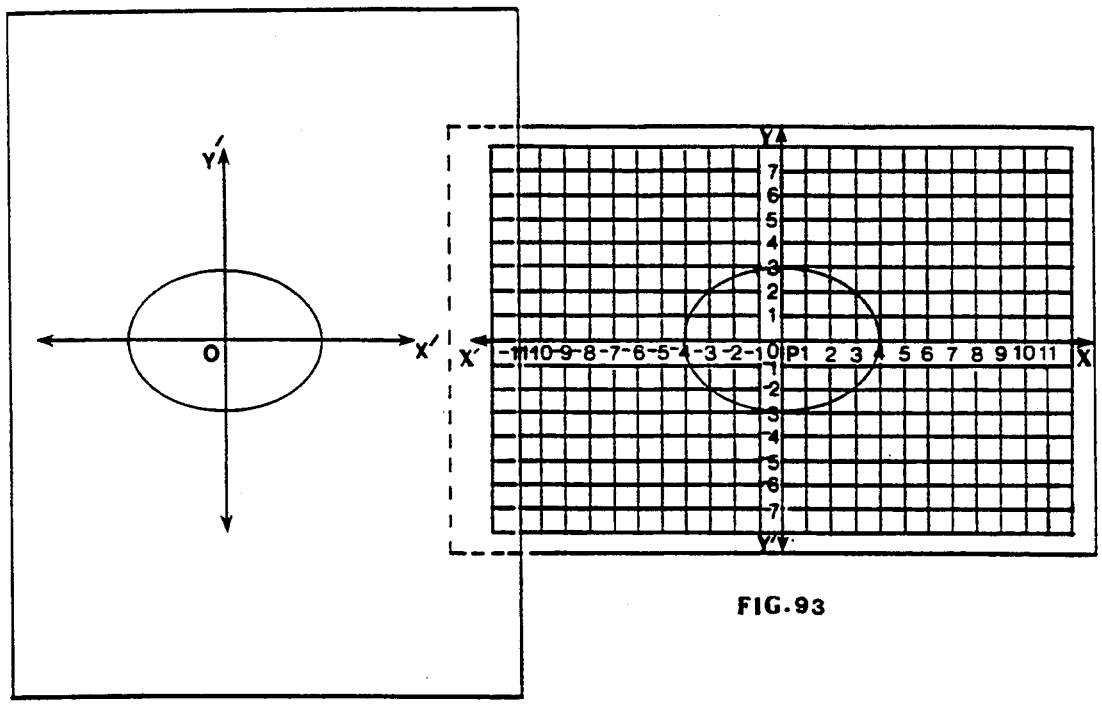

FIG. 93, a teaching aid adapted for use to visually demonstrate algebraic graphs which involve a family of elliptical graphs under composition of translations.

Figure 94:
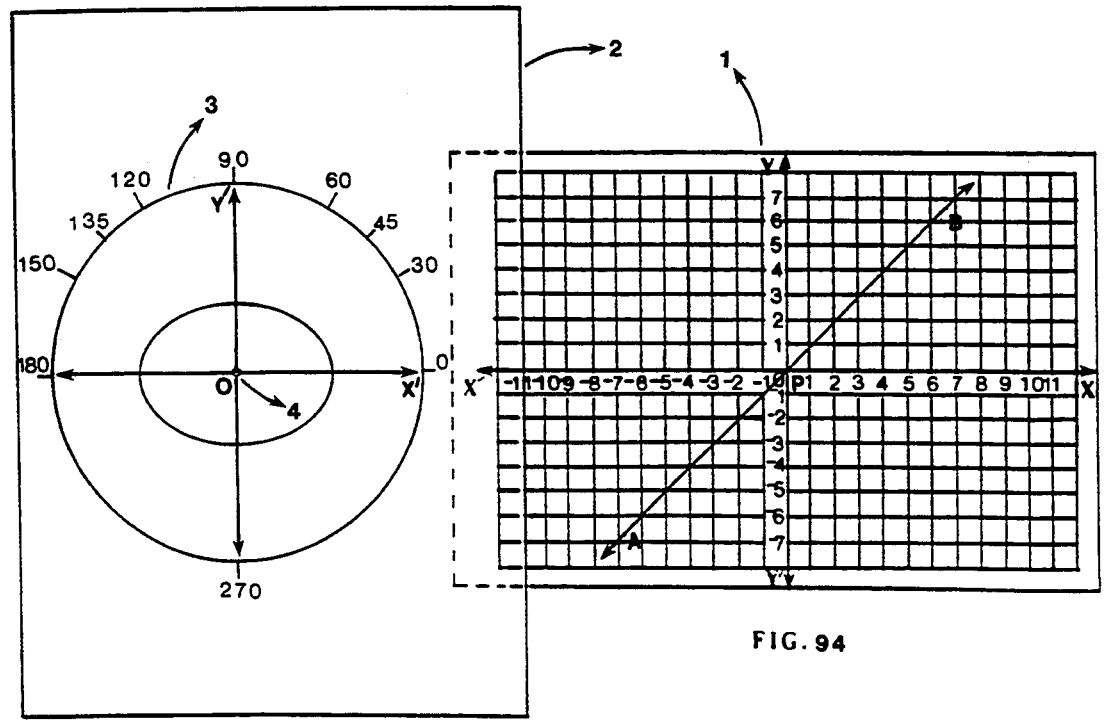

FIG. 94, the flat surface of composite overlay member including calibrated semicircle in angular degrees, the rotating circular flat surface including a graph which represent ellipse and coordinate axes X' and Y'. The underlay Cartesian coordinate including a line graph which represent the equation y=x. This teaching aid is adapted for use to demonstrate algebraic graphs for a family of elliptical graphs relative to the line graph y=x under composition of transformations.

Figure 95:
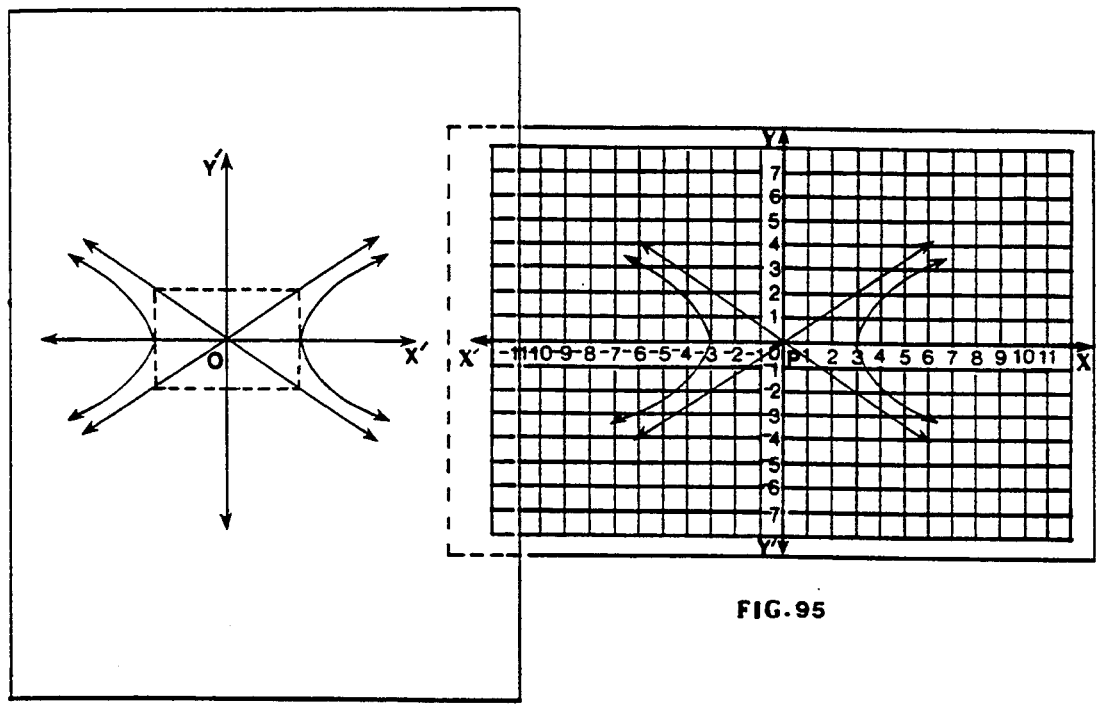

FIG. 95, a teaching aid adapted for use to visually demonstrate algebraic graphs which involve a family of hyperbolic graphs under composition of translations.

Figure 96:
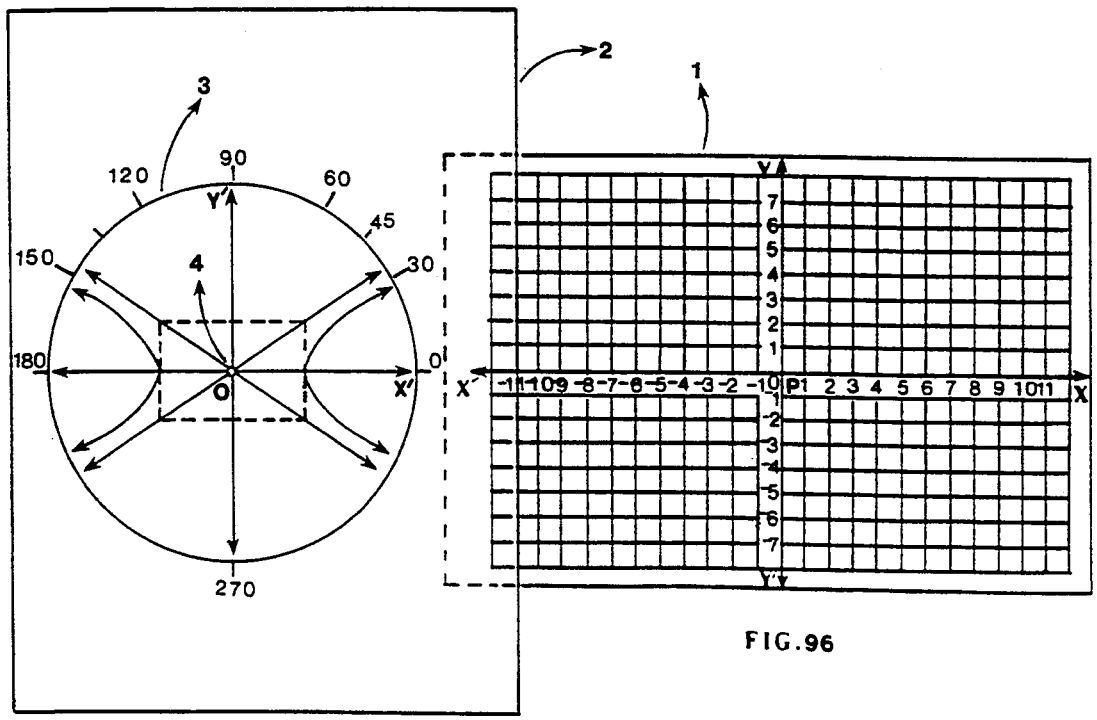

FIG. 96, the flat surface of composite overlay member including calibrated semicircle in angular degrees, the rotating circular flat surface including a graph which represents a hyperbola and coordinate axes X' and Y'. This teaching aid of FIG. 95 is adapted for use to demonstrate algebraic graphs for a family of hyperbolic graphs under composition of transformations.

Figure 97:
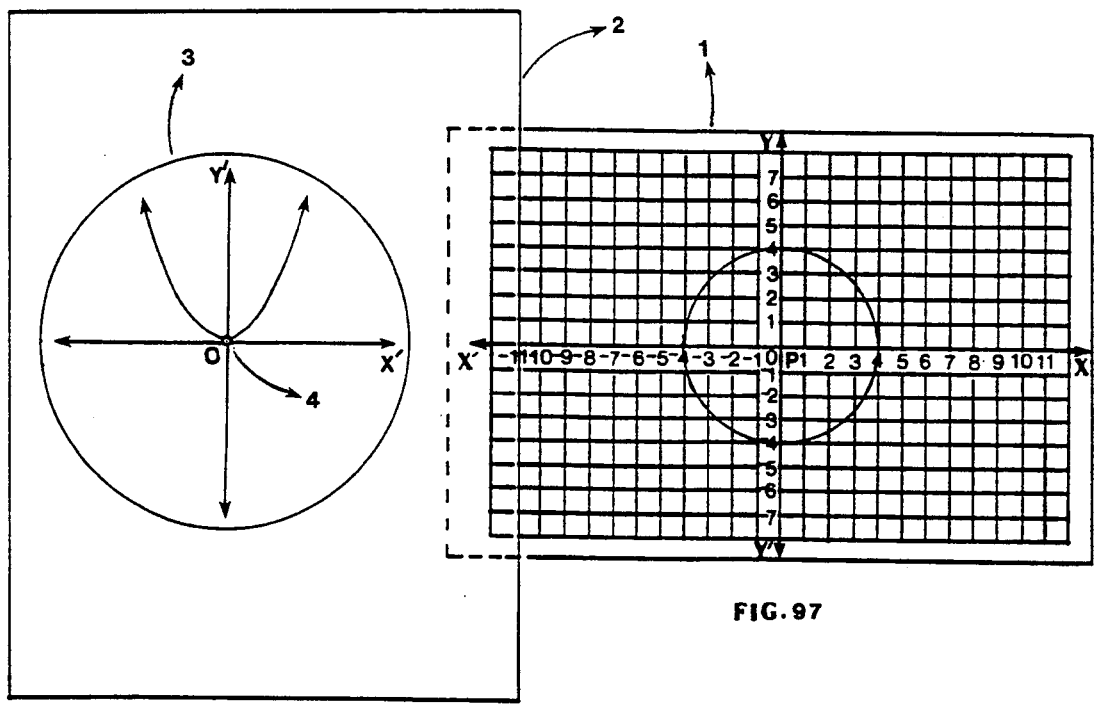

FIG. 97, the rotating circular flat surface including a parabolic graph and coordinate axes X' and Y'. The underlay Cartesian coordinate including a circle graph. This teaching aid of FIG. 97 is adapted for use to demonstrate algebraic graphs for a family of parabolic graphs with reference to a circle graph under composition of transformations.

Figure 98:
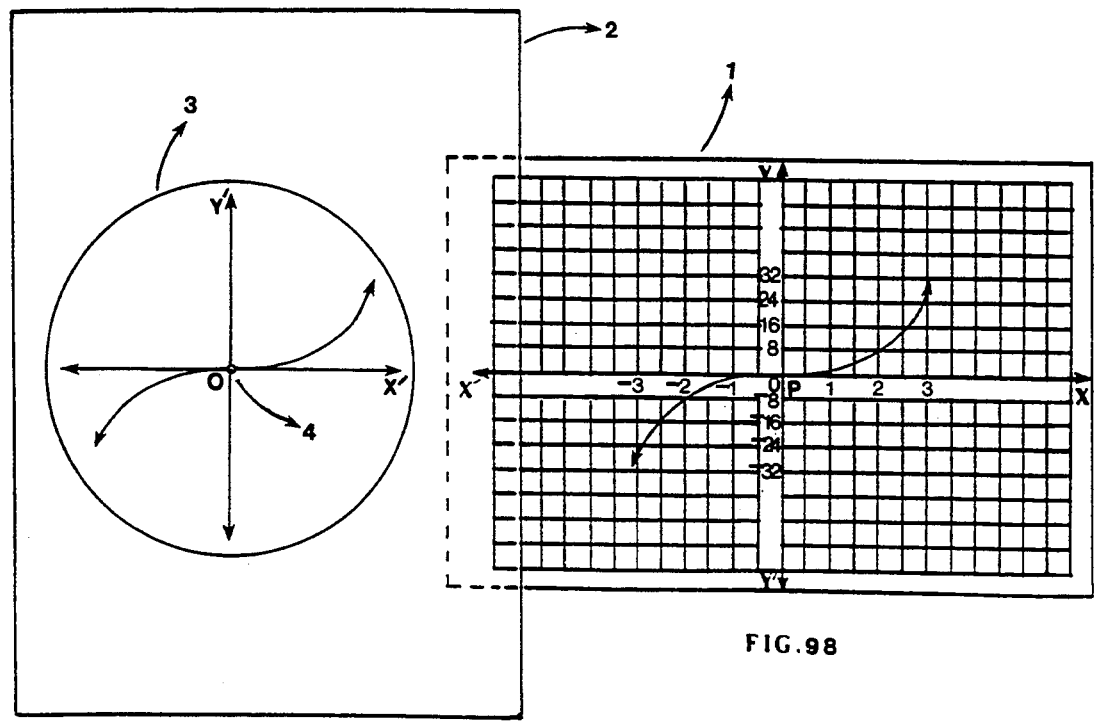

FIG. 98, a teaching aid adapted for use to visually demonstrate algebraic graphs which involve a family of graphs of polynomial functions with reference to a stationary graph $y=x^3$ under composition of transformations.

Figure 99:
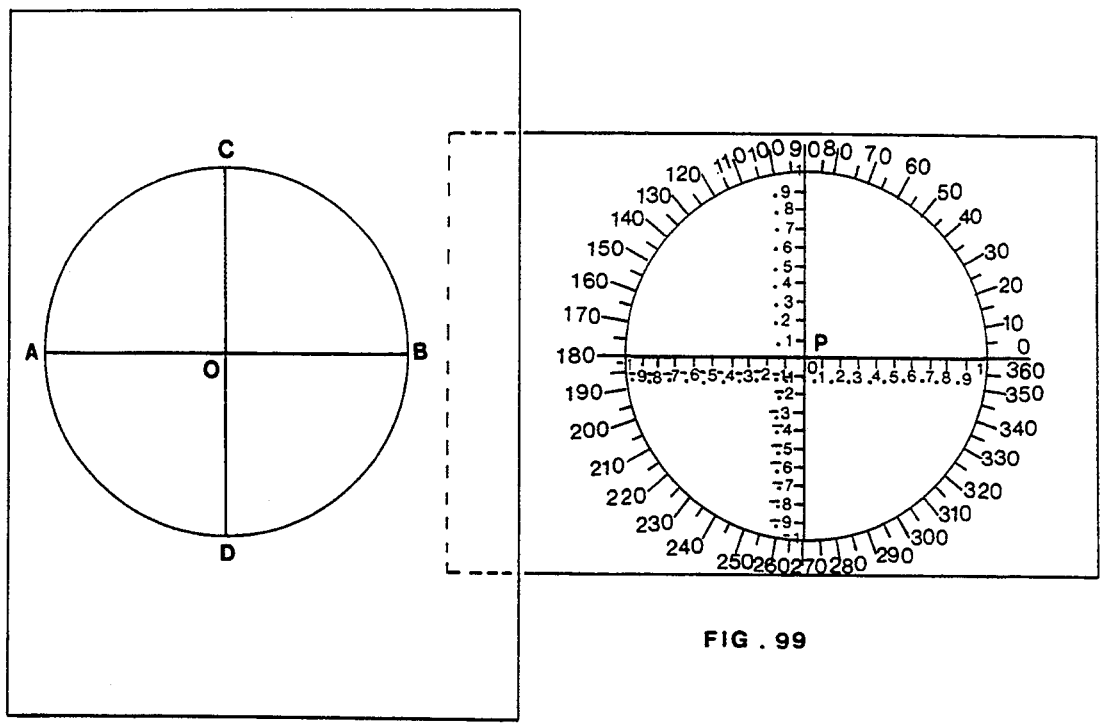

FIG. 99, the overlay member including circle O and perpendicular diameters AB and CD. In demonstrating this teaching aid, center O must be placed on the circumference of circle P and on any desired angle. This teaching aid of FIG. 99 is adapted for use to visually demonstrate the values of sine and cosine trigonometric functions of angular degrees under composition of translations.

Figure 100:
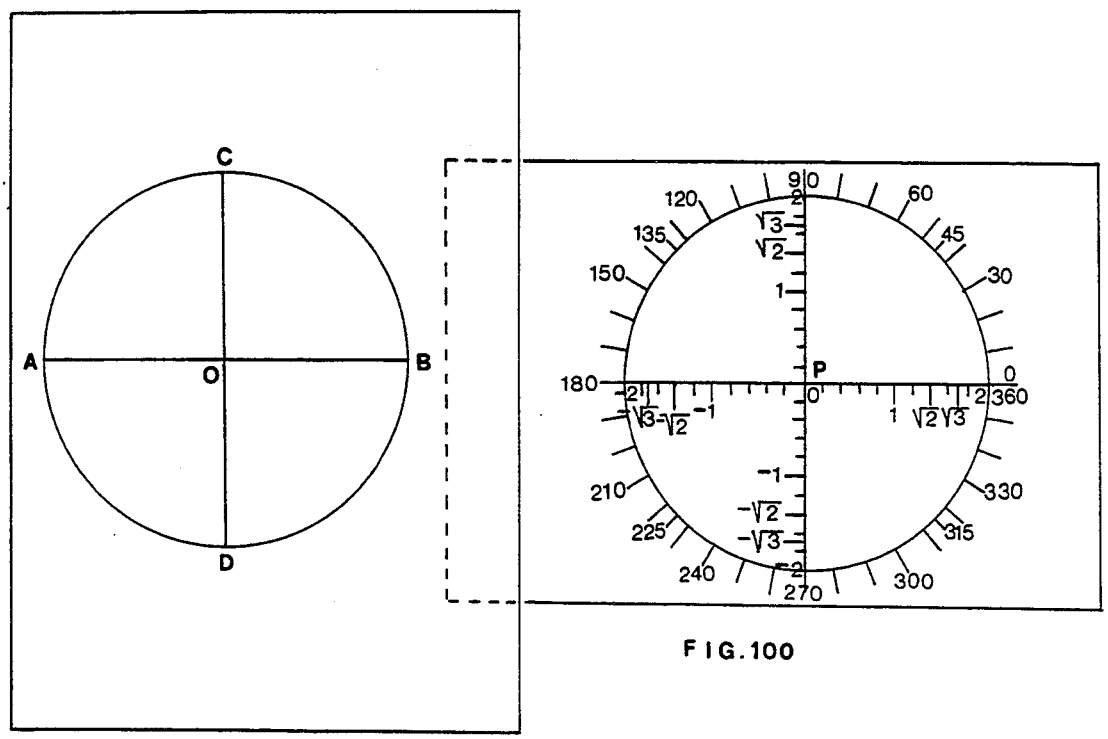

FIG. 100, the overlay member including circle O and perpendicular diameters AB and CD. In demonstrating this teaching aid, center O must be placed on the circumference of circle P and on any desired angle. This teaching aid of FIG. 100 is adapted for use to visually demonstrate the values of sine and cosine trigonometric functions of special angular degrees.

Figure 101:
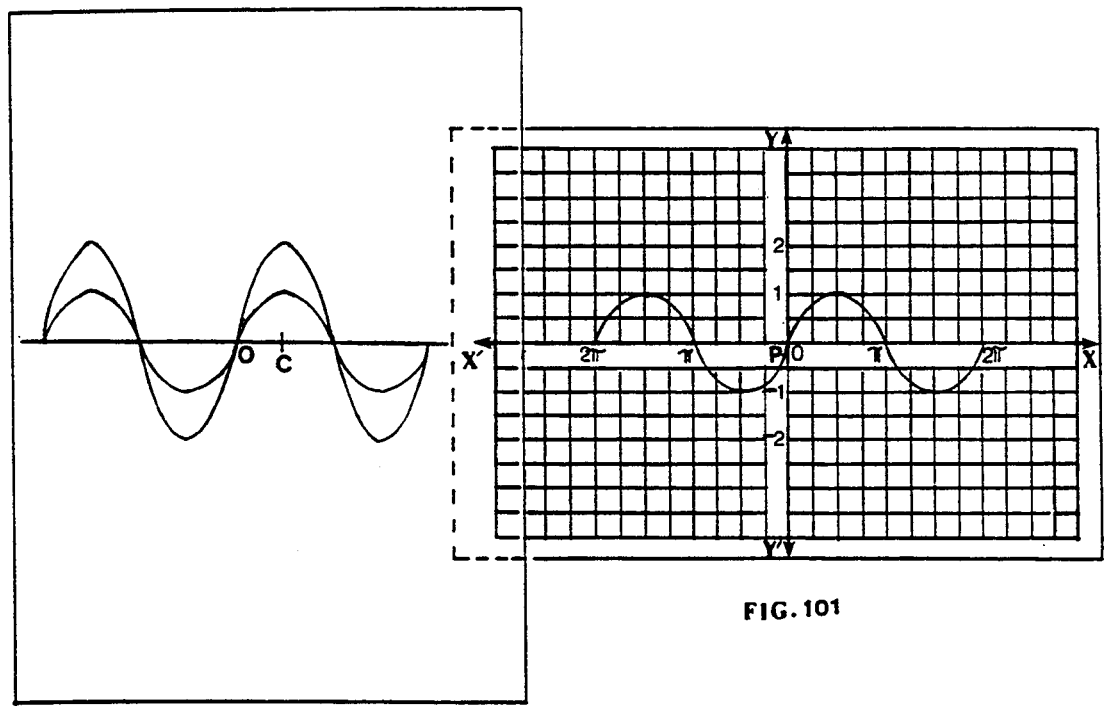

FIG. 101, a teaching aid adapted for use to visually demonstrate the behavior of sine and cosine trigonometric functions under composition of translations.

Figure 102:
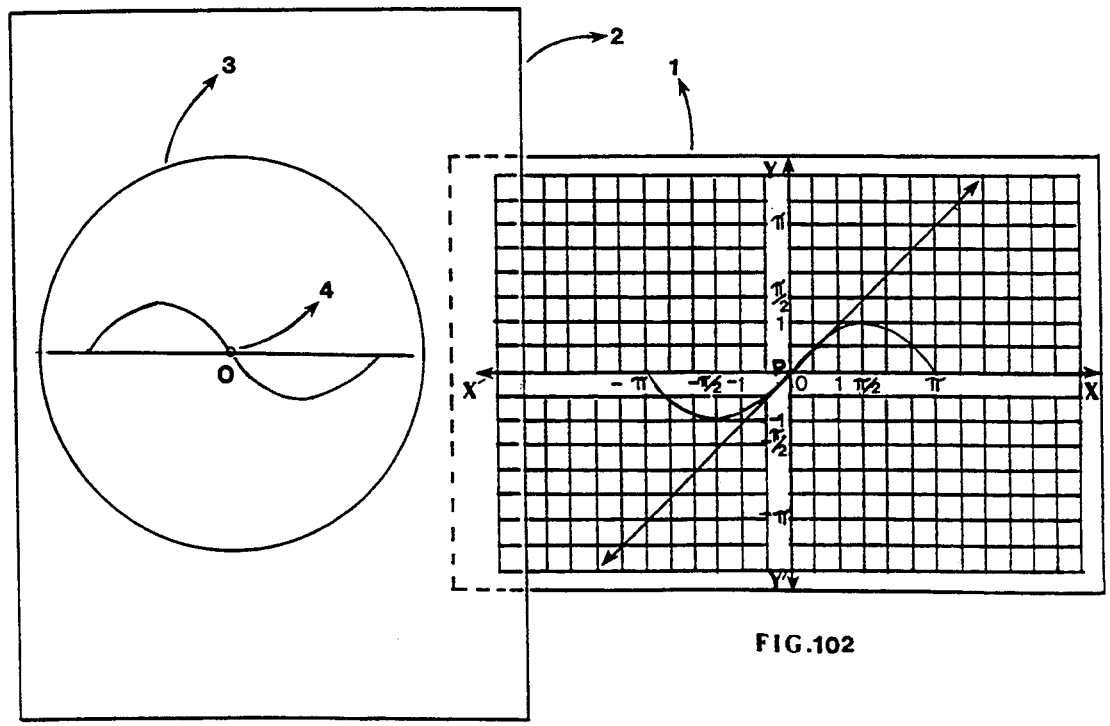

FIG. 102, the base member including trigonometric function graph y=sin x and line graph y=x, the rotating circular flat surface including the same graph of y=sin x over the abscissa axis. This teaching aid of FIG. 102 is adapted for use to demonstrate the inverse of sine function which represents y=arc sin x.

Figure 103:
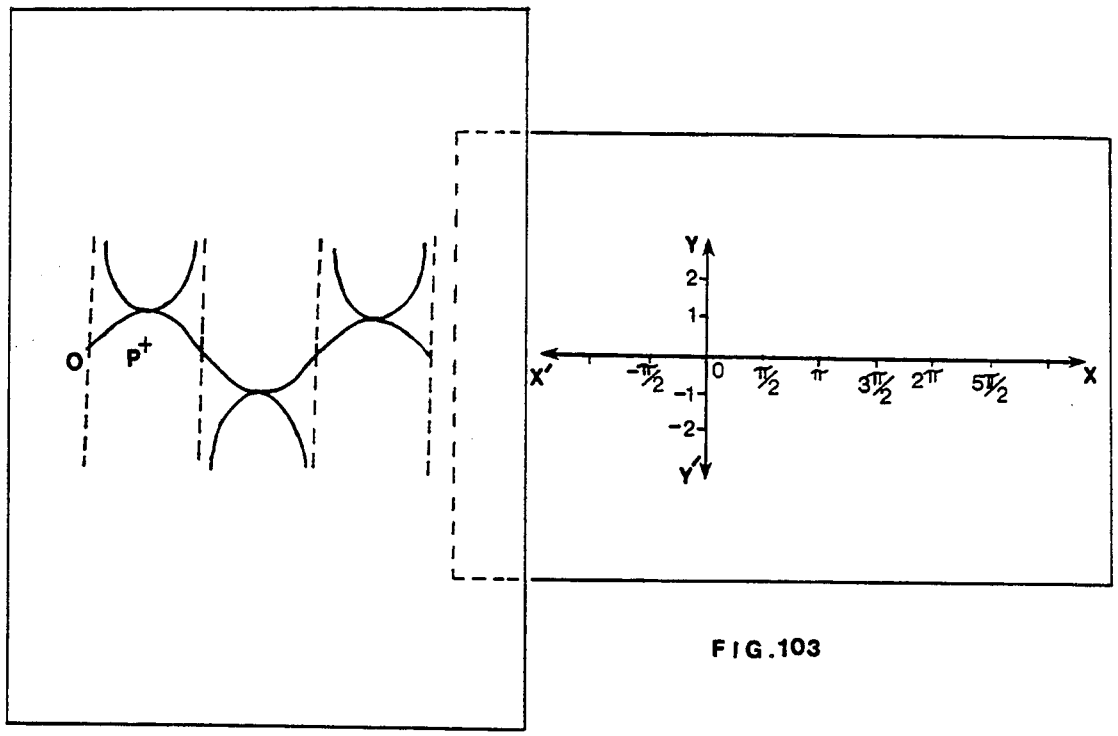

FIG. 103, a teaching aid adapted for use to visually demonstrate secants and cosecants trigonometric function graphs under composition of translations.

Figure 104:
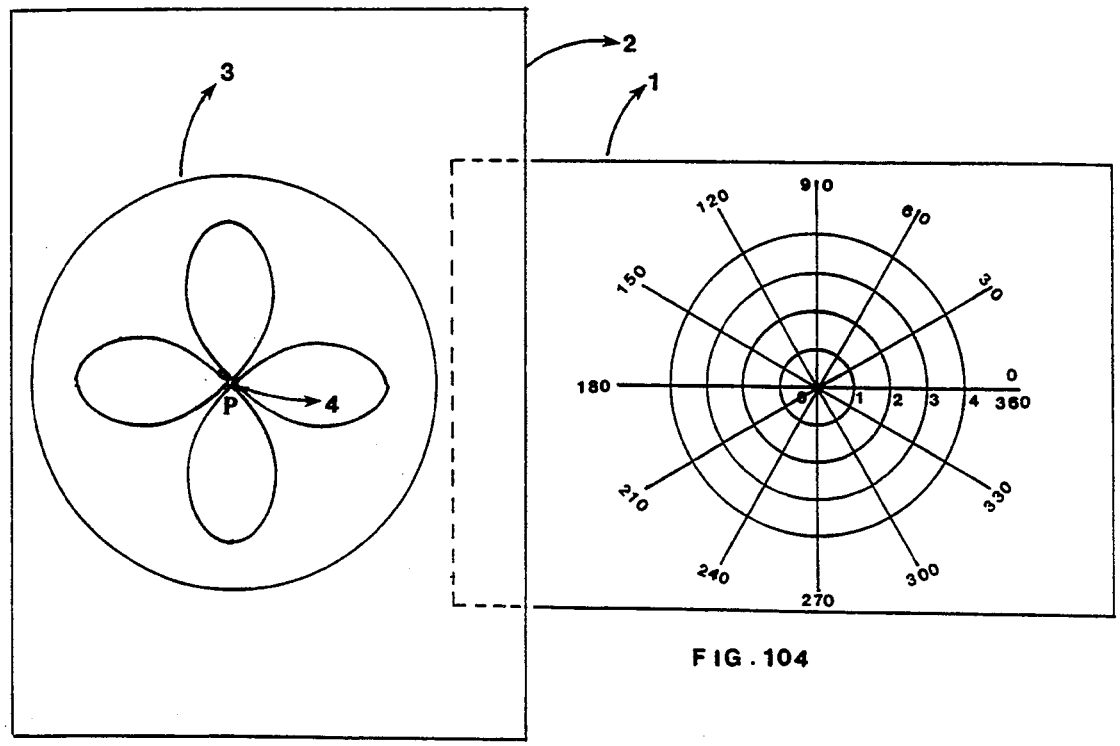

FIG. 104, a teaching aid adapted for use to visually demonstrate graphs of polar equations. In this device point P must be placed on pole O so that the graph p=2 cos 2θ can be visually demonstrated. Also, the rotating circular flat surface can be rotated 45° so that the rotating graph demonstrates the graph p=2 sin 2θ.

I claim:

1. A teaching device providing for visually studying mathematical curricula comprising:
 a first pair of channel tracks, each channel track having at least two independent U-shaped channel track;
 a transparent overlaying base member with a rectangular flat surface, snugly mounted along two parallel edges within said first pair of channel tracks whose purpose is to firmly hold the channel tracks in place;
 a generally rectangular base member having a first mathematical graph representation with indicia, slideably mounted within two independent U-channels of said first pair of channel tracks;
 a second pair of channel tracks, each channel track having two independent U-shaped channels;
 a translating member, transparent with a rectangular flat surface, snugly mounted with its two parallel edges within two U-channels of said second pair of channel tracks and slideably mounted within U-channels of said first pair of channel tracks; and an overlaying member including a second mathematical graph representation with indicia, slideably mounted within two independent U-channel tracks of said translating member, and a means for translating said second mathematical graph representation to any desired location with respect to said first mathematical graph representation, wherein said second mathematical graph representation has a predetermined mathematical relationship with said first mathematical graph representation to visually illustrate a mathematical concept.

2. The teaching device according to claim 1, wherein each of said first mathematical graph and second mathematical graph includes a geometric diagram with indicia and has a predetermined geometric relationship for visually illustrating a geometric theorem.

3. The teaching device according to claim 2, wherein said geometric diagram provides a means of visually demonstrating a geometric theorem, by means of translating a superimposed geometric diagram to predetermined positions with respect to an underlaying geometric diagram, wherein the configuration of said superimposed geometric diagram and underlaying geometric diagram depict a visual animation of a geometric theorem.

4. The teaching device according to claim 1, wherein said base member includes a graphical representation of a Cartesian coordinate system with coordinate axes, calibrated from zero at the origin to positive or negative predetermined length; and wherein said overlaying member includes a geometric diagram with indicia to visually demonstrate a geometric theorem in a coordinate geometry.

5. The teaching device according to claim 4, wherein said base member has a Cartesian coordinate system and includes a first algebraic graph with indicia; and wherein said overlaying member includes a second algebraic graph with indicia for superimposing a second algebraic graph to any desired location with reference to a first algebraic graph for visually demonstrating the behavior of a superimposed algebraic graph with reference to an underlaying algebraic graph under transformation.

6. The teaching device according to claim 4, wherein said geometric diagram and Cartesian coordinate system provides a means of visually demonstrating a geometric theorem in a coordinate geometry, by means of using coordinates of vertices of said overlaying geometric diagram with reference to said underlaying Cartesian coordinate system.

7. The teaching-device according to claim 1, wherein said base member has a Cartesian coordinate system, calibrated from zero at the origin to positive or negative predetermined unit length; and wherein said overlaying member includes an algebraic graph with indicia to visually demonstrate the behavior of an algebraic graph under transformation with reference to a Cartesian coordinate system.

8. The teaching device according to claim 7, wherein said algebraic graph provides a means of visually demonstrating the behavior of an algebraic graph under transformation by means of shifting said overlaying algebraic graph to any desired location with reference to said underlaying Cartesian coordinate system.

9. The teaching device according to claim 1, wherein said first graphical representation includes a Cartesian coordinate system, with calibrated coordinate axes to prescribed unit length, angular degrees, or radians, and wherein said overlaying member has a trigonometric graph to visually illustrate the behavior of a trigonometric graph under transformation with reference to a Cartesian coordinate system.

10. The teaching device according to claim 9, wherein said trigonometric graph provides a means of visually demonstrating a behavior of a trigonometric graph under transformation, by means of shifting said overlaying trigonometric graph to any desired location with reference to said underlaying Cartesian coordinate system.

11. The teaching device according to claim 1, wherein said first graphical representation has exactly two orthogonal coordinate axes, each axis calibrated to zero at the origin to one or minus one; and wherein a calibrated circular angle scale in degrees or radians, has its center at the origin of said coordinate axes; and wherein said overlaying member includes two lines normal to the coordinate axes, wherein the point of intersection of normal lines superimposing said calibrated circular angular scale registers the values of trigonometric functions of angular degrees or radians.

12. The teaching device of claim 1, wherein said base member and overlaying member are made of transparent films for infrared copiers in color images.

13. The teaching device according to claim 1, wherein mathematical graphs on said base member and overlaying member can be prepared by means of posting self-adhesive removable picture prints on said base member and overlaying member.

14. The teaching device according to claim 1, wherein each channel track of said first pair of channel tracks including exactly two channels; and wherein said overlaying base member is opaque and having a first mathematical graph and said overlaying member including a second mathematical graph, slideably mounted on said translating member.

15. The teaching device according to claim 1, wherein each channel track of said first pair of channel tracks including exactly two channels; and wherein said overlaying base member is transparent and having a first mathematical graph and said overlaying member including a second mathematical graph, slideably mounted on said translating member.

16. A teaching device providing for visually studying mathematical curricula comprising:
  a first pair of channel tracks, each channel track having at least two independent U-shaped channel track;
  a transparent overlaying base member with a rectangular flat surface, snugly mounted along two parallel edges within said first pair of channel tracks whose purpose is to firmly hold the channel tracks in place;
  a generally rectangular base member having a first mathematical graph representation with indicia, slideably mounted within two independent U-channels of said first pair of channel tracks;
  a second pair of channel tracks, each channel track having two independent U-shaped channels;
  a translating member, transparent with a rectangular flat surface, snugly mounted with its two parallel edges within two U-channels of said second pair of channel tracks and slideably mounted within U-channels of said first pair of channel tracks;
  a composite overlaying member comprising a circular flat surface having a second mathematical graph representation with indicia, pivotally mounted with its center on a transparent rectangular flat surface, wherein said composite overlaying member is slideably mounted along two parallel edges within said two independent U-channel tracks of said translating member; and a means for translating and/or rotating said second mathematical graph with respect to said first mathematical graph.

17. The teaching device according to claim 16, wherein said overlaying member including a third mathematical graph representation with indicia.

18. The teaching device according to claim 16, wherein said base member including a first geometric diagram with indicia and a circular flat surface including a second geometric diagram with indicia to visually demonstrate a geometric theorem.

19. The teaching device according to claim 18, wherein said geometric diagram provides a means of visually demonstrating a geometric theorem, by means of translating and/or rotating a superimposed geometric diagram to predetermined positions with respect to an underlaying geometric diagram, wherein the configuration of said superimposed geometric diagram and underlaying geometric diagram depict a visual animation of a geometric theorem.

20. The teaching device according to claim 16, wherein said circular flat surface including a geometric diagram with indicia and said base member including a Cartesian coordinate system to visually demonstrate a geometric theorem in a Cartesian coordinate system under translation and/or rotation.

21. The teaching device according to claim 16, wherein said circular flat surface including an algebraic graph with indicia and said base member including a Cartesian coordinate system to visually depict the behavior of said algebraic graph under translation and/or rotation.

22. The teaching device according to claim 21, wherein said algebraic graph provides a means of depicting the behavior of said algebraic graph, by means of translating and/or rotating said algebraic graph to any desired location with reference to said Cartesian coordinate system.

23. The teaching device according to claim 22, wherein an equation of said algebraic graph can be found graphically by means of translating and/or rotating said algebraic graph at any desired location.

24. The teaching device according to claim 16, wherein said translating and/or rotating mathematical graph to any desired location with respect to another mathematical graph provide a means for visually demonstrating a mathematical concept.

25. The teaching device according to claim 16, wherein said base member including a polar coordinate system, and said circular flat surface including a graph representing a polar equation.

26. A teaching device providing for visually studying mathematical curricula comprising:

a first pair of channel tracks, each channel track having at least two independent U-shaped channel track;

a transparent overlaying base member with a rectangular flat surface, snugly mounted along two parallel edges within said first pair of channel tracks whose purpose is to firmly hold the channel tracks in place;

a generally rectangular base member having a first mathematical graph representation with indicia, slideably mounted within two independent U-channels of said first pair of channel tracks;

a second pair of channel tracks, each channel track having two independent U-shaped channels;

a translating member, transparent with a rectangular flat surface, snugly mounted with its two parallel edges within two U-channels of said second pair of channel tracks and slideably mounted within U-channels of said first pair of channel tracks;

an overlaying member including a second mathematical graph representation with indicia, slideably mounted within two independent U-channel tracks of said translating member, and a means for translating said second mathematical graph representation to any desired location with respect to said first mathematical graph representation, wherein said second mathematical graph representation has a predetermined mathematical relationship with said first mathematical graph representation to visually illustrate a mathematical concept; and a second translating member; wherein an underlaying picture member having a mathematical graph representation is slideably mounted on said second translating member so that each of said mathematical graphs of the overlaying member and underlaying member can be translated to any desired location with reference to each other.

* * * * *

UNITED STATES PATENT AND TRADEMARK OFFICE
CERTIFICATE OF CORRECTION

PATENT NO.  : 5,370,538
DATED       : December 6, 1994
INVENTOR(S) : Fahim R. Sidrak It is certified that error appears in the above-indentified patent and that said Letters Patent is hereby corrected as shown below:

On the title page, item [19] should read--Sidrak--.

Item [76] should read-- Fahim R. Sidrak----.

Signed and Sealed this

Twenty-fourth Day of January, 1995

Attest:

BRUCE LEHMAN

Attesting Officer

Commissioner of Patents and Trademarks